(12) United States Patent
Suwa et al.

(10) Patent No.: US 9,465,244 B2
(45) Date of Patent: Oct. 11, 2016

(54) LIQUID CRYSTAL DISPLAY

(71) Applicant: Sony Corporation, Tokyo (JP)

(72) Inventors: Shunichi Suwa, Kanagawa (JP); Seiji Shibahara, Chiba (JP); Masashi Miyakawa, Kanagawa (JP); Chikashi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 139 days.

(21) Appl. No.: 14/221,328

(22) Filed: Mar. 21, 2014

(65) Prior Publication Data

US 2014/0307211 A1    Oct. 16, 2014

(30) Foreign Application Priority Data

Apr. 15, 2013  (JP) ................. 2013-084655

(51) Int. Cl.
| | | |
|---|---|---|
| G02F 1/1337 | (2006.01) | |
| G02F 1/1333 | (2006.01) | |
| C09K 19/30 | (2006.01) | |
| C09K 19/56 | (2006.01) | |
| G02F 1/139 | (2006.01) | |

(52) U.S. Cl.
CPC ......... G02F 1/133365 (2013.01); C09K 19/56 (2013.01); G02F 1/1393 (2013.01); G02F 1/133711 (2013.01); G02F 1/133723 (2013.01); *C09K 2019/301* (2013.01); *C09K 2019/3004* (2013.01); *C09K 2019/3016* (2013.01); *C09K 2019/3027* (2013.01); *G02F 2001/133726* (2013.01); *G02F 2001/133742* (2013.01)

(58) Field of Classification Search
CPC .......... G02F 1/133711; G02F 1/133723; G02F 1/133365; G02F 2001/133726; G02F 2001/133742; G02F 1/13712; C09K 19/56; C09K 2019/301; C09K 2019/3004; C09K 2019/3009; C09K 2019/3016; C09K 2019/3027

See application file for complete search history.

(56) References Cited

U.S. PATENT DOCUMENTS

| | | | | |
|---|---|---|---|---|
| 7,595,853 B2 * | 9/2009 | Matsubara | ............ | G02F 1/1395 349/117 |
| 8,619,222 B2 * | 12/2013 | Nakamura | ........ | G02F 1/133711 349/128 |
| 8,945,692 B2 * | 2/2015 | Suwa | ................ | G02F 1/133711 349/124 |
| 8,993,074 B2 * | 3/2015 | Miyakawa | ............ | C08G 73/10 252/299.63 |
| 9,146,425 B2 * | 9/2015 | Suwa | ................ | G02F 1/133711 |

FOREIGN PATENT DOCUMENTS

| | | |
|---|---|---|
| JP | 2008-106280 A | 5/2008 |
| JP | 2009-149667 A | 7/2009 |
| JP | 2011-095696 A | 5/2011 |

* cited by examiner

*Primary Examiner* — Shean C Wu
(74) *Attorney, Agent, or Firm* — Wolf, Greenfield & Sacks, P.C.

(57) ABSTRACT

There is provided a liquid crystal display including: a liquid crystal display element which includes a pair of alignment films which are provided on facing surface sides of a pair of substrates, and a liquid crystal layer which is provided between the pair of alignment films and is configured to have a liquid crystal composition containing liquid crystal molecules having negative dielectric anisotropy, in which at least one of the pair of alignment films contains a compound obtained by crosslinking polymer compounds each including a first side chain which interacts with the liquid crystal molecules and a crosslinkable functional group as a second side chain, with each other, the liquid crystal composition configuring the liquid crystal layer contains at least one kind of an alkenyl compound represented by the following general formula (AN-1), and pretilt is applied to the liquid crystal molecules by the crosslinked compound.

11 Claims, 11 Drawing Sheets

LIQUID CRYSTAL DISPLAY

CROSS REFERENCE TO RELATED APPLICATIONS

This application claims the benefit of Japanese Priority Patent Application JP 2013-084655 filed Apr. 15, 2013, the entire contents of which are incorporated herein by reference.

BACKGROUND

The present disclosure relates to a liquid crystal display including a liquid crystal display element in which a liquid crystal layer is sealed between a pair of substrates including alignment films on facing surfaces thereof.

In recent years, a liquid crystal display (LCD) has been widely used as a display device of a liquid crystal television receiver, a note-type personal computer, or a car navigation device. This liquid crystal display is classified in various display modes (methods) depending on molecular arrangement (alignment) of liquid crystal molecules contained in a liquid crystal layer interposed between substrates. A twisted nematic (TN) mode in which the liquid crystal molecules are twisted and aligned in a state where voltage is not applied, is well known as the display mode, for example. In the TN mode, the liquid crystal molecules has positive dielectric anisotropy, that is, a property for obtaining a greater dielectric constant of the liquid molecules in a long axis direction compared to that in a short axis direction. Accordingly, the liquid crystal molecules have a structure of sequentially rotating alignment azimuths of the liquid crystal molecules and aligning the alignment azimuths in a direction perpendicular to substrate surfaces, in a surface parallel with the substrate surfaces.

Meanwhile, attention is paid to a vertical alignment (VA) mode in which the liquid molecules are aligned to be perpendicular to the substrate surfaces in a state where voltage is not applied. In the VA mode, the liquid crystal molecules have negative dielectric anisotropy, that is, a property for obtaining a smaller dielectric constant of the liquid molecules in a long axis direction compared to that in a short axis direction, and a viewing angle which is wider than that in the TN mode can be realized.

The liquid crystal display in the VA mode has a configuration in that, if voltage is applied thereto, the liquid crystal molecules aligned in a direction perpendicular to the substrates respond so as to be tilted in a direction parallel to the substrates by the negative dielectric anisotropy to allow light to transmit therethrough. However, since the direction in which the liquid crystal molecules aligned in the direction perpendicular to the substrates are tilted, is arbitrary, the alignment of the liquid crystal molecules is disordered due to voltage application, and accordingly response characteristics with respect to the voltage are degraded.

Herein, a technology of regulating the direction in which the liquid crystal molecules are tilted by responding to the voltage is reviewed in order to improve the response characteristics. In detail, for example, Japanese Unexamined Patent Application Publication No. 2011-095696 discloses a liquid crystal display including a liquid crystal display element including a pair of alignment films which are provided on facing surfaces of a pair of substrates, and a liquid crystal layer which is provided between the pair of alignment films and includes liquid crystal molecules having negative dielectric anisotropy, in which at least one of the pair of alignment films contains a compound obtained by crosslinking polymer compounds each including a crosslinkable functional group as a side chain, with each other, and pretilt is applied to the liquid crystal molecules by the crosslinked compound. The technology disclosed in Japanese Unexamined Patent Application Publication No. 2011-095696 is also called a field-induced photo-reactive alignment (FPA) method.

Meanwhile, a technology of using a liquid crystal composition including an alkenyl compound is reviewed in order to realizing high-speed response (for example, see Japanese Unexamined Patent Application Publication No. 2009-149667 and Japanese Unexamined Patent Application Publication No. 2008-106280). By containing the alkenyl compound in the liquid crystal composition, viscosity of the liquid crystal composition is decreased, and accordingly it is possible to realize high-speed response of the liquid crystal display.

SUMMARY

However, in a case where a liquid crystal composition containing an alkenyl compound and a vertical alignment films for driving the liquid crystal molecules in a vertical aligned state are combined with each other, a voltage retention rate is decreased over time. Meanwhile, Japanese Unexamined Patent Application Publication No. 2011-095696 does not disclose about usage of the liquid crystal composition containing the alkenyl compound as a material configuring the liquid crystal layer.

Therefore, it is desirable to provide a liquid crystal display using a liquid crystal composition containing an alkenyl compound as a material configuring a liquid crystal layer, which can realize high-speed response and can avoid occurrence of a decrease in a voltage retention rate over time.

According to an embodiment of the present disclosure, there is provided a liquid crystal display including: a liquid crystal display element which includes a pair of alignment films which are provided on facing surface sides of a pair of substrates, and a liquid crystal layer which is provided between the pair of alignment films and is configured to have a liquid crystal composition containing liquid crystal molecules having negative dielectric anisotropy, in which at least one of the pair of alignment films contains a compound (for convenience, referred to as a "compound after an alignment process) obtained by crosslinking polymer compounds each including a first side chain which interacts with the liquid crystal molecules and a crosslinkable functional group as a second side chain, with each other, the liquid crystal composition configuring the liquid crystal layer contains at least one kind of an alkenyl compound represented by the following general formula (AN-1), and pretilt is applied to the liquid crystal molecules by the crosslinked compound (compound after the alignment process). The liquid crystal display element according to the embodiment is formed of a liquid crystal display element of the liquid crystal display of the present disclosure. Herein, the "crosslinkable functional group" means a group in which a crosslinked structure (bridge structure) can be formed.

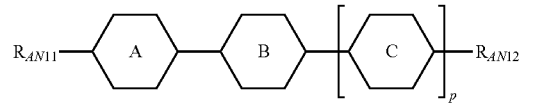

(AN-1)

Herein, $R_{AN11}$ and $R_{AN12}$ each independently are an alkyl group, an alkenyl group, or an alcoxy group having 1 to 10 carbon atoms, and at least one of $R_{AN11}$ and $R_{AN12}$ is an alkenyl group,

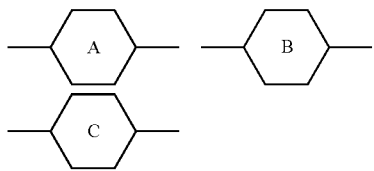

each independently are

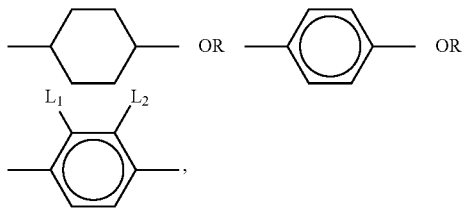

$L_1$ and $L_2$ each independently are a hydrogen atom, fluorine atom, or a chlorine atom, and p is 0 or 1.

Hereinafter, the liquid crystal display of the present disclosure may be called a "liquid crystal display according to a first embodiment of the present disclosure" for convenience. Herein, "interacting with the liquid crystal molecules" means that the liquid crystal molecules are disposed along the first side chain or are interposed between the first side chains, and accordingly pretilt is applied to the liquid crystal molecules. In addition, by crosslinking the polymer compounds each including the crosslinkable functional group as the second side chain, with each other, a pretilted state of the liquid crystal molecules is fixed.

In the liquid crystal display of the present disclosure, the liquid crystal composition configuring the liquid crystal layer contains at least one kind of the alkenyl compound represented by the general formula (AN-1), and at least one of the pair of alignment films contains a compound obtained by crosslinking the polymer compounds each including the first side chain which interacts with the liquid crystal molecules and the crosslinkable functional group as the second side chain, with each other. Accordingly, it is possible to provide a liquid crystal display which can realize high-speed response and can avoid occurrence of a decrease in a voltage retention rate over time. In addition, since the pretilt is applied to the liquid crystal molecules by the crosslinked compound, when an electrical field is applied between a pixel electrode and a counter electrode, a long axis direction of the liquid crystal molecules is set in response to a predetermined direction with respect to a substrate surface and an excellent display property is secured. Further, since the pretilt is applied to the liquid crystal molecules by the crosslinked compound, a response speed according to the electrical field between the electrodes is high compared to a case in which the pretilt is not applied to the liquid crystal molecules, and the excellent display property is easily maintained compared to a case in which the pretilt is applied without using the crosslinked compound.

DETAILED DESCRIPTION OF EMBODIMENTS

Figure 1A:
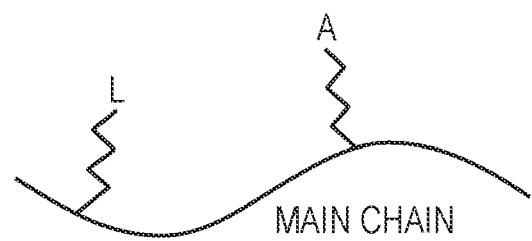
FIGS. 1A and 1B are conceptual diagrams of a polymer compound including a first side chain which interacts with liquid crystal molecules, and a crosslinkable functional group as a second side chain.

Hereinafter, the present disclosure will be described based on embodiments and examples with reference to the drawings, but the present disclosure is not limited to the embodiments and examples and various numerical values or materials in the embodiments and examples are examples. The description thereof will be in the following order.

1. General Description of Liquid Crystal Display of Present Disclosure

2. Description of Liquid Crystal Display of Present Disclosure Based on Embodiments 3. Description of Liquid Crystal Display of Present Disclosure Based on Examples and Others General Description of Liquid Crystal Display of Present Disclosure As another example, a liquid crystal display according to the embodiment may include a liquid crystal display element which includes a pair of alignment films which are provided on facing surface sides of a pair of substrates, and a liquid crystal layer which is provided between the pair of alignment films and is configured to have a liquid crystal composition containing liquid crystal molecules having negative dielectric anisotropy, at least one of the pair of alignment films may contain a compound (for convenience, referred to as a "compound after an alignment process) obtained by deforming a polymer compound including a first side chain which interacts with the liquid crystal molecules and a photosensitive functional group as a second side chain, the liquid crystal composition configuring the liquid crystal layer may contain at least one kind of an alkenyl compound represented by the general formula (AN-1), and pretilt may be applied to the liquid crystal molecules by the deformed compound (compound after the alignment process). Such a liquid crystal display is called a "liquid crystal display according to a first reference embodiment", for convenience. The liquid crystal display element according to the embodiment is formed of the liquid crystal display element of the liquid crystal display according to the first reference embodiment. Herein, the "photosensitive functional group" means a group which can absorb an energy ray.

In the liquid crystal display according to the first reference embodiment, at least one of the pair of alignment films contains the compound obtained by deforming a polymer compound including the photosensitive functional group as the second side chain, and the pretilt is applied to the liquid crystal molecules by the deformed molecules. Accordingly, when an electrical field is applied between a pixel electrode and a counter electrode, a long axis direction of the liquid crystal molecules is set in response to a predetermined direction with respect to a substrate surface and an excellent display property is secured. Further, since the pretilt is applied to the liquid crystal molecules by the deformed compound, a response speed according to the electrical field between the electrodes is high compared to a case in which the pretilt is not applied to the liquid crystal molecules, and the excellent display property is easily maintained compared to a case in which the pretilt is applied without using the deformed compound.

The liquid crystal display according to the first embodiment of a present disclosure may be obtained by a manufacturing method including: a step of forming a first alignment film formed of a polymer compound (for convenience, referred to as a "compound before an alignment process") including the first side chain which interacts with the liquid crystal molecules and the crosslinkable functional group as the second side chain, on one of the pair of substrates; a step of forming a second alignment film on the other of the pair of substrate; a step of disposing the pair of substrates so that the first alignment film and the second alignment film face each other, and sealing a liquid crystal layer configured to have a liquid crystal composition containing liquid crystal molecules having negative dielectric anisotropy and contains at least one kind of the alkenyl compound represented by the general formula (AN-1), between the first alignment film and the second alignment film; and a step of crosslinking the polymer compounds (compound before the alignment process) with each other to apply the pretilt to the liquid crystal molecules after sealing the liquid crystal layer. Such a manufacturing method of the liquid crystal display is called a "manufacturing method of the liquid crystal display according to the first embodiment" for convenience.

Herein, in the manufacturing method of the liquid crystal display (or manufacturing method of the liquid crystal display element) according to the first embodiment, while the liquid crystal molecules are aligned by applying a predetermined electrical field with respect to the liquid crystal layer, the second side chains of the polymer compounds (compound before the alignment process) may be crosslinked with each other by emitting an ultraviolet ray thereto.

In this case, it is preferable that the ultraviolet ray be emitted thereto while the electrical field is applied with respect to the liquid crystal layer, so that the liquid crystal molecules are arranged in an oblique direction with respect to a surface of at least one substrate of the pair of substrates, and in addition, it is preferable that the pair of substrates be configured with a substrate including a pixel electrode and a substrate including a counter electrode and the ultraviolet ray is emitted from a side of the substrate including the pixel electrode. In general, since a color filter is formed on a side of the substrate including the counter electrode, the ultraviolet ray is absorbed by this color filter, and a reaction of the crosslinkable functional group of an alignment film material may be hardly to occur, it is more preferable to emit the ultraviolet ray from the side of the substrate including the pixel electrode on which the color filter is not formed, as described above. In a case where the color filter is formed on the side of the substrate including the pixel electrode, it is preferable to emit the ultraviolet ray from the side of the substrate including the counter electrode. Basically, an azimuth angle (declination angle) of the liquid crystal molecules when the pretilt is applied thereto is regulated by a direction of the electrical field, and a polar angle (zenith angle) thereof is regulated by intensity of the electrical field. This is also the same in a manufacturing method of the liquid crystal display according to the first reference embodiment or a second reference embodiment which will be described later.

In the manufacturing method of the liquid crystal display according to the first embodiment described above, after forming the first alignment film containing the polymer compound including the crosslinkable functional group, the liquid crystal layer is sealed between the first alignment film and the second alignment film. Herein, the liquid crystal molecules in the liquid crystal layer are in a state of being arranged in a predetermined direction (for example, a horizontal direction, a vertical direction, or an oblique direction) with respect to the entire surface of the first alignment film and the second alignment film, by the first alignment film and the second alignment film. Then, while the electrical filed is applied thereto, the crosslinkable functional groups are reacted to crosslink the polymer compounds. Accordingly, the pretilt can be applied with respect to the liquid crystal molecules in a vicinity of the crosslinked compounds. That is, by crosslinking the polymer compounds in a state where the liquid crystal molecules are arranged, it is possible to apply the pretilt with respect to the liquid crystal molecules, even though linear polarized light or light in the oblique direction is not emitted with respect to the alignment films before sealing the liquid crystal layer, or even though a large-scale apparatus is not used. Thus, the response speed is improved compared to the case where the pretilt is not applied to the liquid crystal molecules.

The liquid crystal display according to the first reference embodiment may be obtained by a manufacturing method including: a step of forming a first alignment film formed of a polymer compound (for convenience, referred to as a "compound before an alignment process") including the first side chain which interacts with the liquid crystal molecules and the photosensitive functional group as the second side chain, on one of the pair of substrates; a step of forming a second alignment film on the other of the pair of substrate; a step of disposing the pair of substrates so that the first alignment film and the second alignment film face each other, and sealing a liquid crystal layer configured to have a liquid crystal composition containing liquid crystal molecules having negative dielectric anisotropy and contains at least one kind of the alkenyl compound represented by the general formula (AN-1), between the first alignment film and the second alignment film; and a step of deforming the polymer compounds (compound before the alignment process) to apply the pretilt to the liquid crystal molecules after sealing the liquid crystal layer. Such a manufacturing method of the liquid crystal display is called a "manufacturing method of the liquid crystal display according to the first reference embodiment" for convenience.

Herein, in the manufacturing method of the liquid crystal display (or manufacturing method of the liquid crystal display element) according to the first reference embodiment, while the liquid crystal molecules are aligned by applying a predetermined electrical field with respect to the liquid crystal layer, the second side chains of the polymer compounds (compound before the alignment process) may be deformed by emitting an ultraviolet ray thereto.

In the manufacturing method of the liquid crystal display according to the first reference embodiment described above, after forming the first alignment film containing the polymer compound including the photosensitive functional group, the liquid crystal layer is sealed between the first alignment film and the second alignment film. Herein, the liquid crystal molecules in the liquid crystal layer are in a state of being arranged in a predetermined direction (for example, a horizontal direction, a vertical direction, or an oblique direction) with respect to the entire surfaces of the first alignment film and the second alignment film, by the first alignment film and the second alignment film. Then, while the electrical filed is applied thereto, the polymer compounds are deformed. Accordingly, the pretilt can be applied with respect to the liquid crystal molecules in a vicinity of the deformed compounds. That is, by deforming the polymer compounds in a state where the liquid crystal molecules are arranged, it is possible to apply the pretilt with respect to the liquid crystal molecules, even though linear polarized light or light in the oblique direction is not emitted with respect to the alignment films before sealing the liquid crystal layer, or even though a large-scale apparatus is not used. Thus, the response speed is improved compared to the case where the pretilt is not applied to the liquid crystal molecules.

Alternatively, the liquid crystal display according to the first embodiment of a present disclosure or the liquid crystal display according to the first reference embodiment may be obtained by a manufacturing method including: a step of forming a first alignment film formed of a polymer compound (for convenience, referred to as a "compound before an alignment process") including the first side chain which interacts with the liquid crystal molecules and the crosslinkable functional group or a photosensitive functional group as the second side chain, on one of the pair of substrates; a step of forming a second alignment film on the other of the pair of substrate; a step of disposing the pair of substrates so that the first alignment film and the second alignment film face each other, and sealing a liquid crystal layer configured to have a liquid crystal composition containing liquid crystal molecules having negative dielectric anisotropy and contains at least one kind of the alkenyl compound represented by the general formula (AN-1), between the first alignment film and the second alignment film; and a step of emitting an energy ray to the polymer compounds (compound before the alignment process) to apply the pretilt to the liquid crystal molecules after sealing the liquid crystal layer. Such a manufacturing method of the liquid crystal display is called a "manufacturing method of the liquid crystal display according to the second reference embodiment" for convenience. Herein, an ultraviolet ray, an X-ray, or an electron ray can be used as the energy ray.

In the manufacturing method of the liquid crystal display (or manufacturing method of the liquid crystal display element) according to the second reference embodiment, while the liquid crystal molecules are aligned by applying a predetermined electrical field with respect to the liquid crystal layer, the ultraviolet ray may be emitted to the polymer compound as the energy ray.

In the manufacturing method of the liquid crystal display according to the second reference embodiment, the pretilt is applied to the liquid crystal molecules by emitting the energy ray to the polymer compound (compound before the alignment process). That is, by crosslinking or deforming the second side chain of the polymer compounds in a state where the liquid crystal molecules are arranged, it is possible to apply the pretilt with respect to the liquid crystal molecules, even though linear polarized light or light in the oblique direction is not emitted with respect to the alignment films before sealing the liquid crystal layer, or even though a large-scale apparatus is not used. Thus, the response speed is improved compared to the case where the pretilt is not applied to the liquid crystal molecules.

The liquid crystal display according the first embodiment or the manufacturing method of the liquid crystal display according to the first embodiment of the present disclosure including the preferred embodiments and configurations may be collectively and simply called the "first embodiment" hereinafter, the liquid crystal display according the first reference embodiment or the manufacturing method of the liquid crystal display according the first reference embodiment including the preferred embodiments and configurations may be collectively and simply called the "first reference embodiment" hereinafter, and the manufacturing method of the liquid crystal display according the second reference embodiment including the preferred embodiments and configurations may be collectively and simply called the "second reference embodiment" hereinafter.

In the first embodiment, the first reference embodiment, and the second embodiment, the liquid crystal composition configuring the liquid crystal layer may have a configuration of containing at least one kind of the alkenyl compound represented by the following general formula (AN-2), may have a configuration of containing at least one kind of the alkenyl compound represented by the following general formula (AN-3), may have a configuration of containing at least one kind of the alkenyl compound represented by the following general formula (AN-4), or may have a configuration of containing at least one kind of the alkenyl compound represented by the following general formula (AN-5-1) or general formula (AN-5-2). The alkenyl compound in the liquid crystal composition can be detected by using a gas chromatography device, for example.

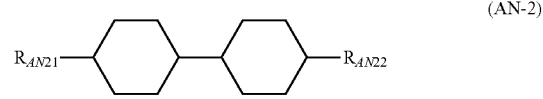
(AN-2)

Herein, $R_{AN21}$ is an alkenyl group having 1 to 10 carbon atoms and $R_{AN22}$ is an alkyl group having 1 to 10 carbon atoms.

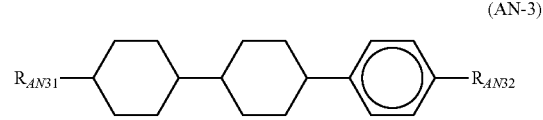
(AN-3)

Herein, $R_{AN31}$ is an alkenyl group having 1 to 10 carbon atoms and $R_{AN32}$ is an alkyl group having 1 to 10 carbon atoms.

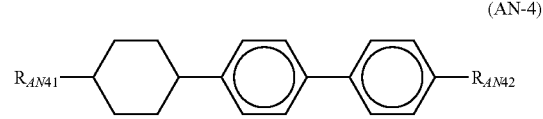
(AN-4)

Herein, $R_{AN41}$ is an alkenyl group having 1 to 10 carbon atoms and $R_{AN42}$ is an alkyl group having 1 to 10 carbon atoms.

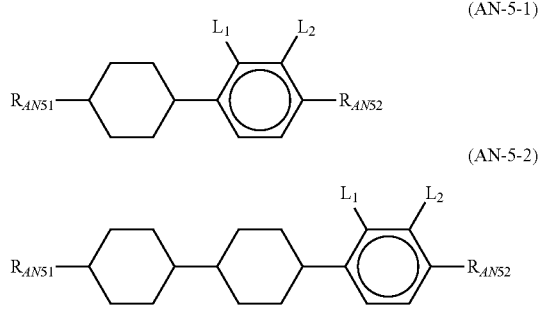

(AN-5-1)

(AN-5-2)

Herein, $R_{AN51}$ is an alkenyl group having 1 to 10 carbon atoms, $R_{AN52}$ is an alcoxy group having 1 to 10 carbon atoms, and $L_1$ and $L_2$ each independently are a fluorine atom or a chlorine atom.

Examples of combinations of the alkenyl compounds include a combination of the general formula (AN-2) and the general formula (AN-3), a combination of the general formula (AN-2) and the general formula (AN-4), a combination of the general formula (AN-2) and the general formula (AN-5-1), a combination of the general formula (AN-2) and the general formula (AN-5-2), a combination of the general formula (AN-2), the general formula (AN-5-1), and the general formula (AN-5-2), a combination of the general formula (AN-3) and the general formula (AN-4), a combination of the general formula (AN-3) and the general formula (AN-5-1), a combination of the general formula (AN-3) and the general formula (AN-5-2), a combination of the general formula (AN-3), the general formula (AN-5-1), and the general formula (AN-5-2), a combination of the general formula (AN-4) and the general formula (AN-5-1), a combination of the general formula (AN-4) and the general formula (AN-5-2), a combination of the general formula (AN-4), the general formula (AN-5-1), and the general formula (AN-5-2), a combination of the general formula (AN-5-1) and the general formula (AN-5-2), a combination of the general formula (AN-2), the general formula (AN-3), and the general formula (AN-4), a combination of the general formula (AN-2), the general formula (AN-3), and the general formula (AN-5-1), a combination of the general formula (AN-2), the general formula (AN-3), and the general formula (AN-5-2), a combination of the general formula (AN-2), the general formula (AN-3), the general formula (AN-5-1), and the general formula (AN-5-2), a combination of the general formula (AN-2), the general formula (AN-4), and the general formula (AN-5-1), a combination of the general formula (AN-2), the general formula (AN-4), and the general formula (AN-5-2), a combination of the general formula (AN-2), the general formula (AN-4), the general formula (AN-5-1), and the general formula (AN-5-2), a combination of the general formula (AN-3), the general formula (AN-4), and the general formula (AN-5-1), a combination of the general formula (AN-3), the general formula (AN-4), and the general formula (AN-5-2), a combination of the general formula (AN-3), the general formula (AN-4), the general formula (AN-5-1), and the general formula (AN-5-2), a combination of the general formula (AN-2), the general formula (AN-3), the general formula (AN-4), and the general formula (AN-5-1), a combination of the general formula (AN-2), the general formula (AN-3), the general formula (AN-4), and the general formula (AN-5-2), and a combination of the general formula (AN-2), the general formula (AN-3), the general formula (AN-4), the general formula (AN-5-1), and the general formula (AN-5-2).

Alternatively, in the first embodiment, the first reference embodiment, and the second reference embodiment, the liquid crystal composition configuring the liquid crystal layer may have a configuration of at least containing a mixture of an electrically negative alkenyl compound and an electrically neutral alkenyl compound. Herein, the electrically negative alkenyl compound can be defined as a compound which contains an alkenyl group and has negative dielectric anisotropy, and the electrically neutral alkenyl compound can be defined as a compound which contains an alkenyl group and does not have dielectric anisotropy.

In the first embodiment containing the preferred embodiments described above, there may be a configuration in which the compound (compound after the alignment process) obtained by crosslinking the polymer compounds (compound before the alignment process) with each other, is configured to have the first side chain, the second side chain, and a main chain supporting the first side chain and the second side chain with respect to the substrates, each of the first side chain and the second side chain is bonded to the main chain, and pretilt is applied to the liquid crystal molecules along the first side chain or by being interposed between the first side chains. A conceptual diagram of such a structure is shown in FIG. 1A, and in the following description, the first side chain may be shown as "L" and the second side chain may be shown as "A". Alternatively, in the first reference embodiment containing the preferred embodiments described above, there may be a configuration in which the compound (compound after the alignment process) obtained by deforming the polymer compounds (compound before the alignment process), is configured to have the first side chain, the second side chain, and a main chain supporting the first side chain and the second side chain with respect to the substrates, each of the first side chain and the second side chain is bonded to the main chain, and pretilt is applied to the liquid crystal molecules along the first side chain or by being interposed between the first side chains. Alternatively, in the second reference embodiment containing the preferred embodiments described above, there may be a configuration in which the compound obtained by emitting the energy ray to the polymer compound is configured to have the first side chain, the second side chain, and a main chain supporting the first side chain and the second side chain with respect to the substrates, each of the first side chain and the second side chain is bonded to the main chain, and pretilt is applied to the liquid crystal molecules along the first side chain or by being interposed between the first side chains.

Figure 1B:
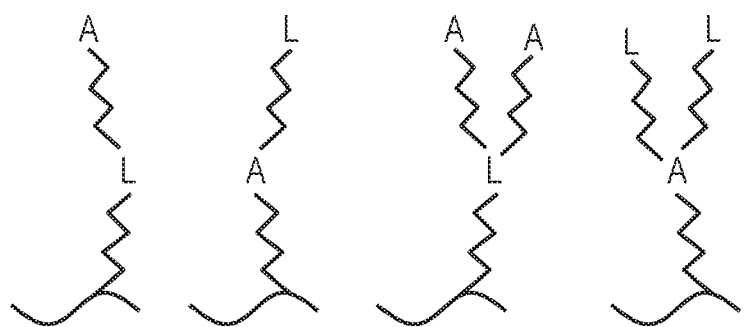

Alternatively, in the first embodiment containing the preferred embodiments described above, there may be a configuration in which the compound (compound after the alignment process) obtained by crosslinking the polymer compounds (compound before the alignment process) with each other, is configured to have the first side chain, the second side chain, and a main chain supporting the first side chain and the second side chain with respect to the substrates, the first side chain and the second side chain are bonded to each other, the first side chain or the second side chain is bonded to the main chain, and pretilt is applied to the liquid crystal molecules along the first side chain or by being interposed between the first side chains. A conceptual diagram of such a structure is shown in FIG. 1B. Alternatively, in the first reference embodiment containing the preferred embodiments described above, there may be a configuration in which the compound (compound after the alignment process) obtained by deforming the polymer compounds (compound before the alignment process), is configured to have the first side chain, the second side chain, and a main chain supporting the first side chain and the second side chain with respect to the substrates, the first side chain and the second side chain are bonded to each other, the first side chain or the second side chain is bonded to the main chain, and pretilt is applied to the liquid crystal molecules along the first side chain or by being interposed between the first side chains. Alternatively, in the second reference embodiment containing the preferred embodiments described above, there may be a configuration in which the compound obtained by emitting the energy ray to the polymer compound is configured to have the first side chain, the second side chain, and a main chain supporting the first side chain and the second side chain with respect to the substrates, the first side chain and the second side chain are bonded to each other, the first side chain or the second side chain is bonded to the main chain, and pretilt is applied to the liquid crystal molecules along the first side chain or by being interposed between the first side chains.

In those cases, there may be a configuration in which the first side chain is formed of $(A_{11})_{n11}$-$R_{SD11}$-$(A_{12})_{n12}$-$R_{SD12}$-$R_{SD13}$ (SD-1), $A_{11}$ and $A_{12}$ each are —$CH_2$—, —O—, —COO—, or —OCO—, n11 and n12 each are 0 or 1, $R_{SD11}$ is an alkyl group having 0 to 40 carbon atoms or a fluoroalkyl group having 1 to 40 carbon atoms, $R_{SD12}$ is a divalent organic group having at least one ring structure, and $R_{SD13}$ is a monovalent group including a hydrogen atom, a halogen atom, an alkyl group, an alcoxy group, or a carbonate group, or a derivative thereof. $A_{11}$ is a part which bonds $R_{SD11}$ to the other part, and $A_{12}$ is a part which causes $R_{SD11}$ and $R_{SD12}$ bond to each other. $R_{SD11}$ functions as a so-called spacer. In addition, $R_{SD12}$ is a part which interacts with the liquid crystal molecules, in detail, may be configured to have a mesogenic group, may exhibit a liquid crystal property or may not exhibit a liquid crystal property, or has the same structure as that of the liquid crystal molecules, or has the similar structure as that of the liquid crystal molecules, and a steroid derivative, a cholesterol derivative, biphenyl, triphenyl, or naphthalene can be used as the more specific structure thereof. $R_{SD13}$ is a terminal group.

In addition, in those cases, there may be a configuration in which the second side chain is formed of $(A_{21})_{n21}$-$R_{SD21}$-$(A_{22})_{n22}$-$R_{SD22}$—$R_{SD23}$ (SD-2), $A_{21}$ and $A_{22}$ each are —$CH_2$—, —O—, —COO—, or —OCO—, n21 and n22 each are 0 or 1, $R_{SD21}$ is an alkyl group having 0 to 40 carbon atoms or a fluoroalkyl group having 1 to 40 carbon atoms, $R_{SD22}$ is a divalent group having at least one kind of structures selected from a group including vinyl, acryloyl, methacryloyl, chalcone, cinnamate, cinnamoyl, coumarin, maleimide, benzophenone, norbornene, oryzanol and chitosan, or an ethynylene group, and $R_{SD23}$ is a monovalent group including a hydrogen atom, a halogen atom, an alkyl group, an alcoxy group, or a carbonate group, or a derivative thereof. $A_{21}$ is a part which bonds $R_{SD21}$ to the other part, and $A_{22}$ is a part which causes $R_{SD21}$ and $R_{SD22}$ to bond to each other. $R_{SD21}$ functions as a so-called spacer. $R_{SD22}$ is a reactive component and $R_{SD23}$ is a terminal group.

In various preferred configurations of the first embodiment, the first reference embodiment, and the second reference embodiment described above, the main chain may have a configuration of having a polyimide structure (that is, the main chain contains imide bond in a recurring unit), having a polysiloxane structure, or being formed of polyamic acid.

In the first embodiment, the first reference embodiment, and the second embodiment having the preferred embodiments and configurations described above, an alignment regulation unit formed of slit portions formed on an electrode or protrusions provided on the substrate may be provided. Alternatively, the alignment regulation unit formed of concavo-convex portions formed on the electrode may be provided. Surface roughness Ra of the first alignment film may be equal to or less than 1 nm, or the surface roughness Ra of at least one film of the pair of alignment films may be equal to or less than 1 nm. Herein, the surface roughness Ra is regulated based on JIS B 0601:2001.

In the first embodiment, the first reference embodiment, and the second embodiment having the preferred embodiments and configurations described above, the second alignment film may be formed of the polymer compound (compound before the alignment process) configuring the first alignment film, or the pair of alignment films may have the same composition with each other. Herein, as long as they is configured with the polymer compound (compound before the alignment process) regulated in the first embodiment, the first reference embodiment, and the second reference embodiment, the pair of alignment films may have a configuration of having compositions different from each other, or the second alignment film may have a configuration of being formed of the polymer compound which is different from the polymer compound (compound before the alignment process) configuring the first alignment film. The polymer compound (compound after the alignment process) may have a structure of arranging the liquid crystal molecules in a predetermined direction with respect to the pair of substrates. In addition, the pair of substrates may be configured with the substrate including the pixel electrode and the substrate including the counter electrode.

Content of a polymer compound precursor (which will be described later) as the compound before the alignment process or the compound after the alignment process in the alignment film material or in the alignment films, is preferably equal to or more than 1% by mass and equal to or less than 30% by mass, and more preferably equal to or more than 3% by mass and equal to or less than 10% by mass. A photopolymerization initiator may be mixed to the alignment film material, if necessary.

Description of Main Chain

Hereinafter, the main chain configuring the polymer compound (the compound before the alignment process or the compound after the alignment process) will be described.

The compound before the alignment process preferably has a structure with high heat resistance as the main chain. Accordingly, the liquid crystal display (liquid crystal display element) is exposed to a high temperature environment, since the compound after the alignment process in the alignment film maintains the alignment regulation ability with respect to the liquid crystal molecules, the display property such as contrast is maintained in an excellent manner with the response property, and the reliability is secured. Herein, as described above, the main chain preferably contains the imide bond in the recurring unit, for example. A polymer compound having a polyimide structure represented by a formula (1) is used as the compound before the alignment process containing the imide bond in the main chain, for example. The polymer compound having the polyimide structure represented by the formula (1) may be configured with one kind of the polyimide structures represented by the formula (1), may contain a plurality of kinds thereof communicated with each other randomly, or may have another structure other than the structure represented by the formula (1).

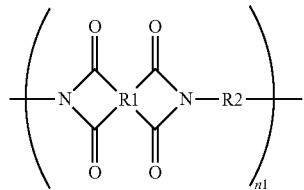

Herein, R1 is a quadrivalent organic group, R2 is a divalent organic group, and n1 is an integer equal to or greater than 1.

As long as it is a quadrivalent or divalent group configured by containing carbon, the components of the R1 and R2 of the formula (1) are arbitrarily set, but crosslinkable functional group as the second side chain is preferably contained in any one of the R1 and R2. This is because the sufficient alignment regulation ability is easily obtained in the compound after the alignment process.

In a case where the polymer compound precursor as the compound before the alignment process has the polyimide structure represented by the formula (1), polyamic acid can be used as the polymer compound precursor. The polyamic acid as the polymer compound precursor is for example, synthesized by causing a diamine compound and tetracarboxylic dianhydride to react with each other. At least one of the diamine compound and tetracarboxylic dianhydride used herein has the crosslinkable functional group. Examples of the diamine compound include compounds having the crosslinkable functional group represented by a formula (A-1) to a formula (A-15), and examples of tetracarboxylic dianhydride include compounds having the crosslinkable functional group represented by a formula (a-1) to a formula (a-10).

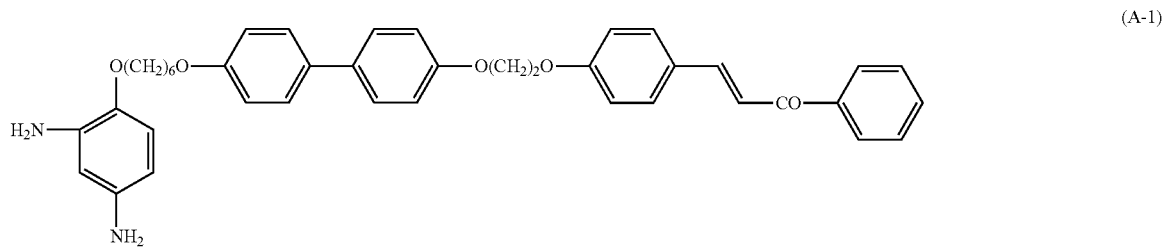

(A-1)

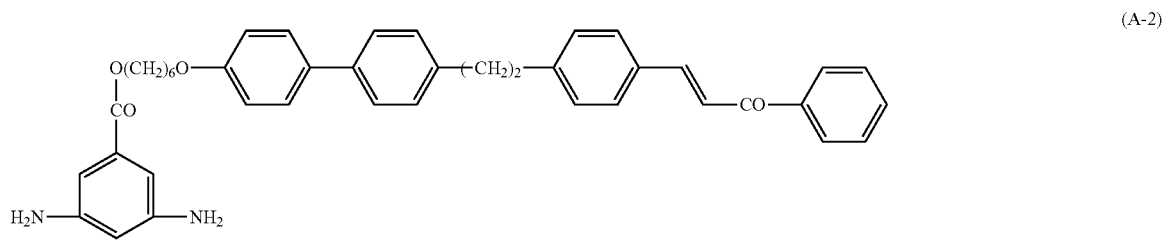

(A-2)

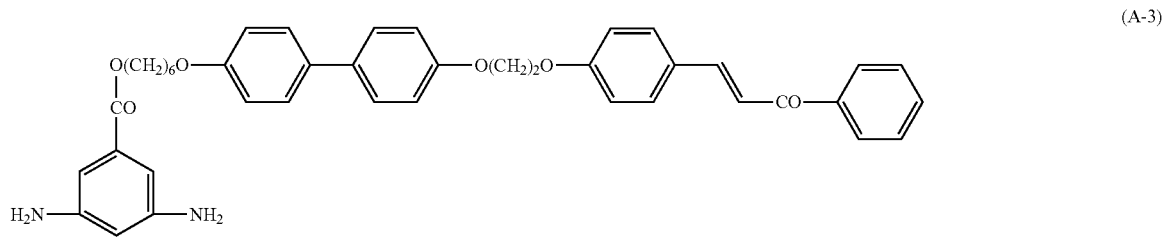

(A-3)

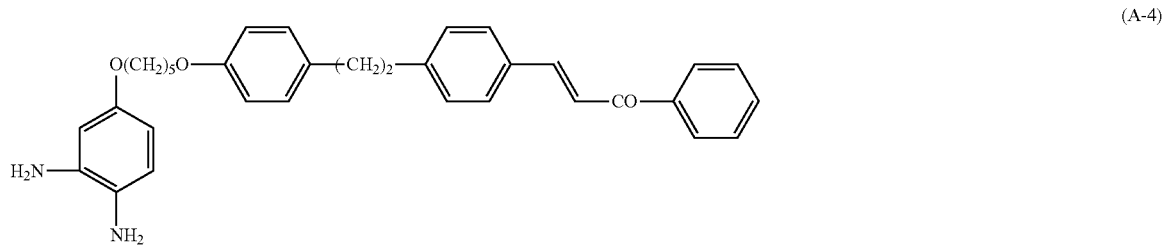

(A-4)

-continued
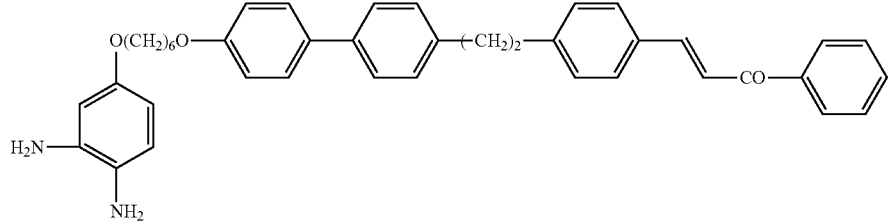
(A-5)
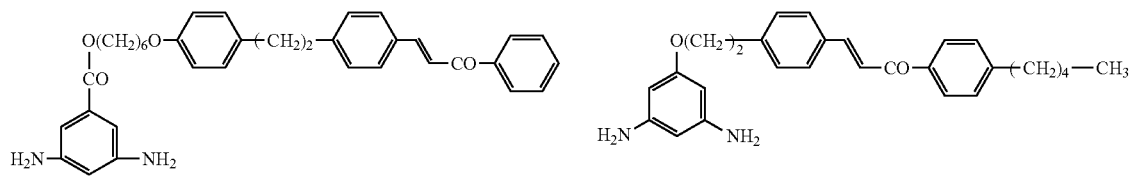
(A-6) (A-7)
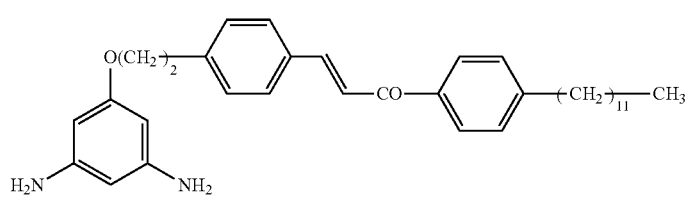
(A-8)
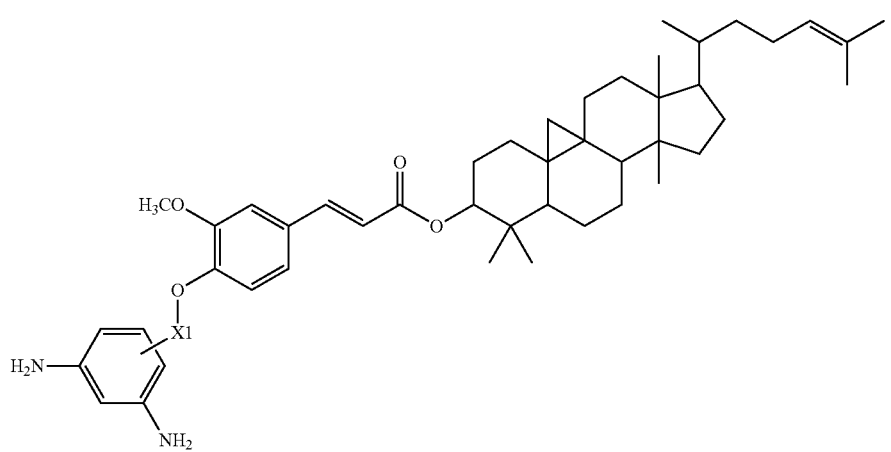
(A-9)
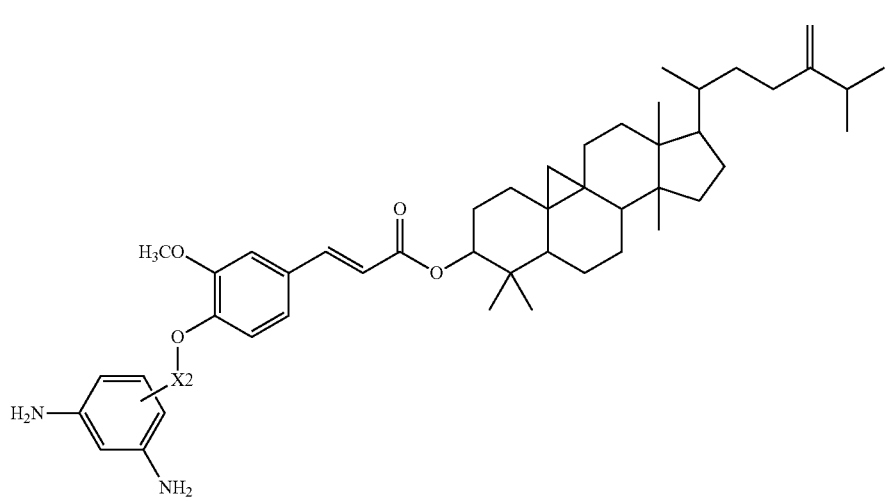
(A-10)

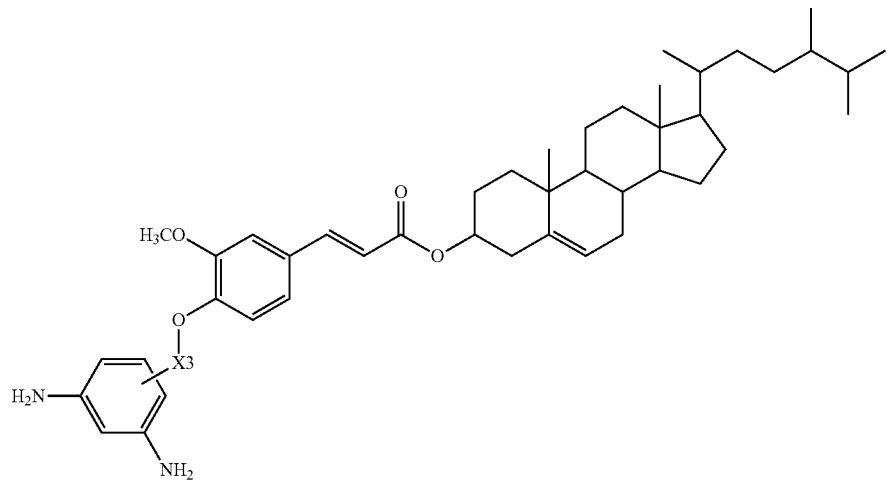
(A-11)
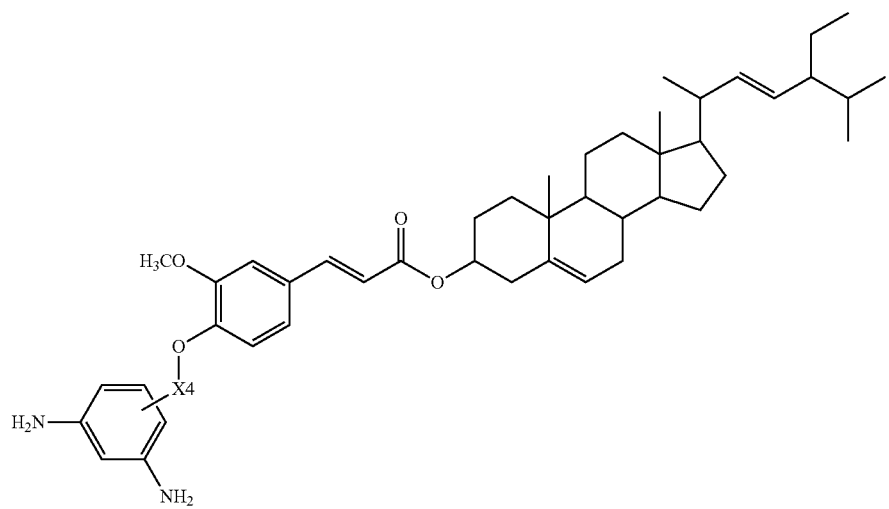
(A-12)
Herein, each of X1 to X4 is single bond or a divalent organic group.
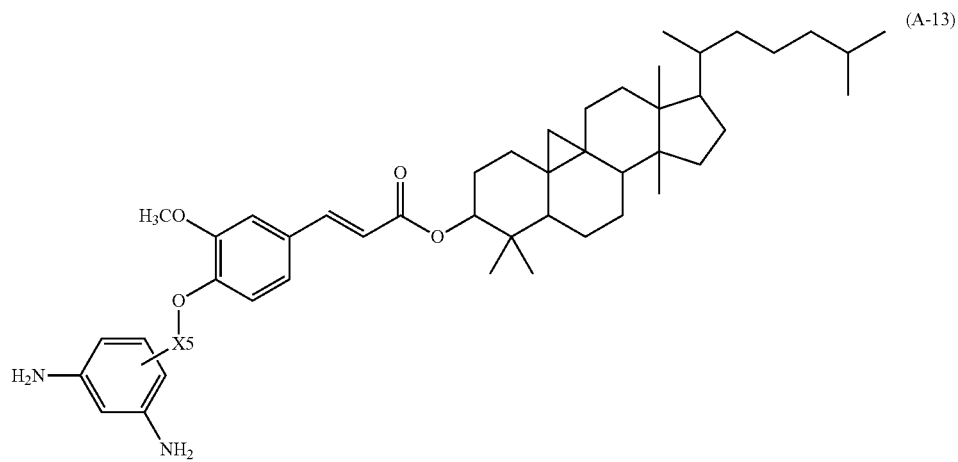
(A-13)

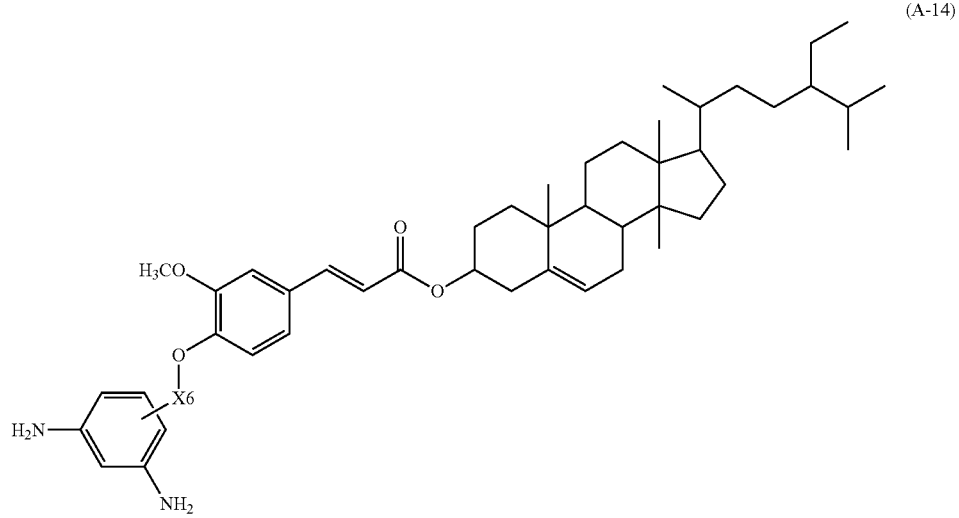
(A-14)
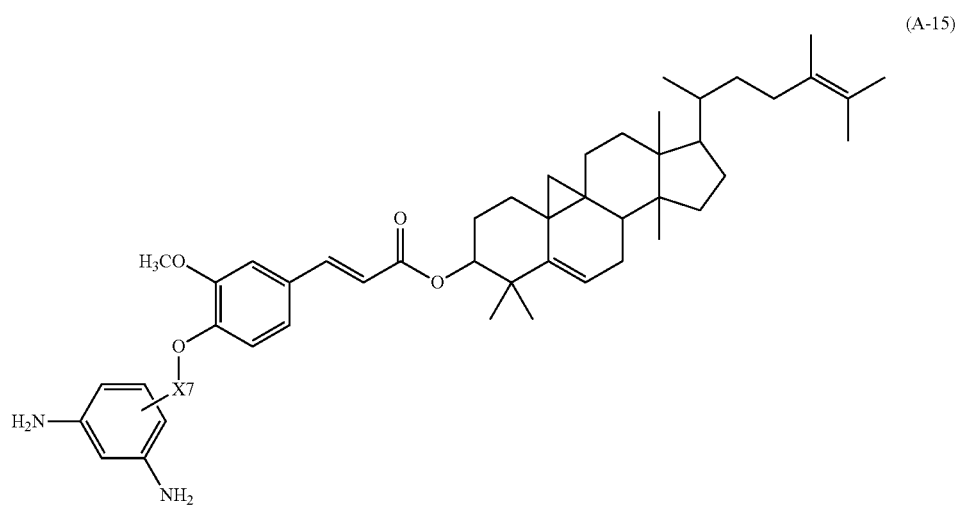
(A-15)
Herein, each of X5 to X7 is single bond or a divalent organic group.
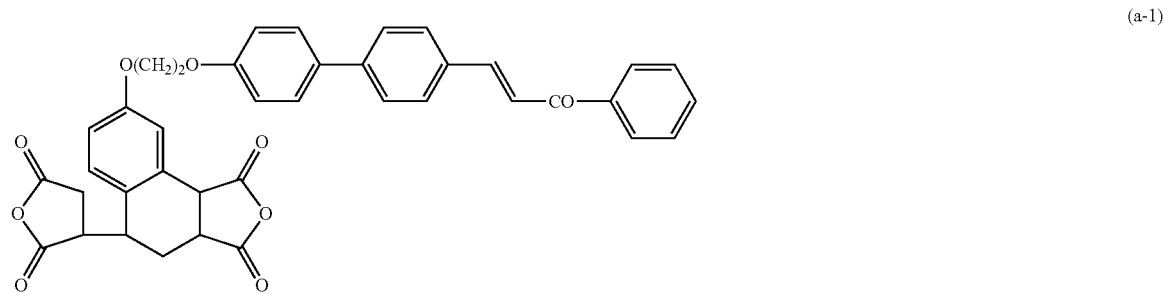
(a-1)

-continued
(a-2)
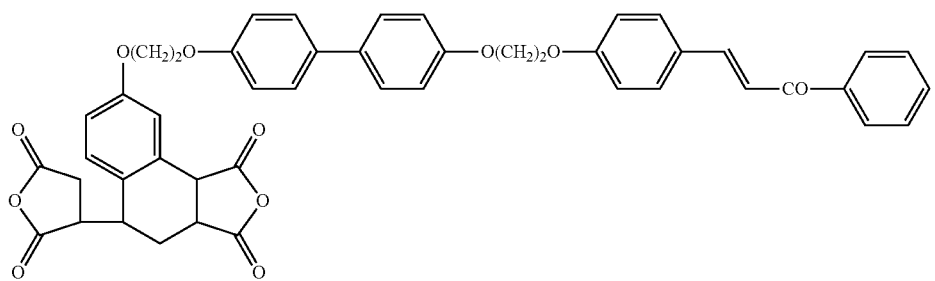
(a-3)
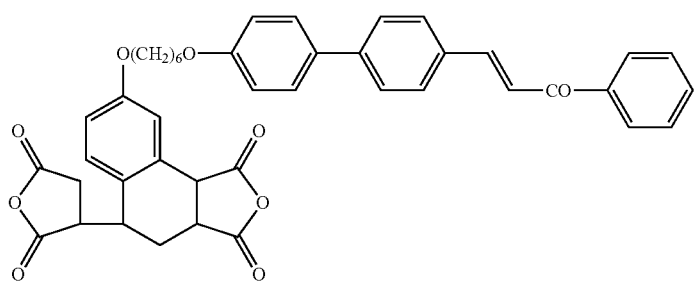
(a-4)
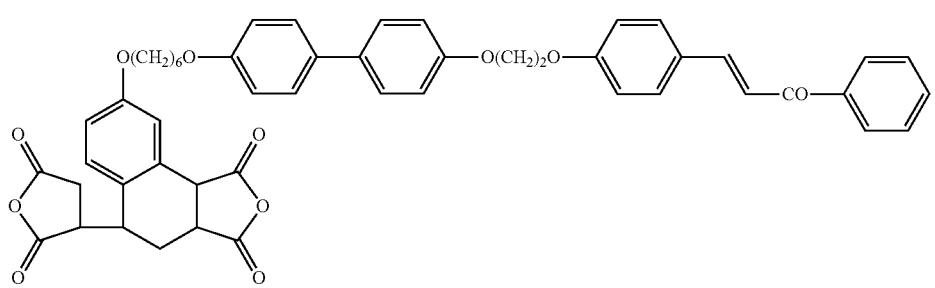
(a-5)
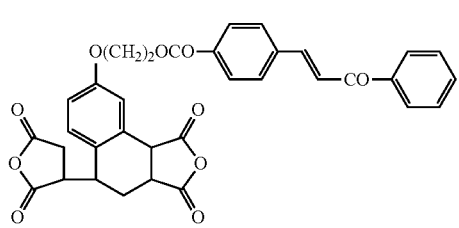
(a-6)
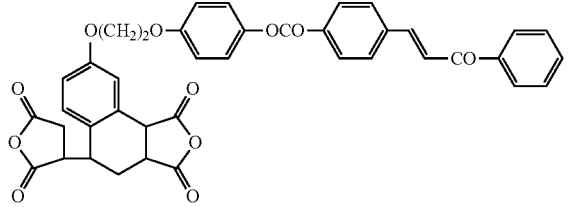
(a-7)
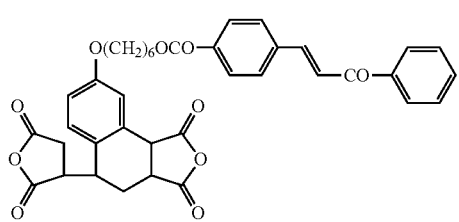
(a-8)
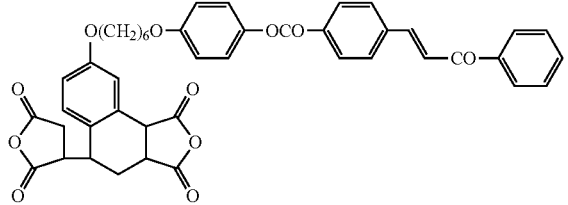
(a-9)
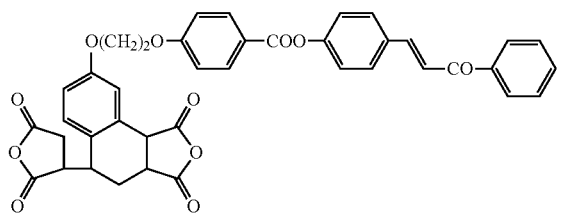
(a-10)
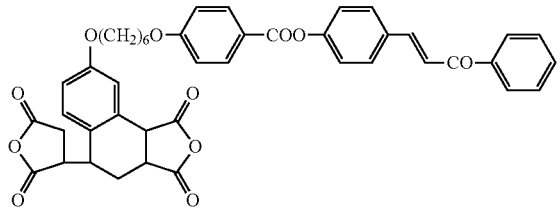

In a case of synthesizing the polyamic acid as the polymer compound precursor so that the compound before the alignment process has a vertical alignment inducing structure portion, compounds having the vertical alignment inducing structure portion represented by a formula (B-1) to a formula (B-36) as the diamine compound, or compounds having the vertical alignment inducing structure portion represented by a formula (b-1) to a formula (b-3) as tetracarboxylic dianhydride may be used in addition to the compounds having the crosslinkable functional group described above.

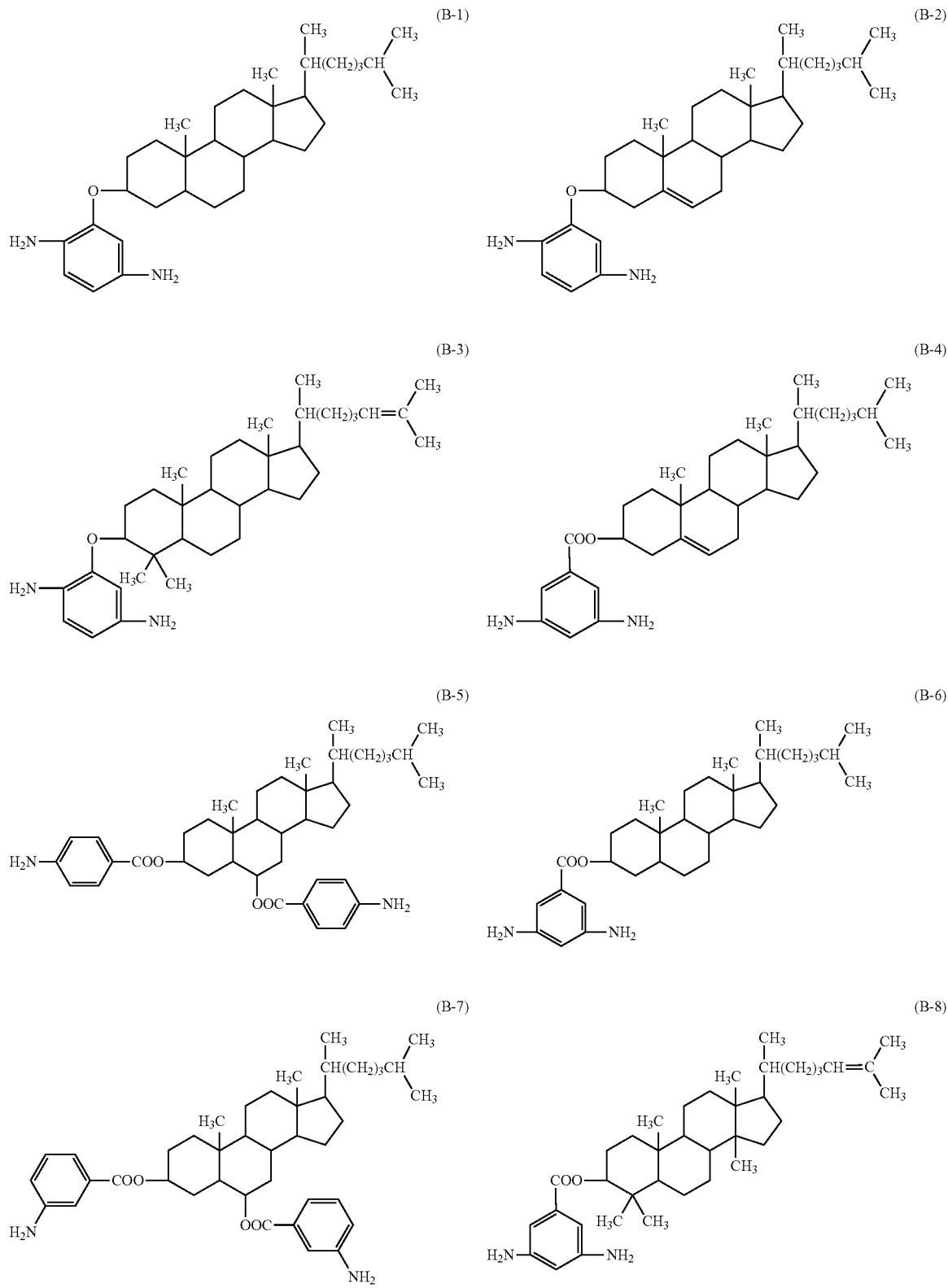

-continued
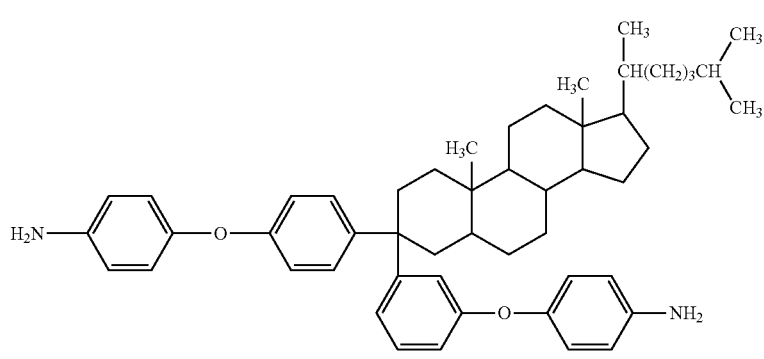
(B-9)
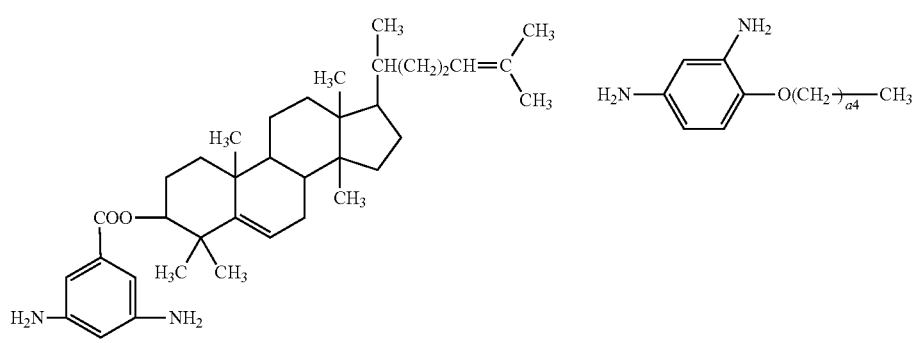
(B-10)       (B-11)
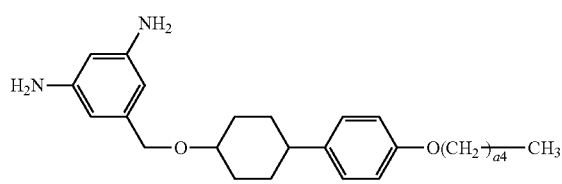
(B-12)
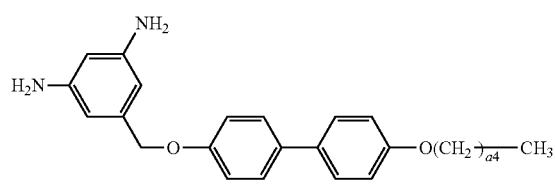
(B-13)
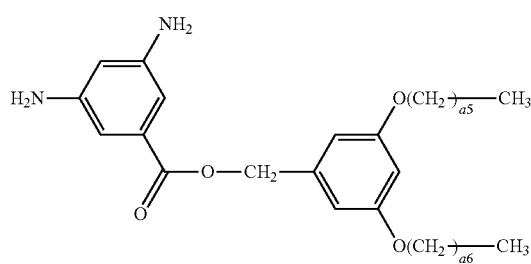
(B-14)
Herein, each of a4 to a6 is an integer equal to or greater than 0 and an integer equal to or less than 21.
-continued
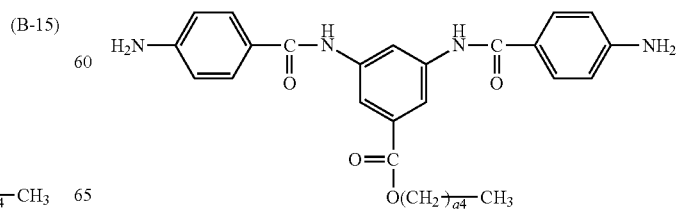
(B-15)       (B-16)

(B-17)
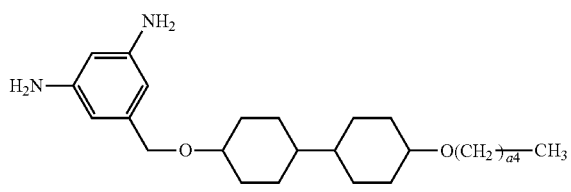
(B-23)
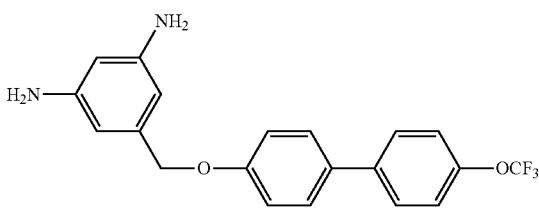
(B-18)
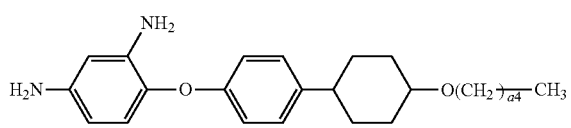
(B-24)
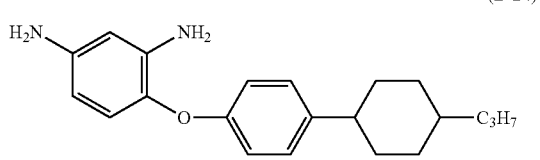
(B-19)
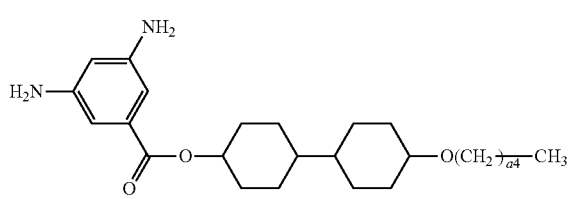
Herein, a4 is an integer equal to or greater than 0 and integer equal to or less than 21.
(B-25)
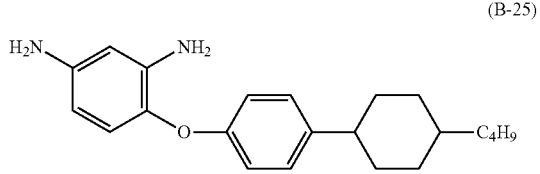
(B-20)
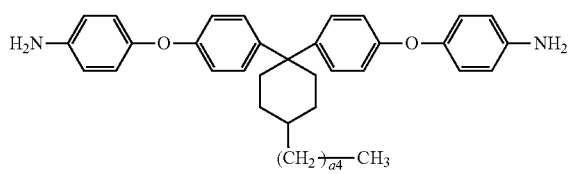
(B-26)
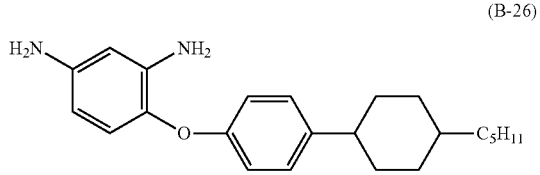
(B-21)
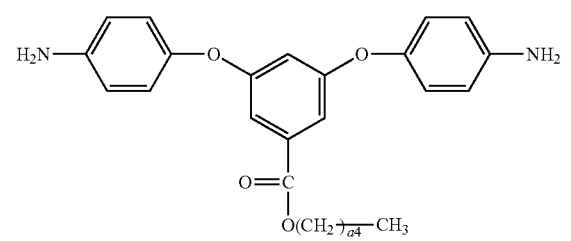
(B-27)
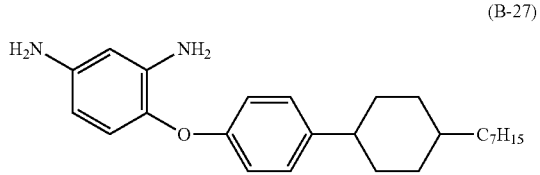
(B-22)
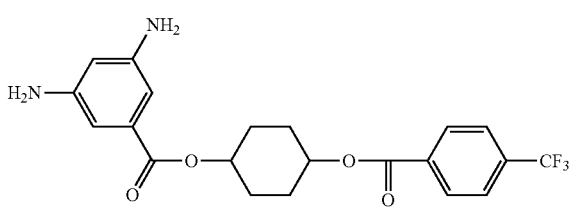
(B-28)
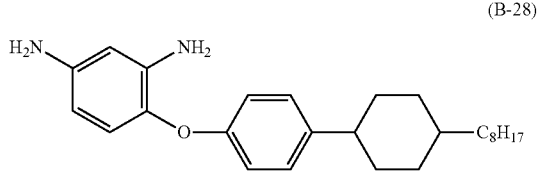
Herein, a4 is an integer equal to or greater than 0 and integer equal to or less than 21.

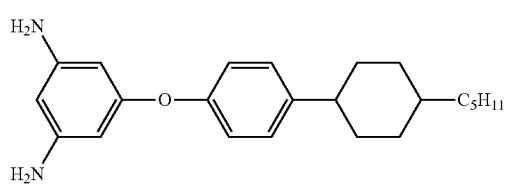
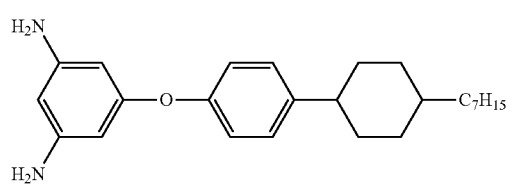
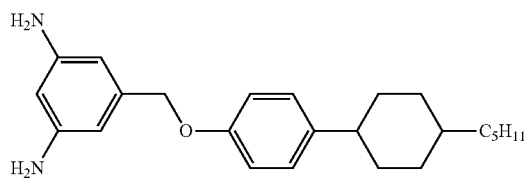
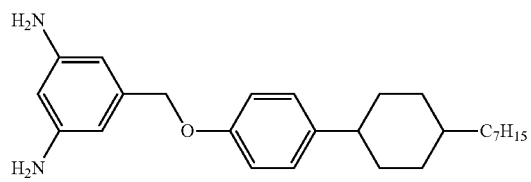
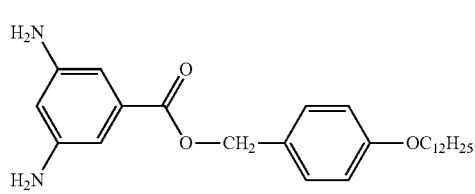
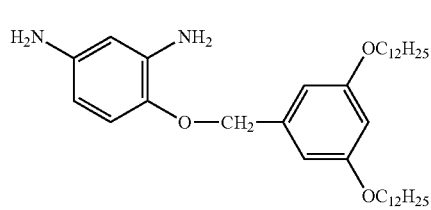
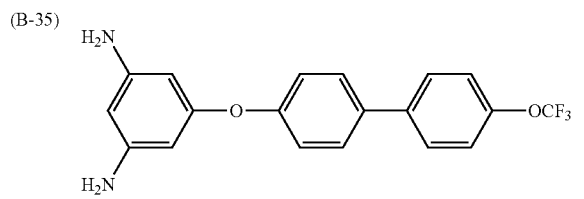
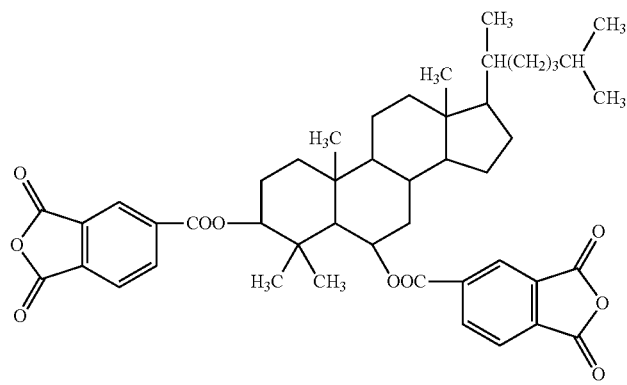
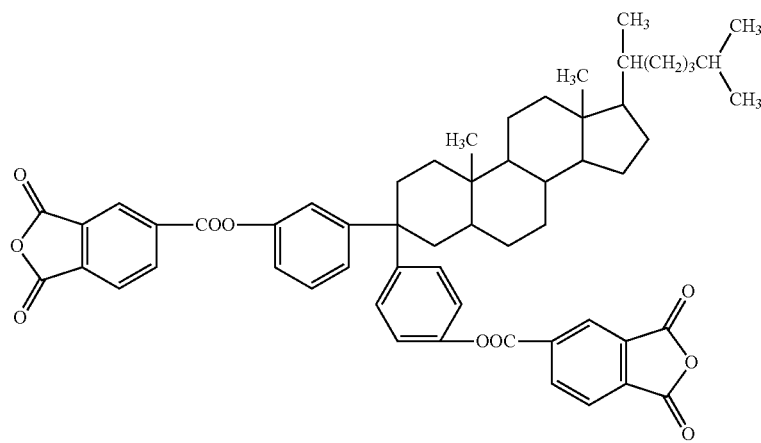

-continued
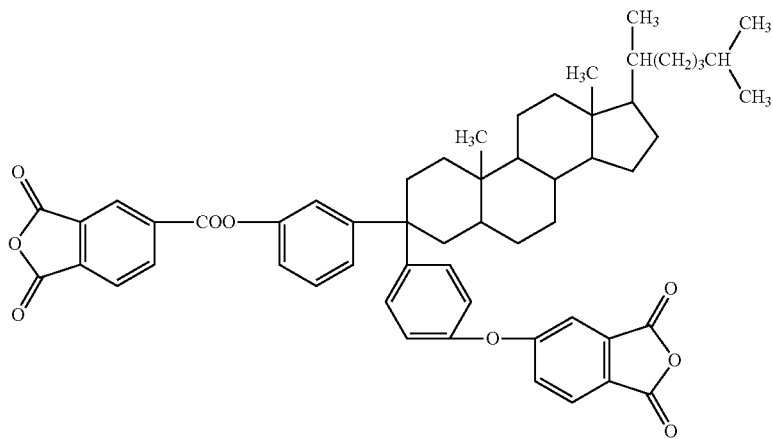
(b-3)
In a case of synthesizing the polyamic acid as the polymer compound precursor, compounds having a group represented by a formula (C-1) to a formula (C-20) may be used as the diamine compound in addition to the compounds having the crosslinkable functional group described above.
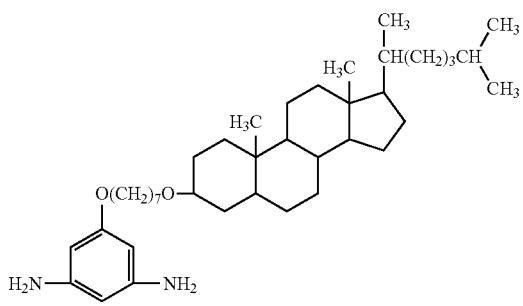
(C-1)
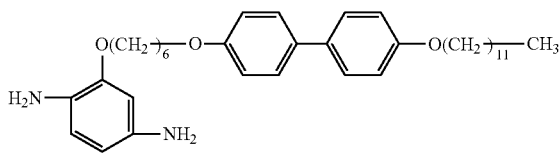
(C-2)
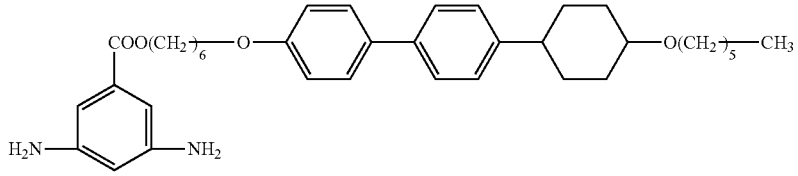
(C-3)
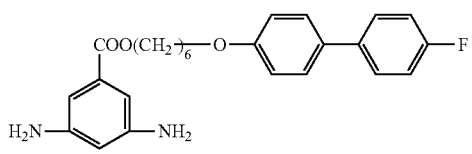
(C-4)
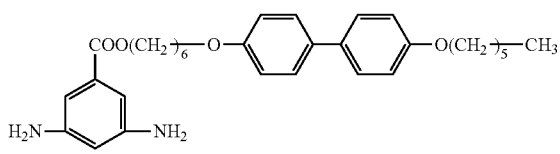
(C-5)
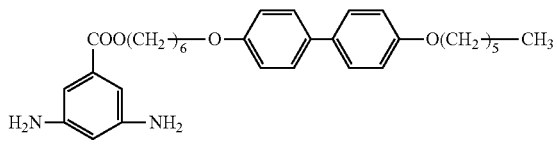
(C-6)
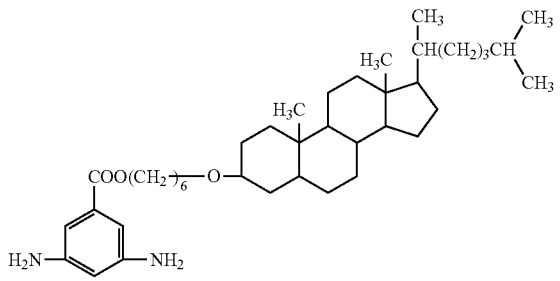
(C-7)

-continued
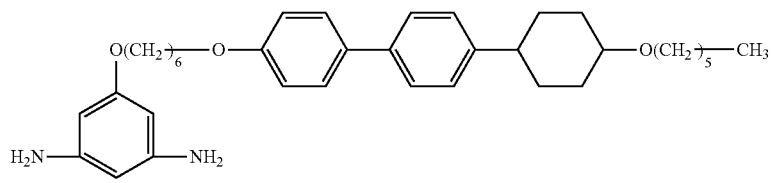
(C-8)
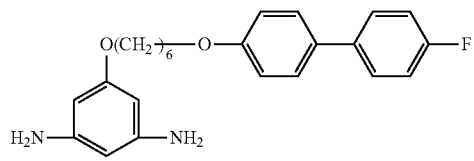
(C-9)
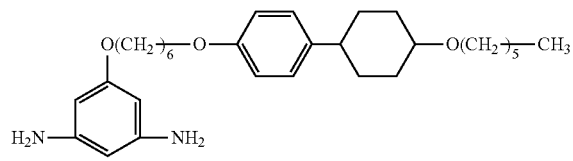
(C-10)
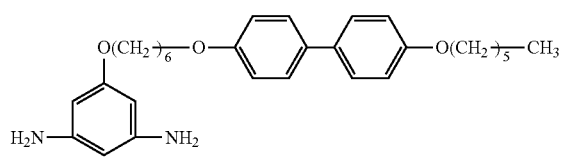
(C-11)
(C-12)
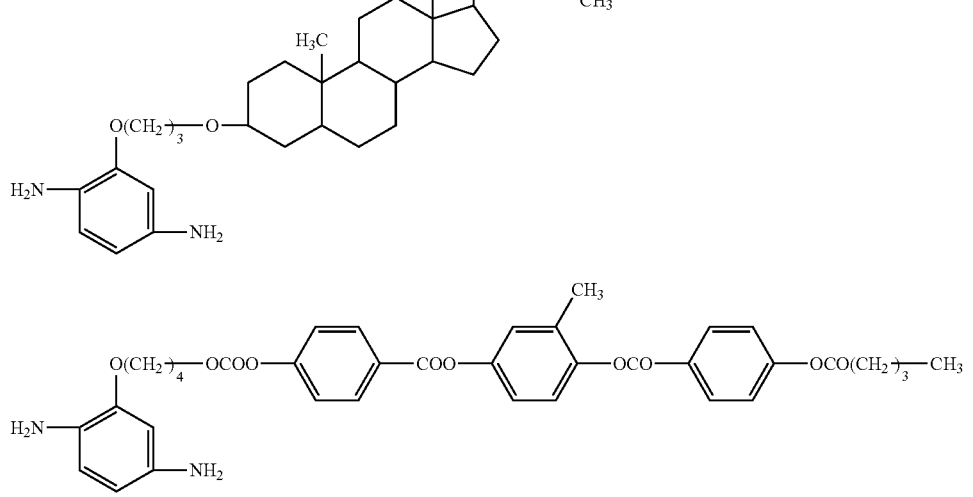
(C-13)
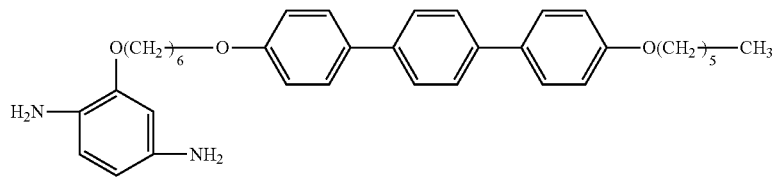
(C-14)
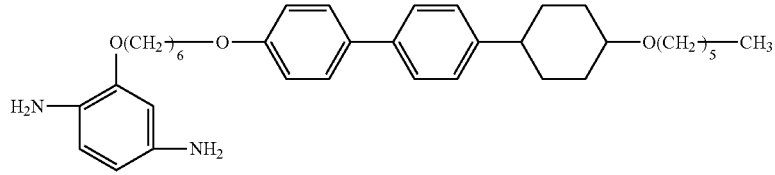
(C-15)
(C-16)

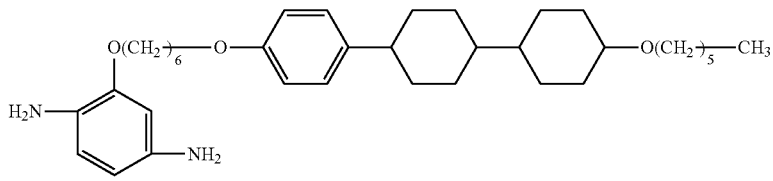
(C-17)
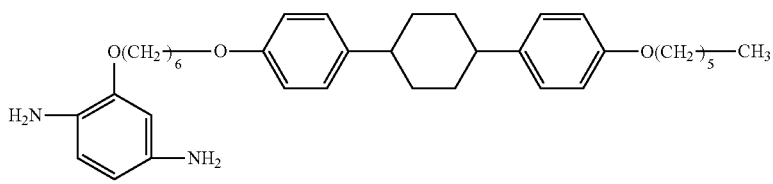
(C-18)
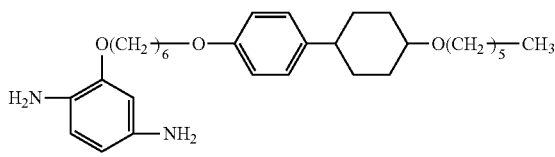
(C-19) (C-20)
Alternatively, in a case of synthesizing the polyamic acid as the polymer compound precursor, compounds having a group represented by a formula (D-1) to a formula (D-7) may be used as the diamine compound in addition to the compounds having the crosslinkable functional group described above.
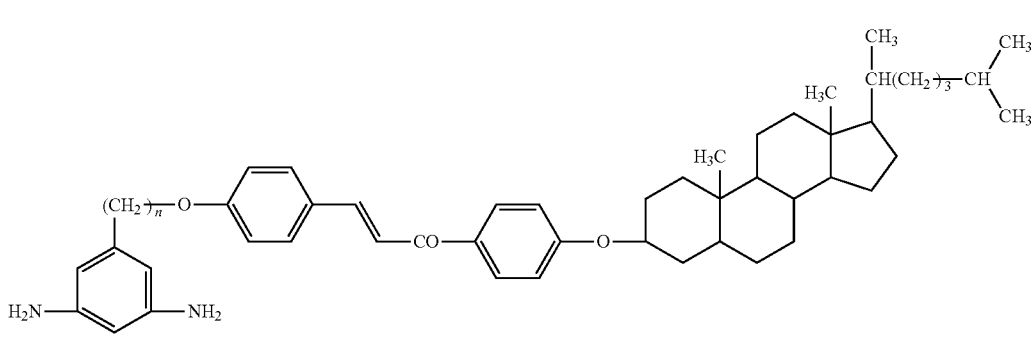
(D-1)
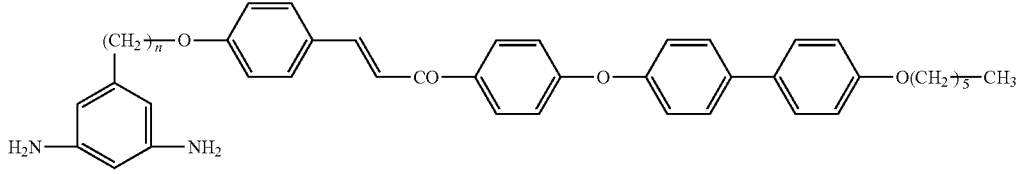
(D-2)
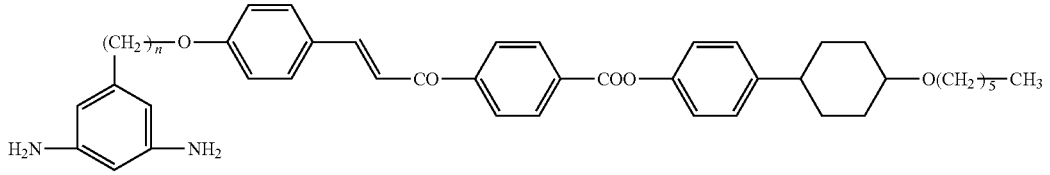
(D-3)
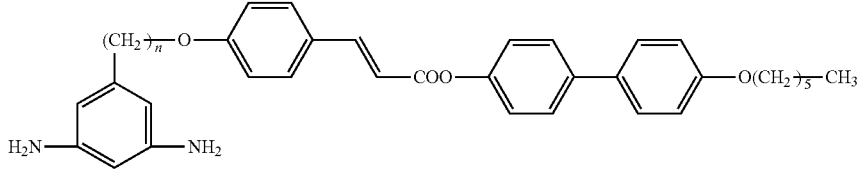
(D-4)

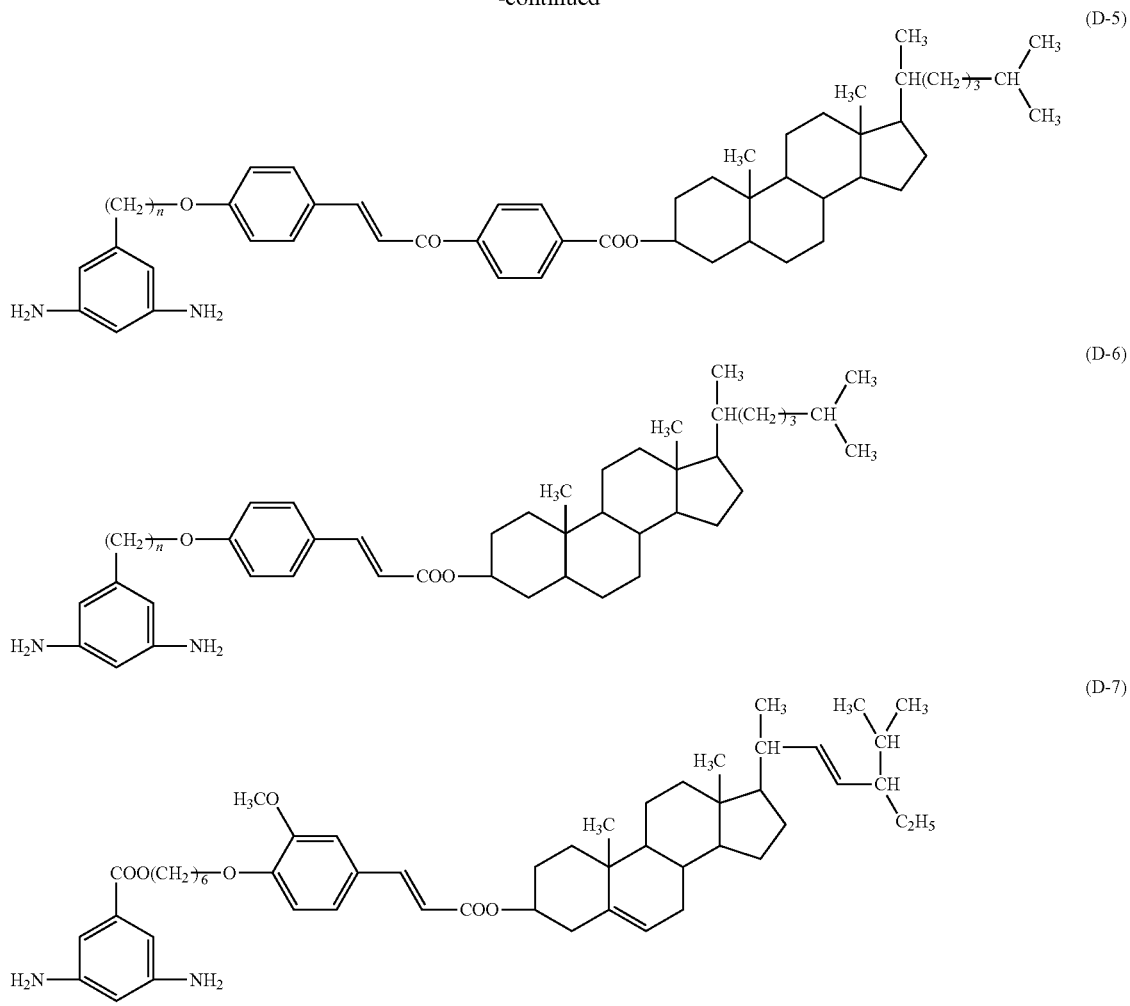

Herein, n is an integer equal to or greater than 3 and equal to or less than 20.

In a case of synthesizing the polyamic acid as the polymer compound precursor so that the compound before the alignment process has two kinds of structures of the structure containing the vertical alignment inducing structure portion or the structure containing the crosslinkable functional group as R2 of the formula (1), the diamine compound and tetracarboxylic dianhydride are selected as described below, for example. That is, at least one kind of the compounds including the crosslinkable functional group represented by the formula (A-1) to the formula (A-15), at least one kind of the compounds having the vertical alignment inducing structure portion represented by the formula (B-1) to the formula (B-36) and the formula (b-1) to the formula (b-3), and at least one kind of tetracarboxylic dianhydride represented by a formula (E-1) to a formula (E-28) are used. R1 and R2 of the formula (E-23) are each the same or different from an alkyl group, an alcoxy group, or a halogen atom, and the kind of the halogen atom is arbitrary.

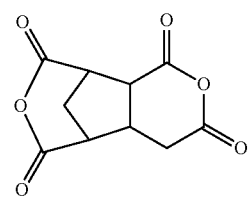

(E-1)

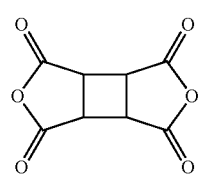

(E-2)

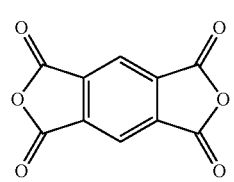

(E-3)

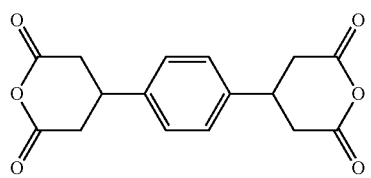
(E-4)
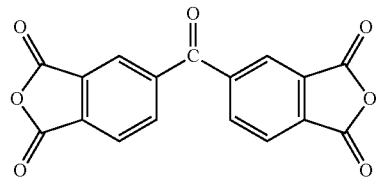
(E-5)
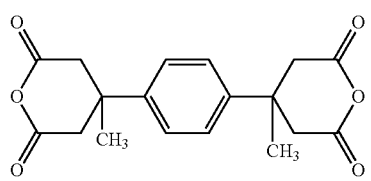
(E-6)
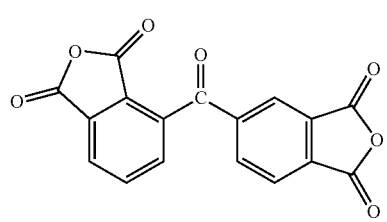
(E-7)
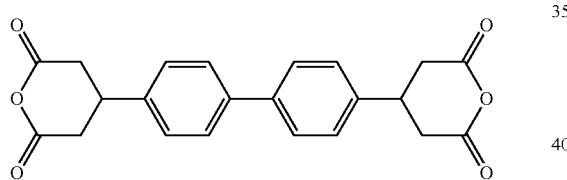
(E-8)
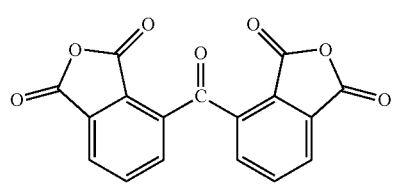
(E-9)
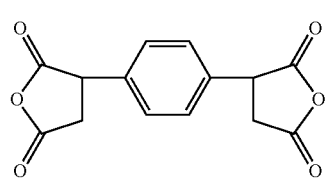
(E-10)
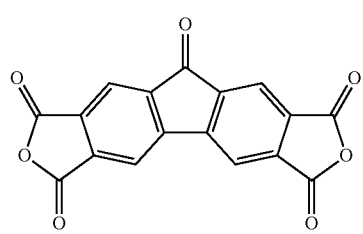
(E-11)
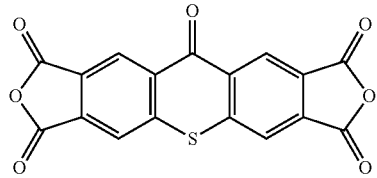
(E-12)
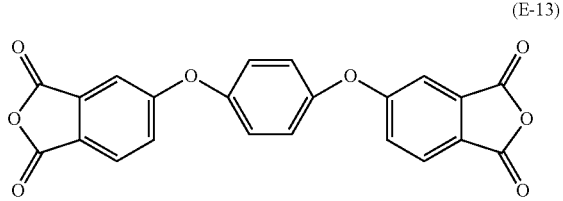
(E-13)
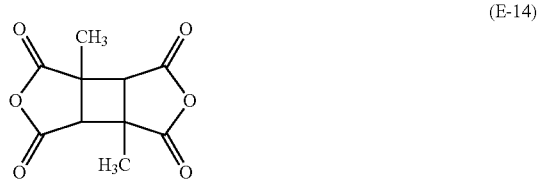
(E-14)
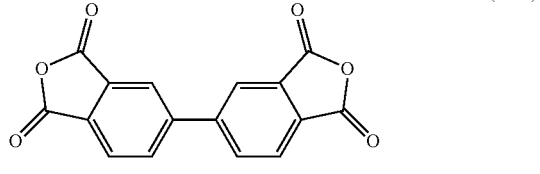
(E-15)
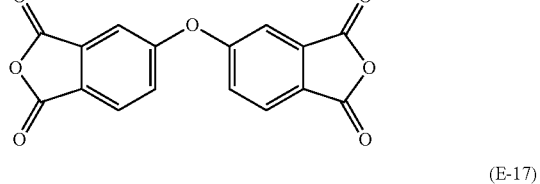
(E-16)
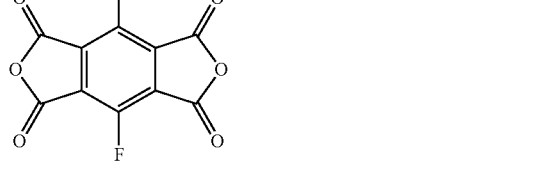
(E-17)
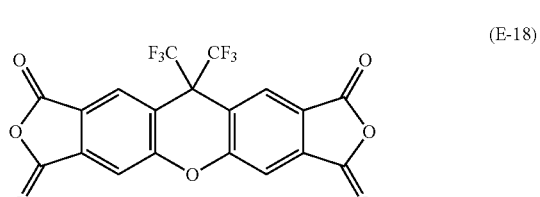
(E-18)
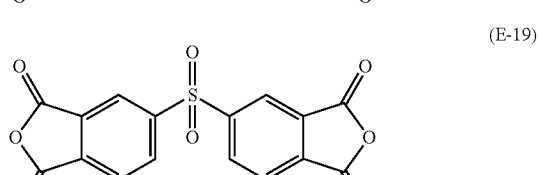
(E-19)

(E-20) 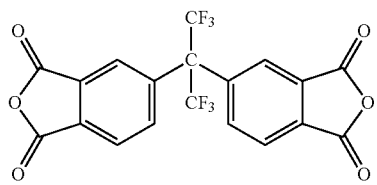

(E-21) 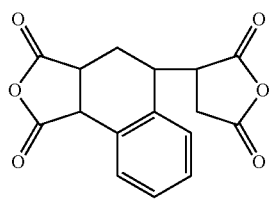

(E-22) 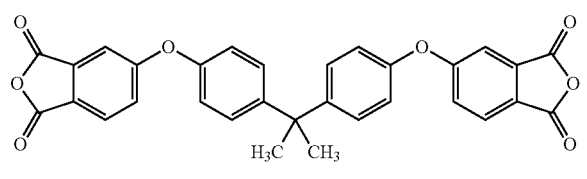

(E-23) 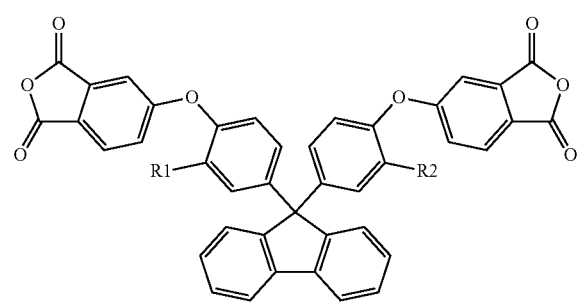

(E-24) 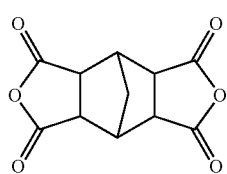

(E-25) 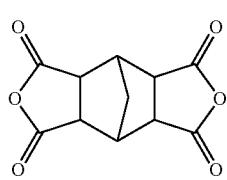

(E-26) 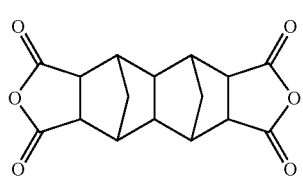

(E-27) 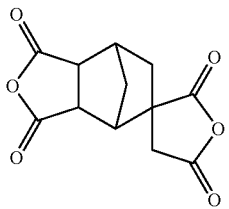

(E-28) 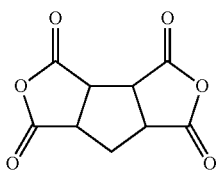

Herein, R1 and R2 each are an alkyl group, an alcoxy group, or a halogen atom.

In a case of synthesizing the polyamic acid as the polymer compound precursor so that the compound before the alignment process has two kinds of structures as R2 of the formula (1), the diamine compound and tetracarboxylic dianhydride are selected as described below, for example. That is, at least one kind of the compounds including the crosslinkable functional group represented by the formula (A-1) to the formula (A-15), at least one kind of the compounds represented by the formula (C-1) to the formula (C-20), and at least one kind of tetracarboxylic dianhydride represented by the formula (E-1) to the formula (E-28) are used.

Alternatively, in a case of synthesizing the polyamic acid as the polymer compound precursor so that the compound before the alignment process has two kinds of structures as R2 of the formula (1), the diamine compound and tetracarboxylic dianhydride are selected as described below, for example. That is, at least one kind of the compounds including the crosslinkable functional group represented by the formula (A-1) to the formula (A-15), at least one kind of the compounds represented by the formula (D-1) to the formula (D-7), and at least one kind of tetracarboxylic dianhydride represented by the formula (E-1) to the formula (E-28) are used.

The compound before the alignment process preferably has a structure (hereinafter, referred to as the "vertical alignment inducing structure portion") for aligning the liquid crystal molecules in a direction perpendicular to the substrate surface. This is because alignment regulation of all liquid crystal molecules can be performed, even though the alignment films do not contain the compound having the vertical alignment inducing structure portion (so-called general vertical alignment agent) in addition to the compound after the alignment process. In addition, the alignment film which can more uniformly exhibit the alignment regulation ability with respect to the liquid crystal layer is easily formed compared to the case of additionally containing the compound having the vertical alignment inducing structure portion. In the compound before the alignment process, the vertical alignment inducing structure portion may be contained in the main chain, contained in the second side chain, or contained in both thereof. In a case where the compound before the alignment process has the polyimide structure represented by the formula (1), it is preferable to contain two kinds of structures which are the structure (recurring unit) of containing the vertical alignment inducing structure portion as R2 and the structure (recurring unit) of containing the crosslinkable functional group as R2, from a viewpoint of availability. If the vertical alignment inducing structure portion is contained in the compound before the alignment process, it is also contained in the compound after the alignment process.

Examples of the vertical alignment inducing structure portion include an alkyl group having 10 or more carbon atoms, a halogenated alkyl group having 10 or more carbon atoms, an alcoxy group having 10 or more carbon atoms, a halogenated alcoxy group having 10 or more carbon atoms, and an organic group having a ring structure. Specifically, structures represented by a formula (11-1) to a formula (11-6) are used, for example, as the structure containing vertical alignment inducing structure portion. Herein, the structures represented by the formula (11-1) to the formula (11-6) may also function as the first side chain (L).

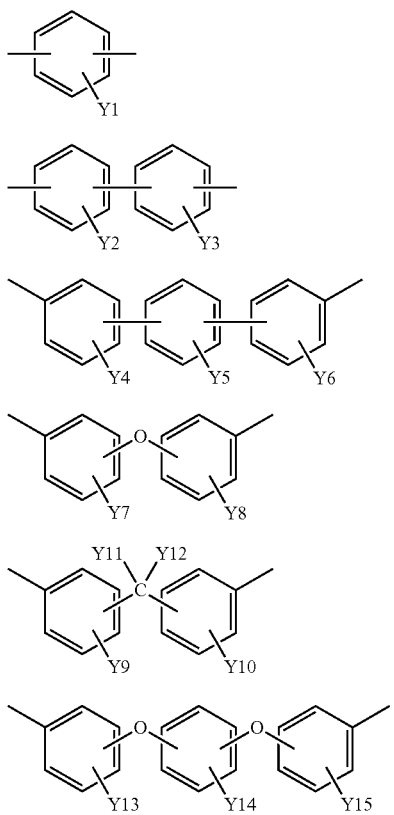

Herein, Y is an alkyl group having 10 or more carbon atoms, an alcoxy group having 10 or more carbon atoms, or a monovalent organic group having a ring structure. Each of Y2 to Y15 is an alkyl group having 10 or more carbon atoms, an alcoxy group having 10 or more carbon atoms, or a monovalent organic group having a ring structure, and each of at least one of Y2 and Y3, at least one of Y4 to Y6, at least one of Y7 to Y8, at least one of Y9 to Y12, and at least one of Y13 to Y15 is an alkyl group having 10 or more carbon atoms, an alcoxy group having 10 or more carbon atoms, or a monovalent organic group having a ring structure. Herein, Y11 and Y12 may be bonded to each other to form the ring structure.

Groups represented by a formula (12-1) to a formula (12-23) are used, for example, as the monovalent organic group having the ring structure as the vertical alignment inducing structure portion. Groups represented by a formula (13-1) to a formula (13-7) are used, for example, as the divalent organic group having the ring structure as the vertical alignment inducing structure portion. Herein, the structures represented by the formula (12-1) to the formula (12-23) and the formula (13-1) to the formula (13-7) may also function as the first side chain (L).

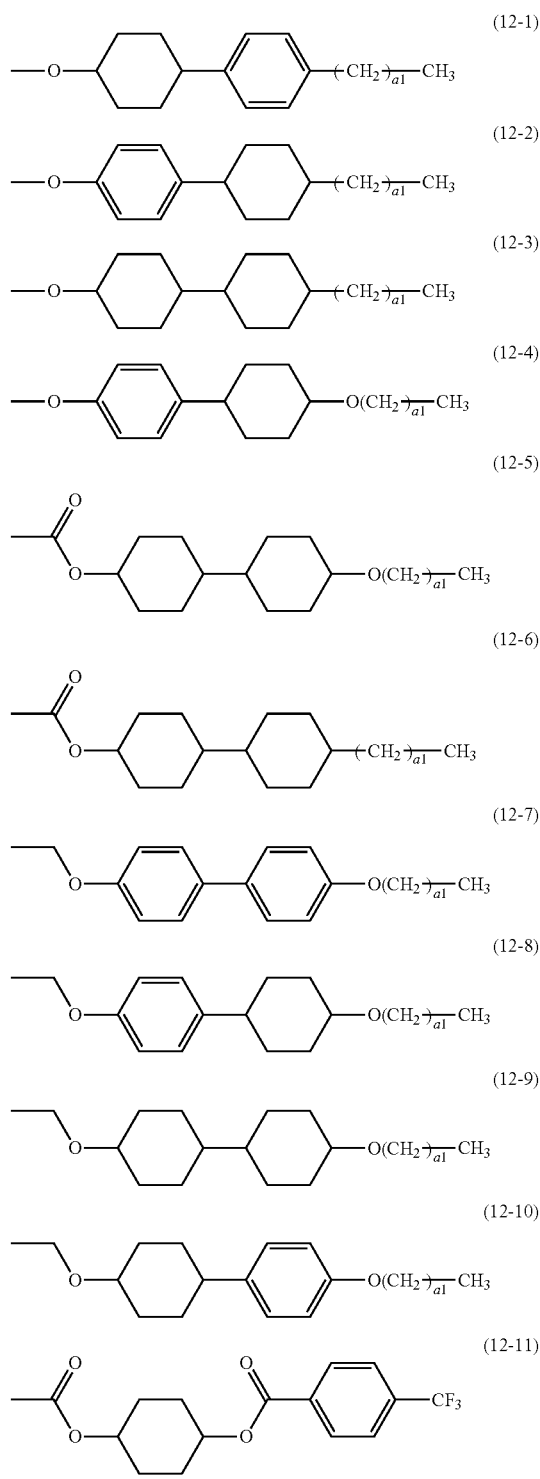

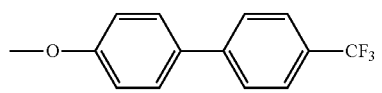
(12-12)
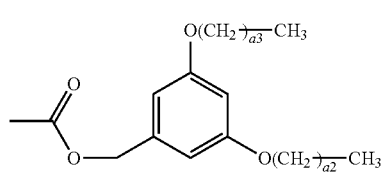
(12-13)
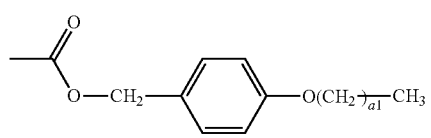
(12-14)
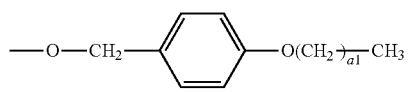
(12-15)
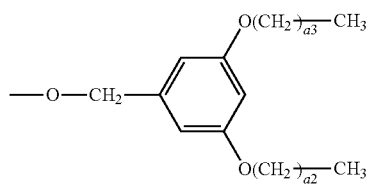
(12-16)
Herein, each of a1 to a3 is an integer equal to or greater than 0 and equal to or less than 21.
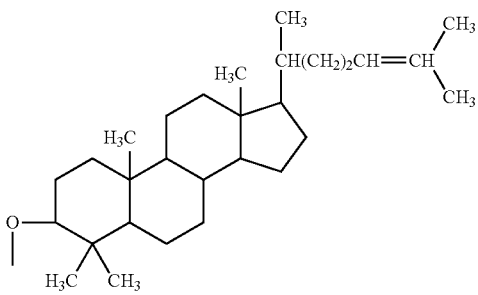
(12-17)
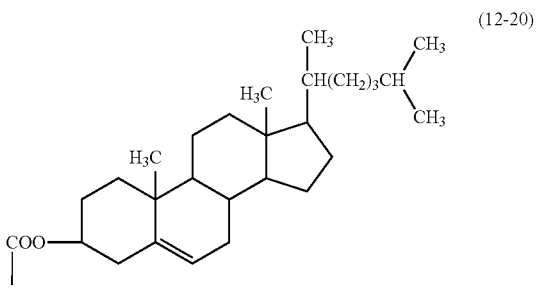
(12-18)
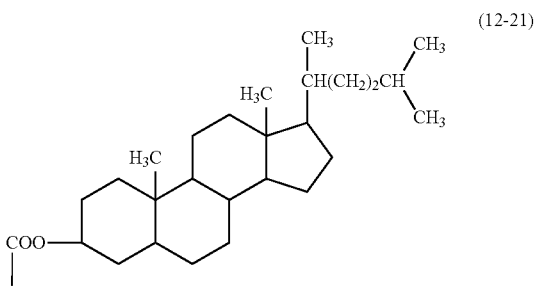
(12-19)
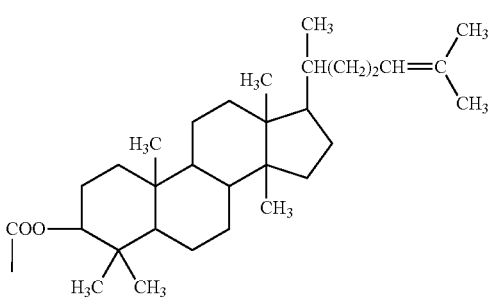
(12-20)
(12-21)
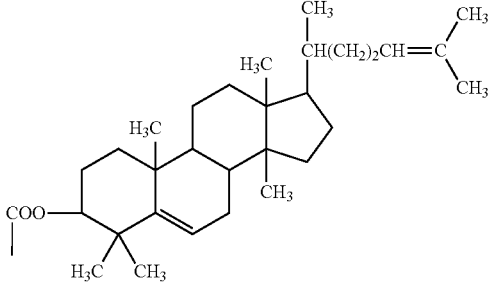
(12-22)
(12-23)

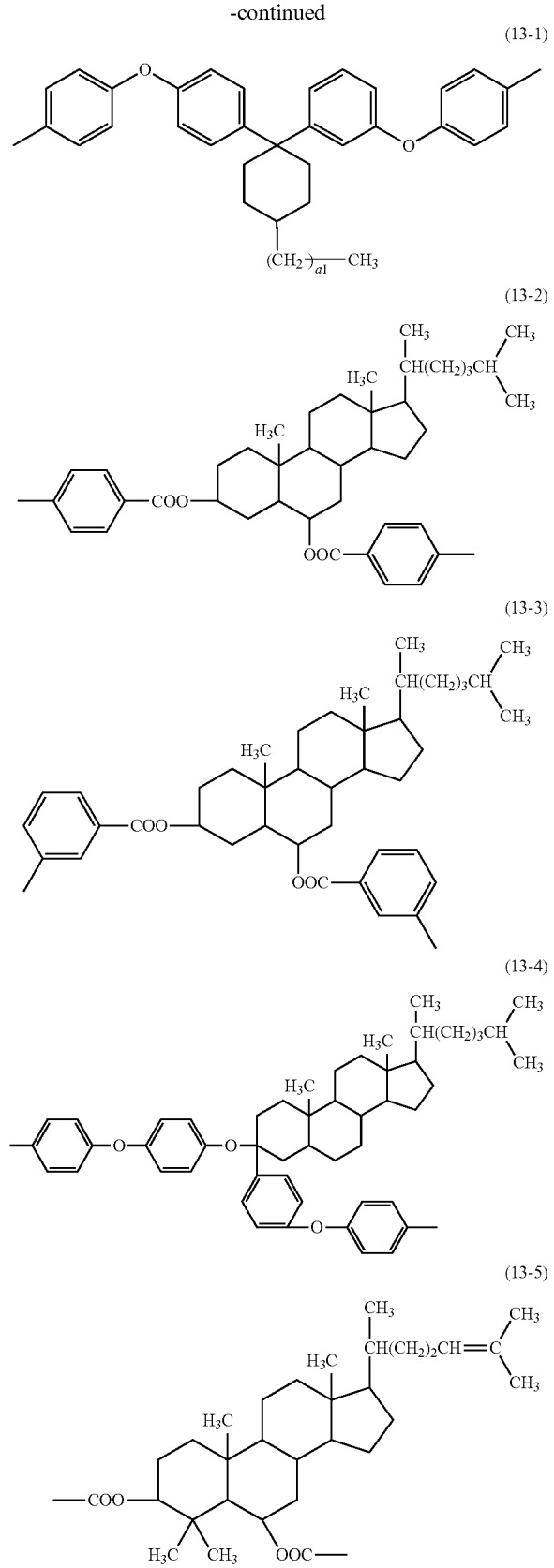

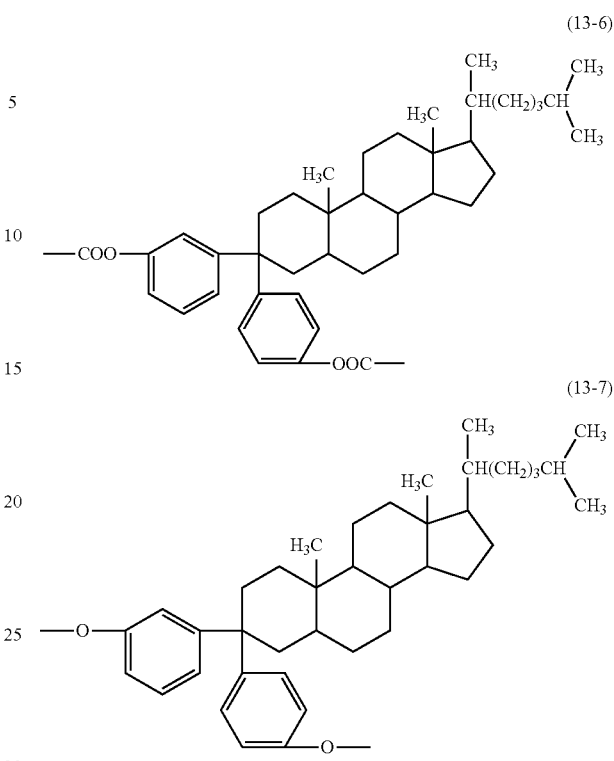

Herein, a1 is an integer equal to or greater than 0 and equal to or less than 21.

The vertical alignment inducing structure portion is not limited to the groups described above, as long as the structure functions so as to arrange the liquid crystal molecules to the direction perpendicular to the substrate surface. The other vertical alignment agent may be contained in the alignment film in addition to the compound after the alignment process described above. Examples of the other vertical alignment agent include polyimide having the vertical alignment inducing structure portion, polysiloxane having the vertical alignment inducing structure portion, and the like.

The compound after the alignment process may contain an unreacted crosslinkable functional group, but it is preferable to contain a small amount of the unreacted crosslinkable functional group as the alignment of the liquid crystal molecules may be disordered in a case of reaction during driving. The unreacted crosslinkable functional group contained in the compound after the alignment process can be checked, for example, by disassembling the liquid crystal display and analyzing the alignment films with a transmission type or a reflection type Fourier transform infrared spectrophotometer (FT-IR). In detail, first, the liquid crystal display is disassembled and the surfaces of the alignment films are cleaned with an organic solvent or the like. After that, by analyzing the alignment films with the FT-IR, if a double bond for forming the crosslinked structure remains in the alignment films, for example, absorption spectra derived from the double bond are obtained and the presence or absence of the unreacted crosslinkable functional group can be checked.

As described above, the second side chain can be represented by the formula (SD-2).

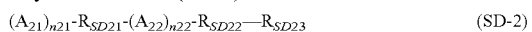

$(A_{21})_{n21}\text{-}R_{SD21}\text{-}(A_{22})_{n22}\text{-}R_{SD22}\text{—}R_{SD23}$ (SD-2)

Herein, as the specific structure of the second side chain represented by the formula (SD-2), compounds including a group represented by a formula (21-1) to a formula (21-27) can be used, or compounds including a group represented by a formula (F-1) to a formula (F-18) below can be used.

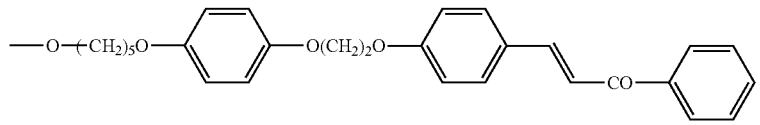
(21-1)
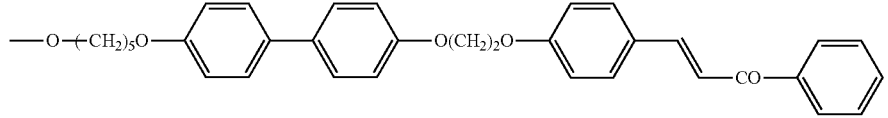
(21-2)
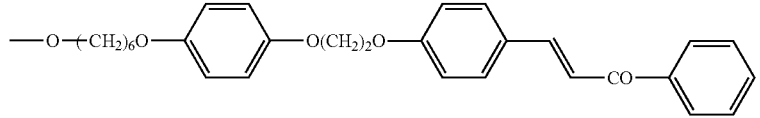
(21-3)
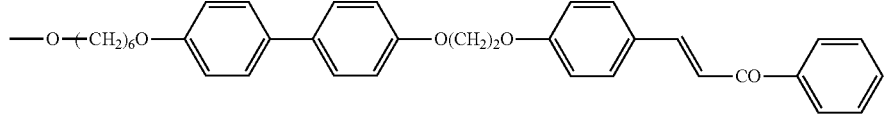
(21-4)
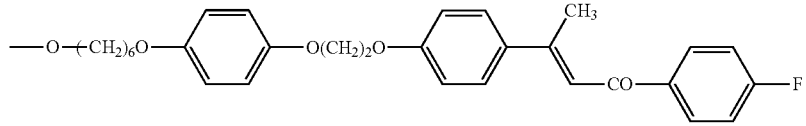
(21-5)
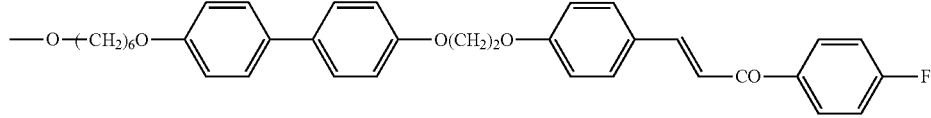
(21-6)
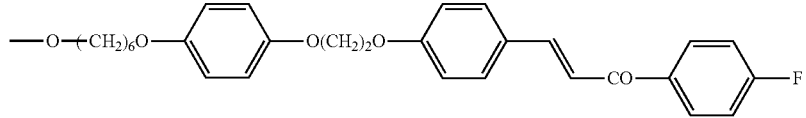
(21-7)
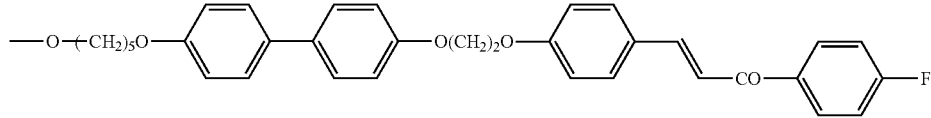
(21-8)
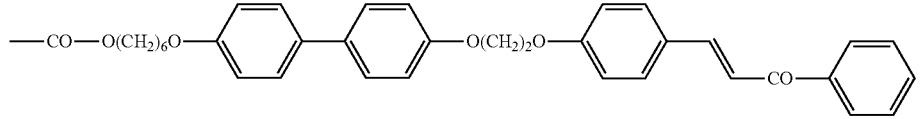
(21-9)
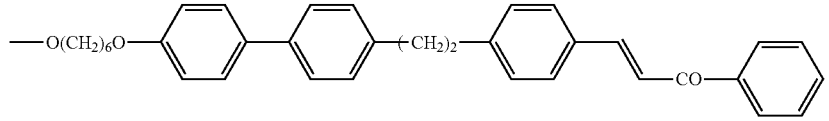
(21-10)
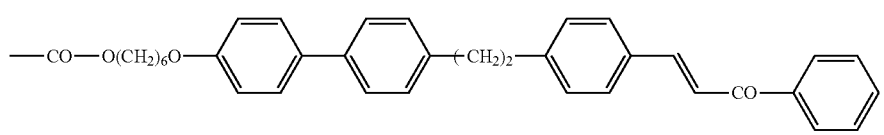
(21-11)
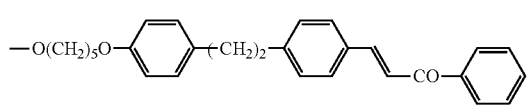
(21-12)
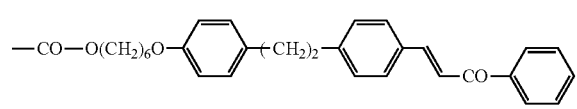
(21-13)

-continued
(21-14)
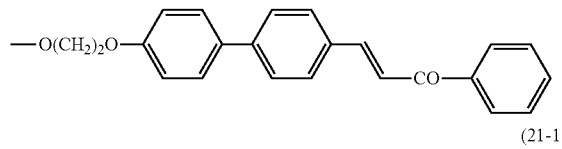
(21-15)
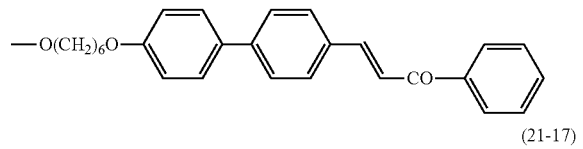
(21-16)
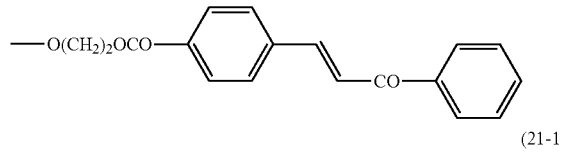
(21-17)
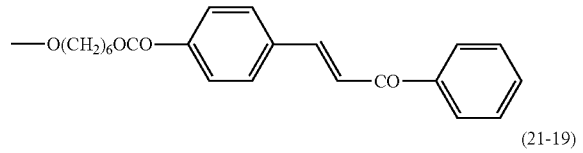
(21-18)
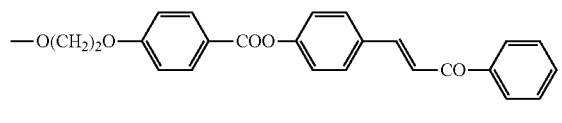
(12-20)
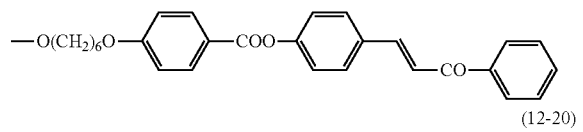
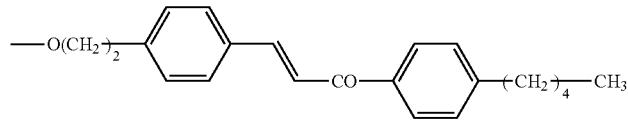
(21-21)
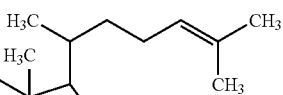
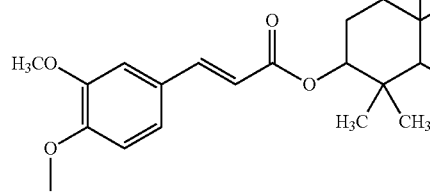
(21-22)
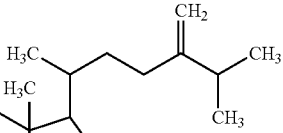
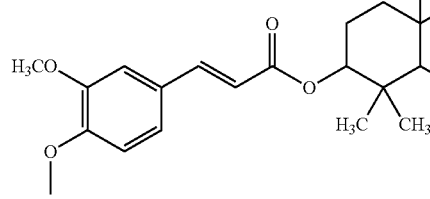
(21-23)
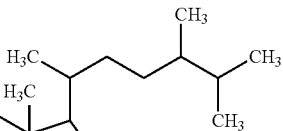
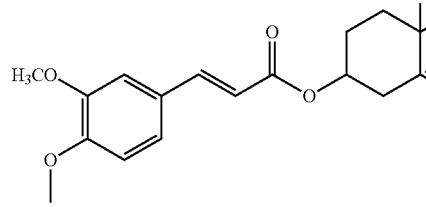

(21-24)
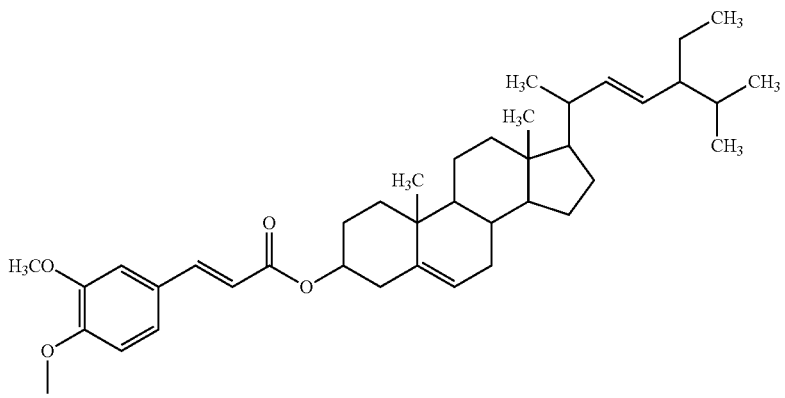
(21-25)
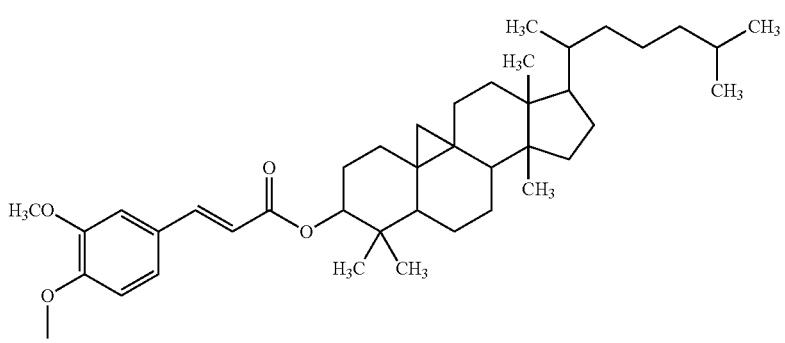
(21-26)
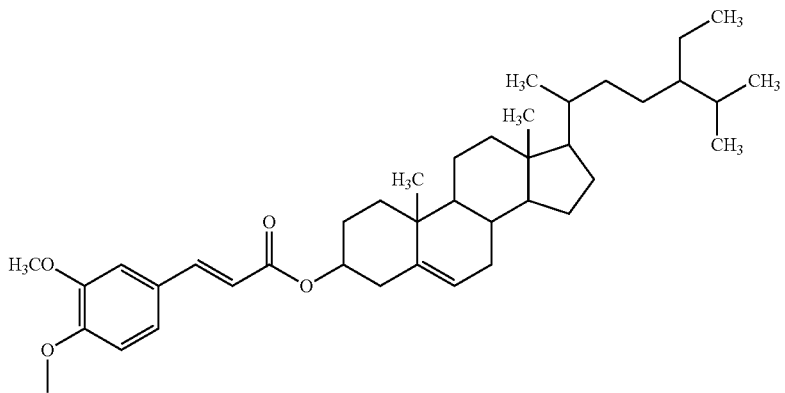
(21-27)
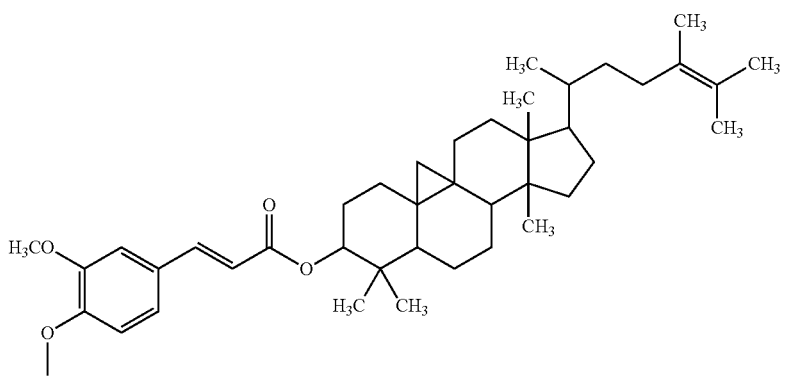

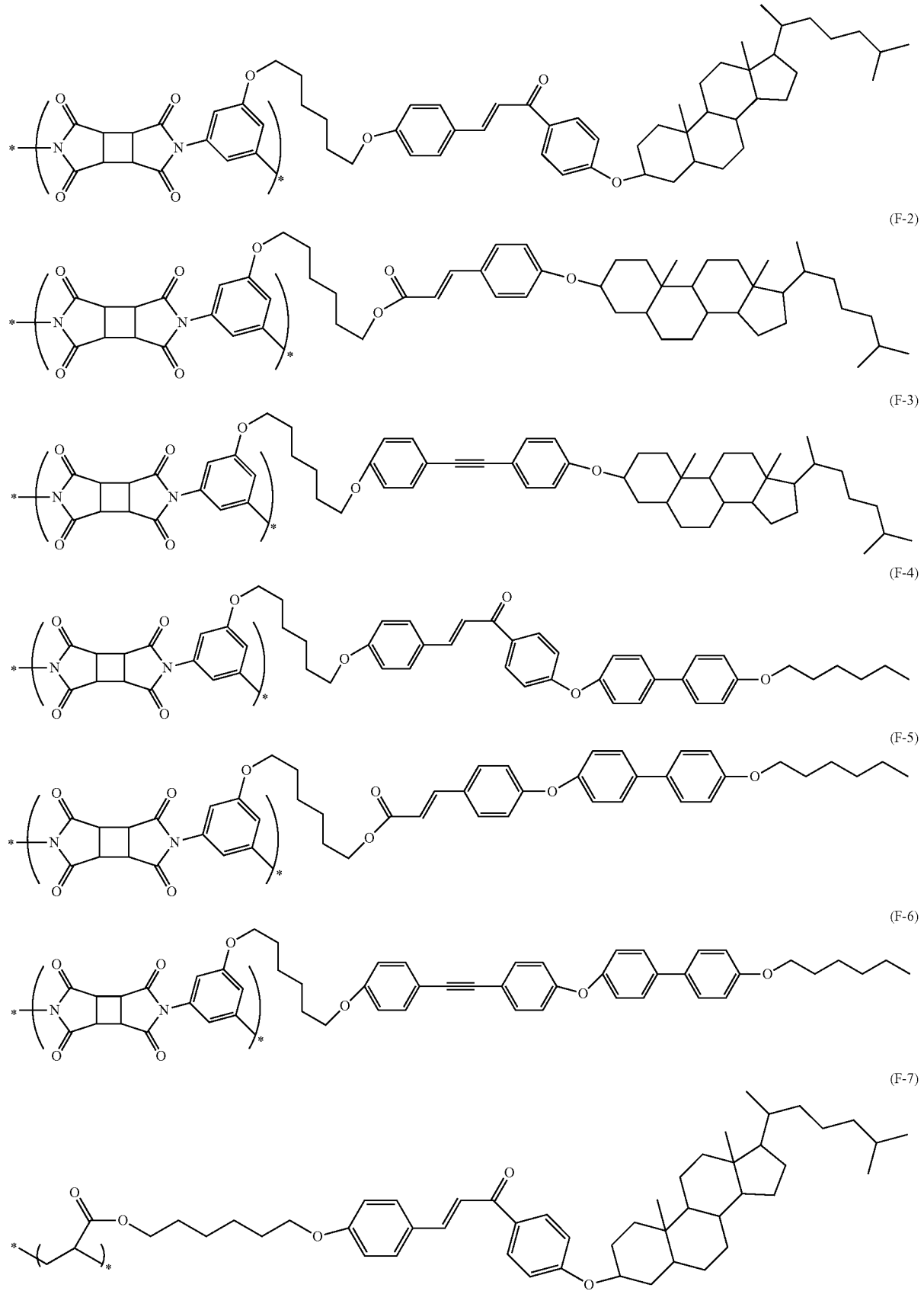

-continued
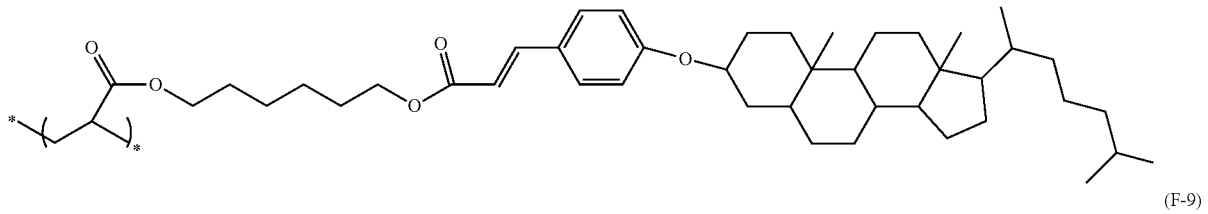
(F-8)
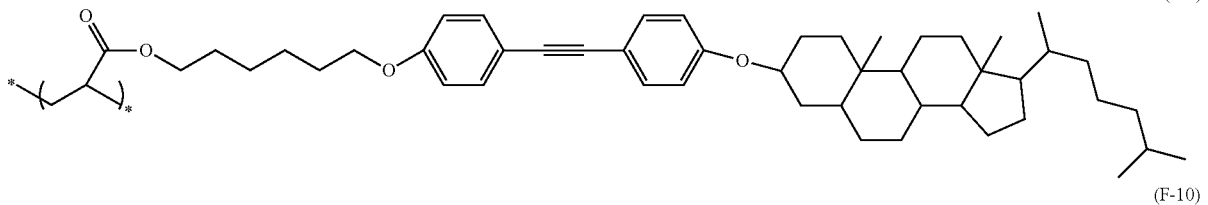
(F-9)
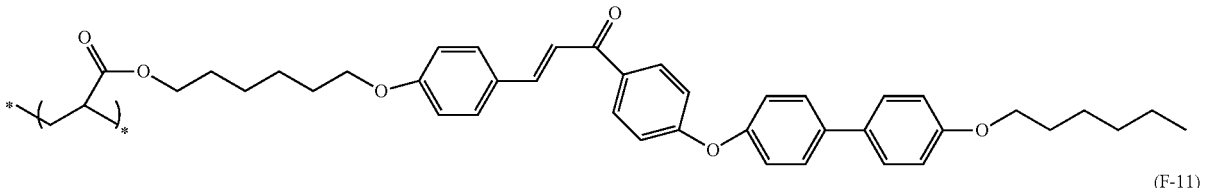
(F-10)
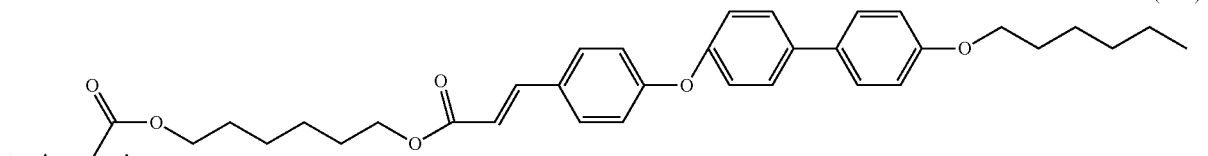
(F-11)
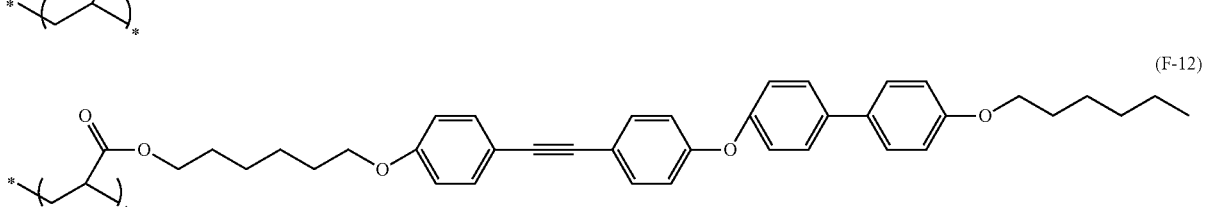
(F-12)
(F-13)
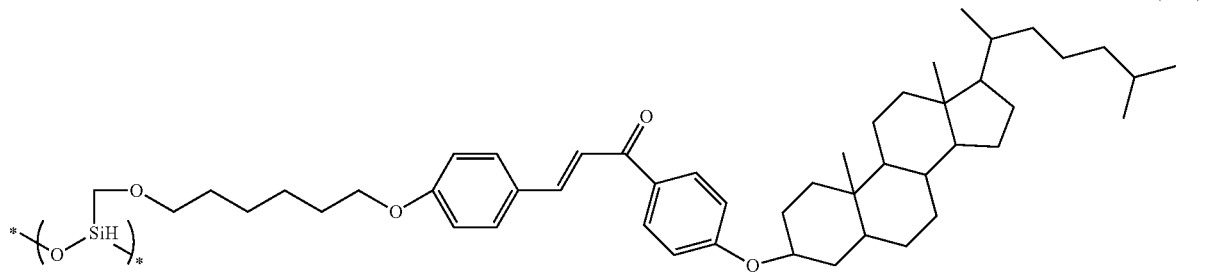
(F-14)
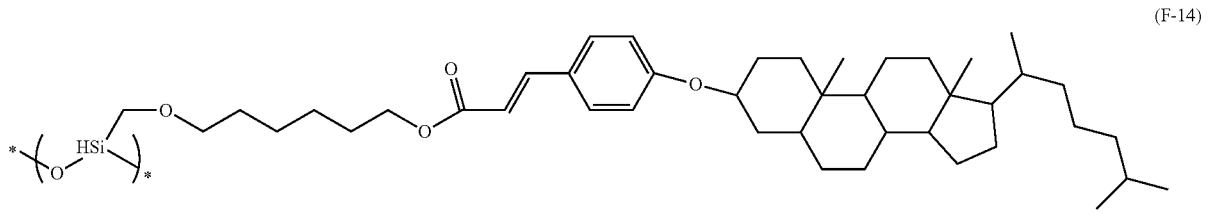
(F-15)

-continued

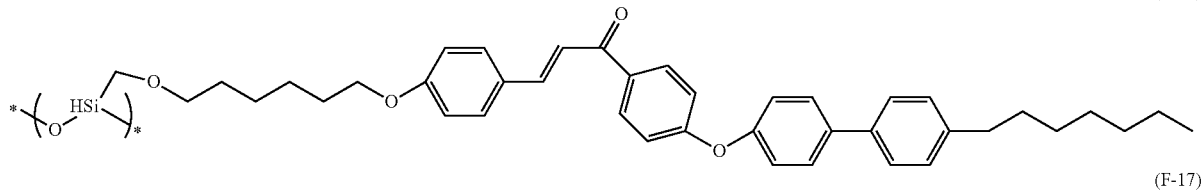
(F-16)

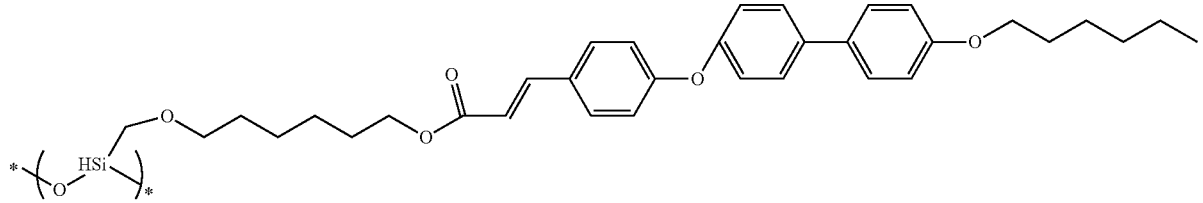
(F-17)

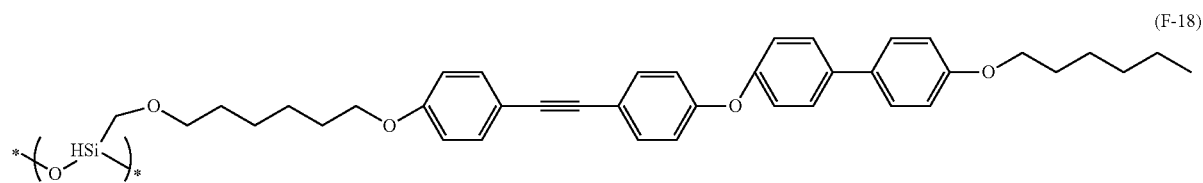
(F-18)

Description of Liquid Crystal Displays of Present Disclosure

Figure 2:
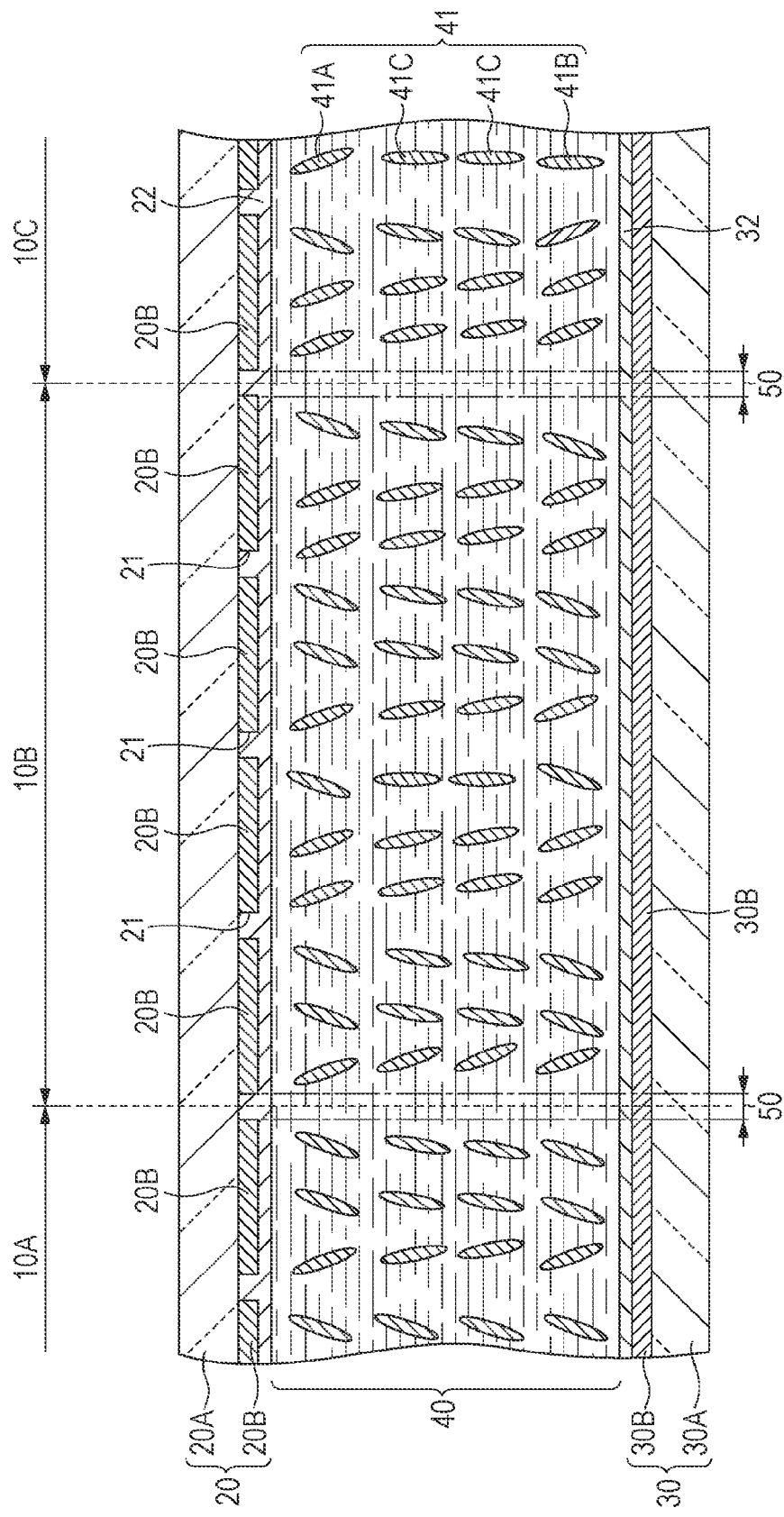
FIG. 2 is a schematic partial cross-sectional view of a liquid crystal display of embodiment 1.

Next, the common configuration and structure of the liquid crystal displays (liquid crystal display elements) of the present disclosure will be described. A schematic partial cross-sectional view of the liquid crystal display (or liquid crystal display element) according to the first embodiment and the first reference embodiment is shown in FIG. 2. The liquid crystal display includes a liquid crystal display element including a pair of alignment films 22 and 32 which are provided on facing surface sides of a pair of substrates 20 and 30, and a liquid crystal layer 40 which is provided between the pair of alignment films 22 and 32 and is configured to have a liquid crystal composition containing liquid crystal molecules 41 having negative dielectric anisotropy.

Specifically, the liquid crystal display includes a plurality of pixels 10 (10A, 10B, 10C . . . ). In the liquid crystal display (liquid crystal display element), the liquid crystal layer 40 containing the liquid crystal molecules 41 between the alignment films 22 and 32 is provided between the thin film transistor (TFT) substrate 20 and the color filter (CF) substrate 30. The liquid crystal display (liquid crystal display element) is a so-called transmission type and a display mode thereof is a vertical alignment (VA) mode. FIG. 2 shows a non-driving state in which driving voltage is not applied.

In the TFT substrate 20, a plurality of pixel electrodes 20B are disposed in a matrix shape, for example, on a surface of a glass substrate 20A on a side facing the CF substrate 30. A TFT switching element including a gate, source, and a drain for driving each of the plurality of pixel electrodes 20B, or a gate line and a source line (not shown) connected to the TFT switching element are provided. The pixel electrodes 20B are provided on the glass substrate 20A for each pixel electrically separated by pixel separation units 50, and are configured with a material having transparency such as indium tin oxide (ITO), for example. In the pixel electrodes 20B, slit portions 21 (portions on which the electrodes are not formed) having a stripe or V-shaped pattern, for example, are provided in each pixel. Accordingly, if the driving voltage is applied, the electrical field oblique with respect to the long axis direction of the liquid crystal molecules 41 is applied, and regions with different alignment directions are formed in the pixel (alignment division), and accordingly a viewing angle property is improved. That is, the slit portion 21 is an alignment regulation unit for regulating the alignment of all liquid crystal molecules 41 in the liquid crystal layer 40 in order to secure the excellent display property, and herein, the alignment direction of the liquid crystal molecules 41 at the time of applying the driving voltage is regulated by the slit portion 21. As described above, the azimuth angle of the liquid crystal molecules 41 when the pretilt is applied thereto is basically regulated by the direction of the electrical field, and the direction of the electrical field is determined by the alignment regulation unit. In the pixel electrodes 20B, the concavo-convex portions having a stripe or V-shaped pattern, for example, may be provided in each pixel, instead of the slit portion 21.

In the CF substrate 30, for example, a stripe color filter (not shown) with colors of red (R), green (G), and blue (B), and a counter electrode 30B are disposed substantially over the entire surface of an effective display region, on a surface of the glass substrate 30A facing the TFT substrate 20. In the same manner as the pixel electrode 20B, the counter electrode 30B is configured with a material having transparency such as indium tin oxide (ITO), for example.

The alignment film 22 is provided on the surface of the TFT substrate 20 on the liquid crystal layer 40 side, so as to cover the pixel electrodes 20B and the slit portions 21 (or concavo-convex portions). The alignment film 32 is provided on the surface of the CF substrate 30 on the liquid crystal layer 40 side so as to cover the counter electrode 30B. The alignment films 22 and 32 are for regulating the alignment of the liquid crystal molecules 41, and herein have functions of aligning the liquid crystal molecules 41 in the direction perpendicular to the substrate surface and applying the pretilt with respect to the liquid crystal molecules 41 (41A and 41B) in the vicinity of the substrates. In the liquid crystal display (liquid crystal display element) shown in FIG. 2, the slit portions are not provided on the side of the CF substrate 30.

Figure 10:
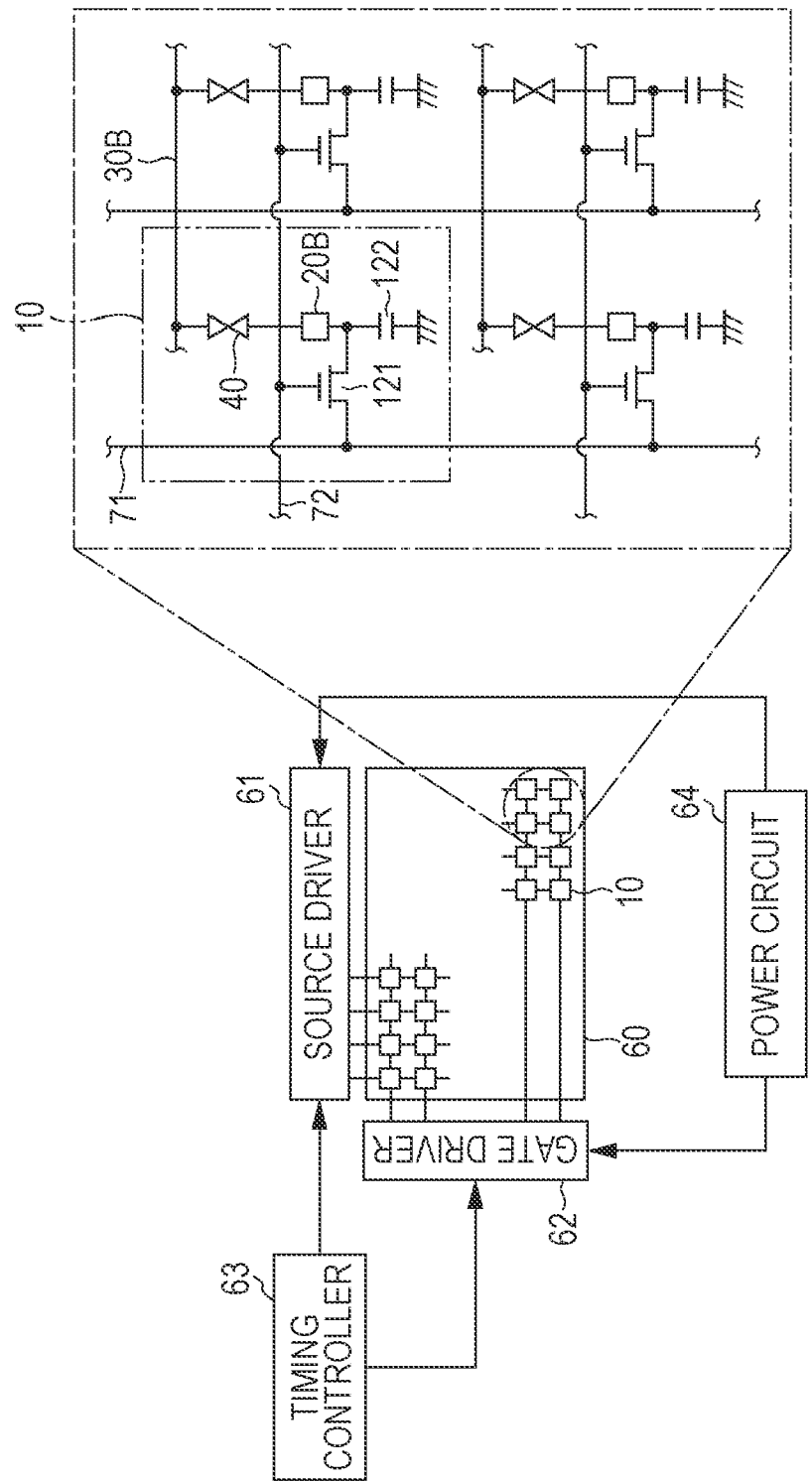
FIG. 10 is a circuit configuration diagram of a liquid crystal display shown in FIG. 2.

FIG. 10 shows a circuit configuration of the liquid crystal display shown in FIG. 2.

As shown in FIG. 10, the liquid crystal display is configured by containing the liquid crystal display element including the plurality of pixels 10 provided in a display region 60. In the liquid crystal display, a source driver 61, a gate driver 62, a timing controller 63 which controls the source driver 61 and the gate driver 62, and a power circuit 64 which supplies power to the source driver 61 and the gate driver 62 are provided around the display region 60.

The display region 60 is a region in which an image is displayed, and is a region configured so as to display an image by arranging the plurality of pixels 10 in matrix. In addition to the display region 60 containing the plurality of pixels 10, FIG. 10 additionally shows an enlarged region corresponding to four pixels 10.

In the display region 60, a plurality of source lines 71 are arranged in a row direction, a plurality of gate lines 72 are arranged in a column direction, and each pixel 10 is disposed in a position in which the source line 71 and the gate line 72 intersect with each other. Each pixel 10 is configured by including the pixel electrode 20B, the liquid crystal layer 40, a transistor 121, and a capacitor 122. In each transistor 121, a source electrode is connected to the source line 71, a gate electrode is connected to the gate line 72, and a drain electrode is connected to the capacitor 122 and the pixel electrode 20B. Each source line 71 is connected to the source driver 61 and an image signal is supplied from the source driver 61. Each gate line 72 is connected to the gate driver 62 and a scanning signal is sequentially supplied from the gate driver 62.

The source driver 61 and the gate driver 62 select a specific pixel 10 from the plurality of pixels 10.

The timing controller 63 outputs, for example, the image signal (for example, each RGB image signal corresponding to red, green, and blue), and a source driver control signal for controlling an operation of the source driver 61, to the source driver 61. In addition, the timing controller 63 outputs, for example, a gate driver control signal for controlling an operation of the gate driver 62 to the gate driver 62. Examples of the source driver control signal include a horizontal synchronization signal, a start pulse signal, a clock signal for the source driver, and the like. Examples of the gate driver control signal include a vertical synchronization signal, a clock signal for the gate driver, and the like.

In the liquid crystal display, an image is displayed by applying the driving voltage between the pixel electrode 20B and the counter electrode 30B as follows. In detail, the source driver 61 supplies an individual image signal to a predetermined source line 71 based on the image signal input from the timing controller 63, by the input of the sourced river control signal from the timing controller 63. In line with this, the gate driver 62 sequentially supplies the scanning signal to the gate line 72 at predetermined timing by the input of the gate driver control signal from the timing controller 63. Accordingly, the pixel 10 positioning in the region in which the source line 71 to which the image signal is supplied and the gate line 72 to which the scanning signal is supplied intersect with each other, is selected, and the driving voltage is applied to the pixel 10.

Next, the liquid crystal display of the present disclosure will be described with the embodiments and examples.

Embodiment 1

Embodiment 1 relates to the liquid crystal display (or liquid crystal display element) in the VA mode according to the first embodiment of the present disclosure, and the liquid crystal display (or liquid crystal display element) according to the first embodiment and the second reference embodiment.

In Embodiment 1, at least one of the pair of alignment films 22 and 32 contains the compound (compound after the alignment process) obtained by crosslinking polymer compounds each including the first side chain which interacts with the liquid crystal molecules 41 and the crosslinkable functional group as the second side chain, with each other, the liquid crystal composition configuring the liquid crystal layer 40 contains at least one kind of an alkenyl compound represented by the general formula (AN-1), and the pretilt is applied to the liquid crystal molecules 41 by the crosslinked compound (compound after the alignment process). Specific examples of the first side chain, the second side chain, and the alkenyl compound represented by the general formula (AN-1) will be described in examples.

Herein, the compound after the alignment process is generated by forming the alignment films 22 and 32 in a state of containing one kind or two or more kinds of the polymer compounds (compounds before the alignment process) including the main chain, the first side chain, and the second side chain, providing the liquid crystal layer 40 therein, and then crosslinking the polymer compounds with each other, or emitting the energy ray to the polymer compounds, more specifically causing the crosslinkable functional group to react while applying the electrical field or a magnetic field thereto. The compound after the alignment process has a structure of arranging the liquid crystal molecules 41 in the predetermined direction (specifically, the oblique direction) with respect to the pair of substrates (specifically, the TFT substrate 20 and the CF substrate 30). As described above, the compound after the alignment process is contained in the alignment films 22 and 32 by crosslinking the polymer compounds with each other or emitting the energy ray to the polymer compounds, and accordingly the pretilt may be applied with respect to the liquid crystal molecules 41 in the vicinity of the alignment films 22 and 32, and therefore the response speed becomes high and the display property is improved.

In the compound before the alignment process, the plurality of kinds of the second side chains may be bonded to the main chain. Alternatively, the plurality of kinds of the side chains may be bonded to the main chain and at least one side chain thereof may be the second side chain. That is, the compound before the alignment process may contain the side chain which does not show a crosslinking property, in addition to the crosslinkable second side chain. One kind or the plurality of kinds of the second side chain containing the crosslinkable functional group may be used. The crosslinkable functional group is arbitrarily set as long as it is a crosslinkable functional group after forming the liquid crystal layer 40. As the crosslinkable group, a group which forms a crosslinked structure by photoreaction may be used, or a group which forms a crosslinked structure by thermal reaction may be used, but among them, a photoreactive crosslinkable functional group (a photosensitive group having photosensitivity) which forms a crosslinked structure by photoreaction is preferable. This is because the alignment of the liquid crystal molecules 41 is easily regulated in the predetermined direction, the response property is improved, and the liquid crystal display (liquid crystal display element) having the excellent display property is easily manufactured.

As the photoreactive crosslinkable functional group (photosensitive group having photosensitivity, for example, photodimerization photosensitive group), any one kind of structure from vinyl, acryloyl, methacryloyl, chalcone, cinnamate, cinnamoyl, coumarin, maleimide, benzophenone, norbornene, oryzanol, and chitosan is used. The "crosslinkable functional group" does not only include the crosslinkable functional group showing photodimerization reaction, but also includes a crosslinkable functional group showing polymerization reaction. That is to say, in the present disclosure, the concept of "crosslinking" does not only include photodimerization reaction but also includes polymerization reaction.

The liquid crystal layer 40 contains the liquid crystal molecules 41 having negative dielectric anisotropy. The liquid crystal molecules 41, for example, form a rotationally symmetric shape with each of a long axis and a short axis which are orthogonal to each other, as a center axis, and have negative dielectric anisotropy.

Figure 11:
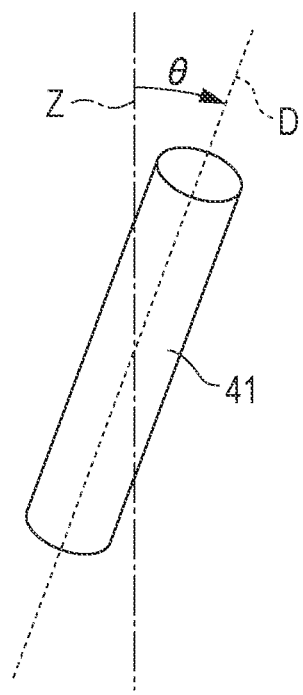
FIG. 11 is a schematic view for illustrating pretilt of liquid crystal molecules.

The liquid crystal molecules 41 may be classified in liquid crystal molecules 41A which are held by the alignment film 22 in the vicinity of a boundary surface with the alignment film 22, liquid crystal molecules 41B held by the alignment film 32 in the vicinity of a boundary surface with the alignment film 32, and the other liquid crystal molecules 41C. The liquid crystal molecules 41C are positioned in an intermediate region of the liquid crystal layer 40 in a thickness direction, and are arranged so that the long axis direction (director) of the liquid crystal molecules 41C is substantially perpendicular to the glass substrates 20A and 30A in a state where the driving voltage is turned off. Herein, when the driving voltage is turned on, the liquid crystal molecules are tilted and aligned so that the director of the liquid crystal molecules 41 is parallel with the glass substrates 20A and 30B. Such movement results from a property of the liquid crystal molecules 41C which has the smaller dielectric constant in the long axis direction than that in the short axis direction. The liquid crystal molecules 41A and 41B also have the same property as described above, and accordingly, basically the same movement as that of the liquid crystal molecules 41C is performed depending on change of on and off states of the driving voltage. Herein, in the state where the driving voltage is turned off, a pretilt $\theta_1$ is applied to the liquid crystal molecules 41A by the alignment film 22 and the director thereof is tilted from a normal direction of the glass substrates 20A and 30A. In the same manner as described above, a pretilt $\theta_2$ is applied to the liquid crystal molecules 41B by the alignment film 32 and the director thereof is tilted from the normal direction of the glass substrates 20A and 30A. Herein, "to be held" means that the alignment films 22 and 32 and the liquid crystal molecules 41A and 41C are not fixed to each other to regulate the alignment of the liquid crystal molecules 41. In addition, as shown in FIG. 11, the "pretilt $\theta$ ($\theta_1$, $\theta_2$)" indicates a tilted angle of the director D of the liquid crystal molecules 41 (41A and 41B) with respect to the Z direction in a state where the driving voltage is turned off, when a direction (normal direction) perpendicular to the surfaces of the glass substrates 20A and 30A is set as Z.

In the liquid crystal layer 40, both the pretilts $\theta_1$ and $\theta_2$ have a value greater than 0°. In the liquid crystal layer 40, the pretilts $\theta_1$ and $\theta_2$ may be the same angle as each other ($\theta_1=\theta_2$) or may be different angles from each other ($\theta_1\neq\theta_2$), but the pretilts $\theta_1$ and $\theta_2$ are preferably different angles from each other. Accordingly, the response speed with respect to the application of the driving voltage can be improved compared to the case where both the pretilts $\theta_1$ and $\theta_2$ are 0°, and the contrast which is substantially same as that in the case where both the pretilts $\theta_1$ and $\theta_2$ are 0°, can be obtained. Therefore, a transmission amount when performing black display can be decreased while improving the response speed, and the contrast can be improved. In a case where the pretilts $\theta_1$ and $\theta_2$ are set to be different angles from each other, the greater pretilt $\theta$ from the pretilts $\theta_1$ and $\theta_2$ is more desirably equal to or greater than 1° and equal to or less than 4°. By setting the greater pretilt $\theta$ in the range described above, particularly high effects are obtained.

Figure 4:
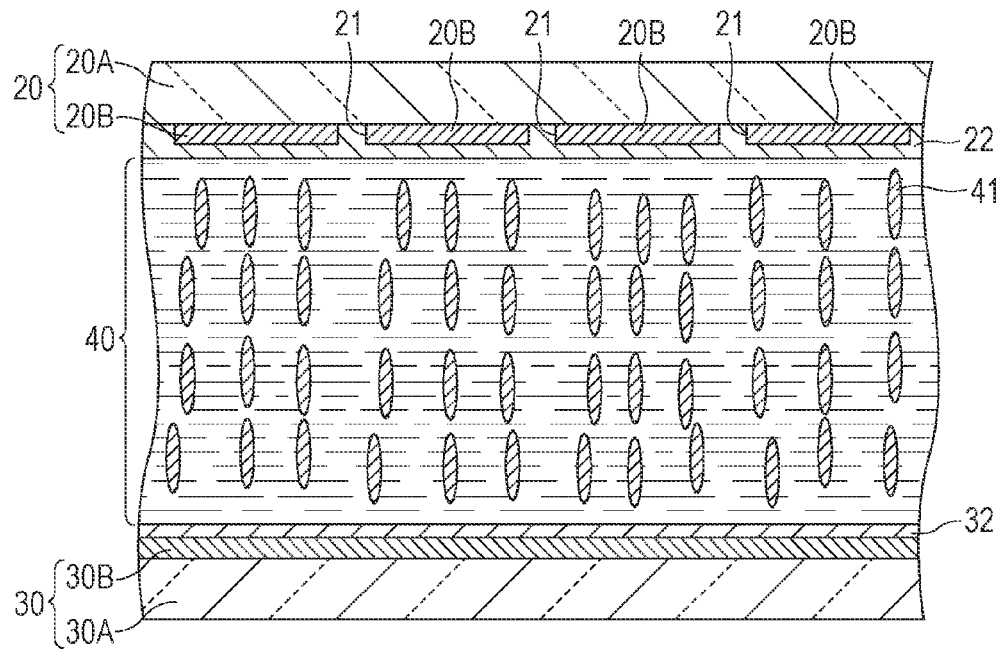
FIG. 4 is a schematic partial cross-sectional view of substrates and the like for illustrating a manufacturing method of a liquid crystal display shown in FIG. 2.
Figure 5:
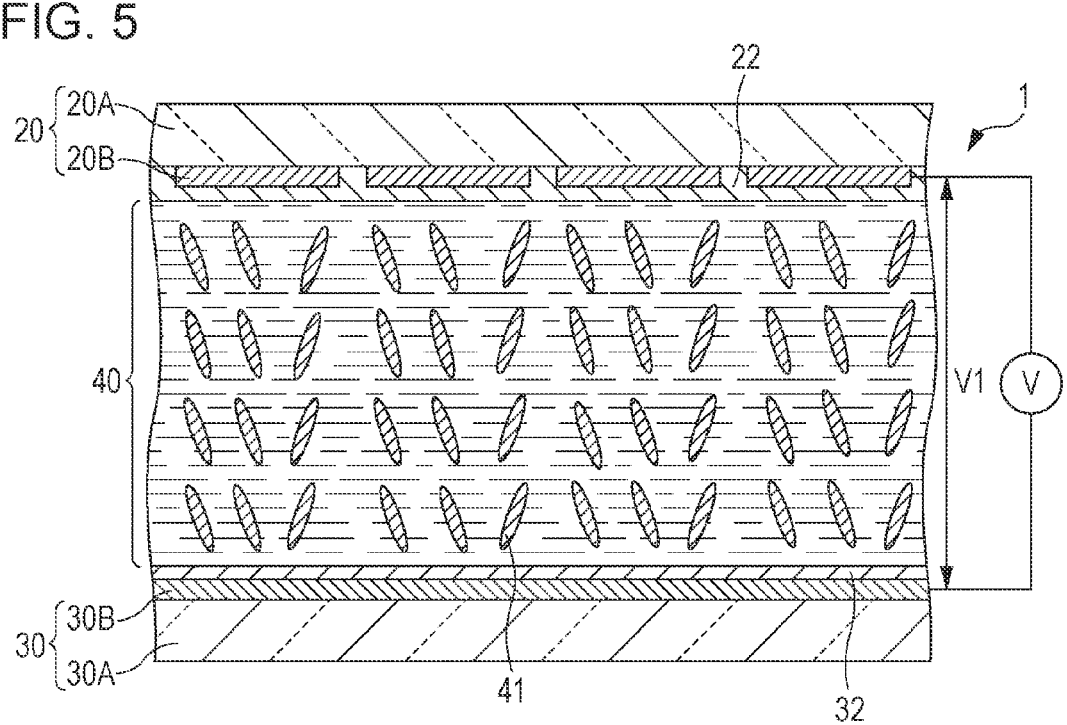
FIG. 5 is a schematic partial cross-sectional view of substrates and the like for illustrating a step subsequent to a step of FIG. 4.
Figure 6:
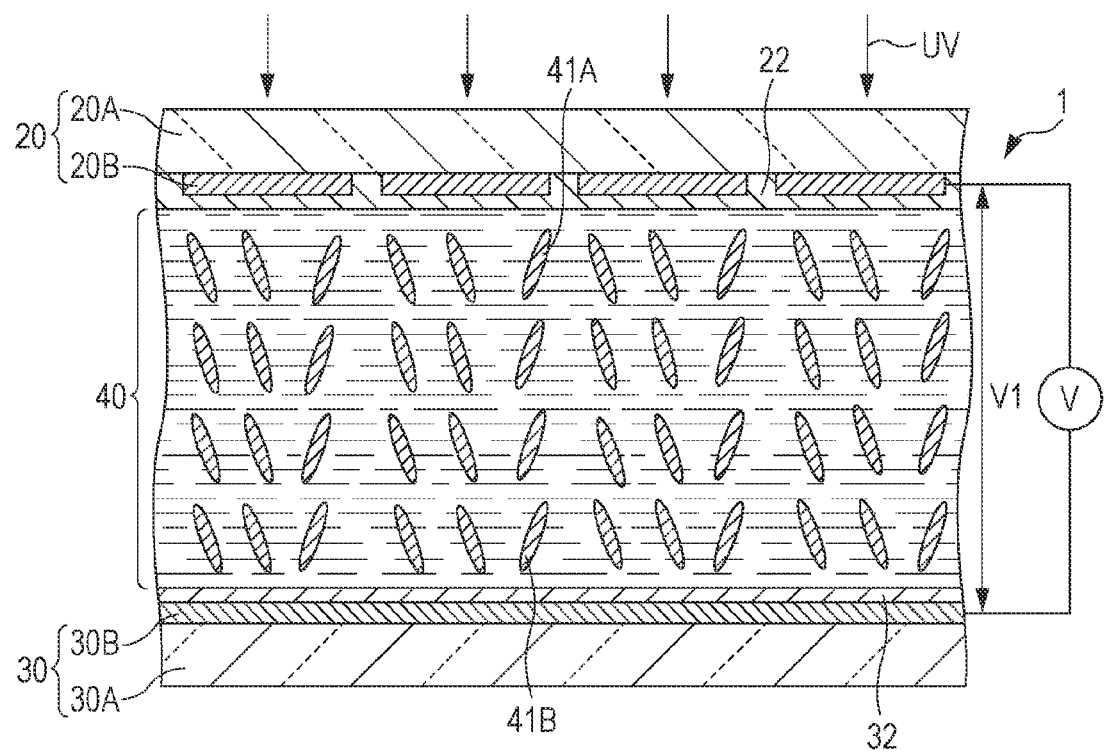
FIG. 6 is a schematic partial cross-sectional view of substrates and the like for illustrating a step subsequent to a step of FIG. 5.

Next, the manufacturing method of the liquid crystal display (liquid crystal display element) described above will be described with reference to a flowchart shown in FIG. 3 and schematic partial cross-sectional views shown in FIGS. 4, 5, and 6. FIGS. 4, 5, and 6 are simplified views and therefore only show one pixel.

First, the alignment film 22 is formed on the surface of the TFT substrate 20 and the alignment film 32 is formed on the surface of the CF substrate 30 (Step S101).

In detail, first, the TFT substrate 20 is manufactured by providing the pixel electrodes 20B including the predetermined silt portions 21 (or concavo-convex portions) on the surface of the glass substrate 20A, for example, in a matrix shape. The CF substrate 30 is manufactured by providing the counter electrode 30B on the color filter of the glass substrate 30A on which the color filter is formed.

Meanwhile, a liquid alignment film material is prepared by mixing the polymer compound precursor as the compound before the alignment process or the compound after the alignment process, a solvent, and, if necessary, the general vertical alignment agent with each other.

The prepared alignment film material is applied or printed on each of the TFT substrate 20 and the CF substrate 30 so as to cover the pixel electrodes 20B, slit portions 21 (or concavo-convex portions), and the counter electrode 30B, and then a heating process is performed. A temperature of the heating process is preferably equal to or higher than 80° C. and more preferably equal to or higher than 150° C. and equal to or lower than 200° C. The heating temperature of the heating process may be changed in a stepwise manner. Accordingly, the solvent contained in the applied or printed alignment film material is evaporated, and the alignment films 22 and 32 containing the polymer compound (compound before the alignment process) including the crosslinkable functional group as the second side chain are formed. After that, a process such as rubbing may be performed, if necessary.

Next, the TFT substrate 20 and the CF substrate 30 are disposed so that the alignment film 22 and the alignment film 32 face each other, and the liquid crystal layer 40 is sealed between the alignment film 22 and the alignment film (Step S102). In detail, spacer projections for securing a cell gap, for example, plastic beads are spread over any one surface formed on the alignment film 22 or 32 of the TFT substrate 20 or the CF substrate 30, and a seal portion is printed using an epoxy adhesive or the like by a screen printing method, for example. After that, as shown in FIG. 4, the TFT substrate 20 and the CF substrate 30 are bonded to each other through the spacer projections and the seal portion so that the alignment films 22 and 32 face each other and the liquid crystal composition (liquid crystal material) is injected thereto. After that, the liquid crystal composition is sealed between the TFT substrate 20 and the CF substrate 30 by performing hardening of the seal portion by heating or the like. FIG. 4 shows a cross-sectional configuration of the liquid crystal layer 40 which is sealed between the alignment film 22 and the alignment film 32.

Next, as shown in FIG. 5, voltage V1 is applied between the pixel electrode 20B and the counter electrode 30B using a voltage application unit 1 (Step S103). The voltage V1 is, for example, 5 volts to 30 volts. Accordingly, an electrical field in a direction which forms a predetermined angle with respect to the surfaces of the glass substrates 20A and 30A is generated, and the liquid crystal molecules 41 are tiled and aligned in the predetermined direction from the vertical direction of the glass substrates 20A and 30A. That is, the azimuth angle (declination angle) of the liquid crystal molecules 41 at that time is regulated by the direction of the electrical field, and the polar angle (zenith angle) thereof is regulated by the intensity of the electrical field. The tilted angle of the liquid crystal molecules 41, and the pretilts $\theta_2$ and $\theta_2$ to be applied to the liquid crystal molecules 41A held by the alignment film 22 in the vicinity of the boundary surface with the alignment film 22, and the liquid crystal molecules 41B held by the alignment film 32 in the vicinity of the boundary surface with the alignment film 32 in a step which will be described later, are substantially the same with each other. Therefore, it is possible to control values of the pretilts $\theta_2$ and $\theta_2$ of the liquid crystal molecules 41A and 41B by appropriately adjusting the value of the voltage V1.

In addition, as shown in FIG. 6, as in the state where the voltage V1 is applied, the energy ray (specifically an ultraviolet ray UV) is emitted with respect to the alignment films 22 and 32 from the outside of the TFT substrate 20, for example. That is, the ultraviolet ray is emitted with respect to the liquid crystal layer 40 while applying the electrical filed or the magnetic field thereto, so as to arrange the liquid crystal molecules 41 in the oblique direction with respect to the surfaces of the pair of substrate 20 and 30. Accordingly, the crosslinkable functional groups included in the compounds before the alignment process in the alignment films 22 and 32 are reacted with each other to crosslink the compounds before the alignment process (Step S104). By doing so, the direction to be responded by the liquid crystal molecules 41 by the compounds after the alignment process is stored, and the pretilt is applied to the liquid crystal molecules 41 in the vicinity of the alignment films 22 and 32. As a result, the compounds after the alignment process are formed in the alignment films 22 and 32, and the pretilts $\theta_2$ and $\theta_2$ are applied to the liquid crystal molecules 41A and 41B of the liquid crystal layer 40 which are positioned in the vicinity of the boundary surface with the alignment films 22 and 32, in a non-driving state. As the ultraviolet ray UV, it is preferable to use an ultraviolet ray containing large amounts of optical elements having a wavelength of approximately 365 nm. If an ultraviolet ray containing large amounts of optical elements having a short wavelength range is used, the liquid crystal molecules 41 may be photolyzed and degraded. Herein, the ultraviolet ray UV is emitted from the outside of the TFT substrate 20, but may be emitted from the outside of the CF substrate 30 or may be emitted from the outside of both the TFT substrate 20 and the CF substrate 30. In this case, it is preferable to emit the ultraviolet ray from the side of the substrate having higher transmittance. In a case where the ultraviolet ray UV is emitted from the outside of the CF substrate 30, the ultraviolet ray may be absorbed by the color filter and the crosslink reaction may be difficult depending on a wavelength range of the ultraviolet ray UV. Accordingly, it is preferable to emit the ultraviolet ray from the outside of the TFT substrate 20 (side of the surface including the pixel electrodes).

With the steps described above, the liquid crystal display (liquid crystal display element) shown in FIG. 2 can be completed.

In the operation of the liquid crystal display (liquid crystal display element), if the driving voltage is applied in the selected pixel 10, the aligned state of the liquid crystal molecules 41 contained in the liquid crystal layer 40 changes based on a potential difference between the pixel electrode 20B and the counter electrode 30B. In detail, in the liquid crystal layer 40, by applying the driving voltage from the state before applying the driving voltage shown in FIG. 2, the liquid crystal molecules 41A and 41B positioned in the vicinity of the alignment films 22 and 32 are tilted in the tilted direction thereof, and the operation is spread to the other liquid crystal molecules 41C. As a result, the liquid crystal molecules 41 respond so as to be substantially horizontal with respect to (parallel with) the TFT substrate 20 and the CF substrate 30. Accordingly, the optical property of the liquid crystal layer 40 is changed, the incident light to the liquid crystal display element is changed to outgoing light obtained by modulating the incident light, and grayscale is expressed based on the outgoing light, and therefore an image is displayed.

Herein, in a liquid crystal display element in which the pretilt process is not performed at all, and a liquid crystal display including this, although the alignment regulation unit such as the slit portion for regulating the alignment of the liquid crystal molecules is provided on the substrate, if the driving voltage is applied thereto, the liquid crystal molecules aligned in the direction perpendicular to the substrate are tilted so that the director faces the arbitrary azimuth in an in-plane direction of the substrate. In the liquid crystal molecules which responded to the driving voltage as described above, the azimuth of the director of the respective liquid crystal molecules are shifted from each other, and the disorder of the alignment as a whole is generated. Accordingly, the response speed becomes low, the response property is degraded, and as a result, the display property may be degraded. In addition, if the initial driving voltage is set and driven (overdriving) to be higher than the driving voltage in the display state, when applying the initial driving voltage, the responded liquid crystal molecules and substantially not responded liquid crystal molecules exist, and there is a great difference between tilted states of the director therebetween. After that, if the driving voltage in the display state is applied thereto, the liquid crystal molecules which responded when applying the initial driving voltage are tilted by the tilt of the director obtained based on the driving voltage in the display state while the operation thereof is substantially not spread to the other liquid crystal molecules, and the tilt thereof is spread to the other liquid crystal molecules. As a result, luminance of all pixels reaches luminance of the display state when applying the initial driving voltage, but after that the luminance thereof is decreased and reaches the luminance of the display state again. That is, if the overdriving is performed, the response speed is seemingly higher than that in the case of not performing the overdriving, but it is difficult to obtain sufficient display quality. The problems hardly occur in the liquid crystal display element in an IPS mode or an FFS mode, and are problems specific to the liquid crystal display element in the VA mode.

In contrast, in the liquid crystal display (liquid crystal display element) and the manufacturing method thereof of Embodiment 1, the alignment film 22 and 32 described above apply the predetermined pretilts $\theta_1$ and $\theta_2$ with respect to the liquid crystal molecules 41A and 41B. Accordingly, the problems that occurred when the pretilt process is not performed at all, hardly occur, the response speed with respect to the driving voltage is significantly improved, and the display quality when performing the overdriving is also improved. In addition, since the slit portions 21 (or concavo-convex portions) as the alignment regulation unit for regulating the alignment of the liquid crystal molecules 41 are provided on at least one of the TFT substrate 20 and the CF substrate 30, the display property such as viewing angle property is secured, and thus the response property is improved in the state where the excellent display property is maintained.

In the manufacturing method of the liquid crystal display of the related art (photo-alignment film technology), the alignment film is formed by emitting linear polarized light or light in the oblique direction (hereinafter, referred to as "oblique light") with respect to the precursor film containing the predetermined polymer compound provided on the substrate surface, and accordingly the pretilt process is performed. Therefore, when forming the alignment film, it is necessary to provide a large-scale light emitting apparatus such as an apparatus which emits linear polarized light or an apparatus which emits oblique light. A larger-scale apparatus is necessary for forming the pixel including multi domains for realizing wider viewing angle, and the manufacturing steps thereof are complicated. Particularly, in a case of forming the alignment film using the oblique light, if there is structural object such as spacer or concavity and convexity on the substrate, a region which the oblique light does not reach is generated due to shadow of the structural object, and it is difficult to perform desirable alignment regulation with respect to the liquid crystal molecules in this region. In this case, for example, a pixel design considering a flow of the light is necessary for emitting the oblique light using a photomask for providing the multi domain in the pixel. That is, when forming the alignment film using the oblique light, it is difficult to form a high-definition pixel.

In addition, from the photo-alignment film technology of the related art, in a case of using a crosslinkable polymer compound as the polymer material, since the crosslinkable functional groups contained in the crosslinkable polymer compound in a precursor film face a random azimuth (direction) by thermal motion, a probability of decreasing a physical distance between the crosslinkable functional groups is low. Further, in a case of emitting random light (unpolarized light), the crosslinkable polymer groups are reacted with each other by decreasing the physical distance between the crosslinkable functional groups, but a polarizing direction and a direction of the reaction portion are necessary to be arranged uniformly in a predetermined direction for the crosslinkable polymer groups to be reacted by emitting linear polarized light. In addition, compared to the linear light, irradiance of the oblique light per unit area is decreased by an area of spread irradiated area. That is, a rate of the crosslinkable functional groups which are to be reacted by the linear polarized light or the oblique light is lower than the rate in the case where the random light (unpolarized light) is emitted with respect to the substrate surface from a vertical direction. Accordingly, crosslink density (crosslink degree) in the formed alignment film is easily decreased.

Meanwhile, in Embodiment 1, after forming the alignment films 22 and 32 containing the compounds before the alignment process, the liquid crystal layer 40 is sealed between the alignment film 22 and the alignment film 32. Then, the compounds before the alignment process in the alignment films 22 and 32 are crosslinked with each other, while performing the predetermined alignment of the liquid crystal molecules 41 by applying the voltage to the liquid crystal layer 40 and arranging the direction of the crosslinkable functional groups by the liquid crystal molecules 41 (that is, regulating the direction of the second side chain and also the direction of the first side chain with respect to the substrate or the electrode by the liquid crystal molecules 41). Accordingly, it is possible to form the alignment films 22 and 32 which apply the pretilt θ to the liquid crystal molecules 41A and 41B. That is, according to the liquid crystal display (liquid crystal display element) and the manufacturing method thereof of Embodiment 1, it is possible to easily improve the response property without using the large-scale apparatus. In addition, when crosslinking the compounds before an alignment process with each other, it is possible to apply the pretilt θ with respect to the liquid crystal molecules 41 regardless of the emitting direction of the ultraviolet ray, and thus it is possible to form a high-definition pixel. Further, since the compounds after the alignment process are generated in a state where the direction of the crosslinkable functional groups in the compounds before an alignment process is arranged, the crosslink degree of the compounds after the alignment process may be higher than that of the alignment films obtained by the manufacturing method of the related art. Therefore, even when driving for a long time, since a new crosslinked structure is difficult to be formed during the driving, the pretilts $\theta_2$ and $\theta_2$ of the liquid crystal molecules 41A and 41B are maintained in the state at the time of being manufactured, and it is possible to improve reliability.

In this case, in Embodiment 1, since the compounds before an alignment process in the alignment films 22 and 32 are crosslinked with each other after sealing the liquid crystal layer 40 between the alignment films 22 and 32, it is possible to change the transmittance at the time of driving the liquid crystal display element to be continuously increased.

Figure 12A:
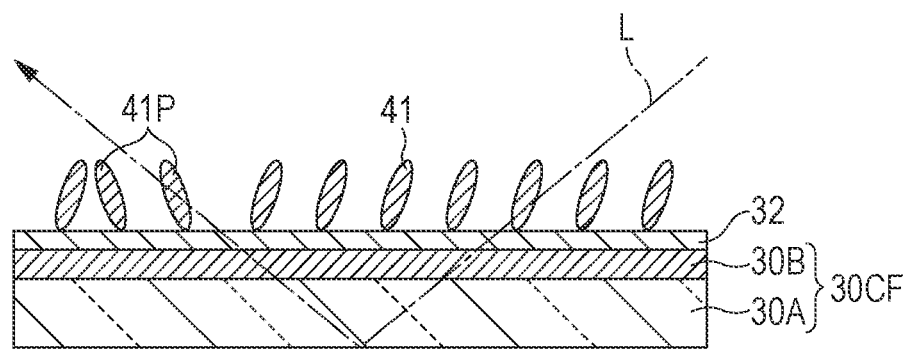
FIGS. 12A and 12B are schematic cross-sectional views for illustrating order parameters.
Figure 12B:
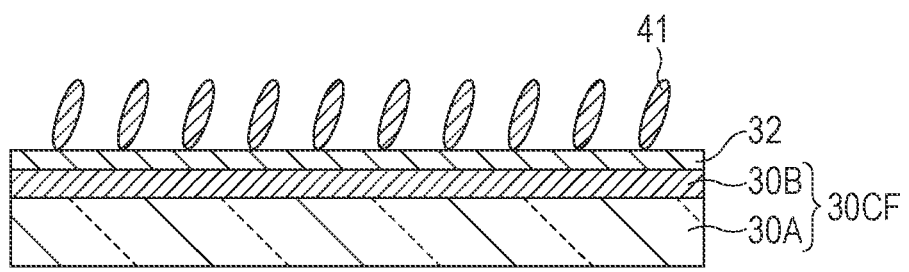

In detail, in a case of using the photo-alignment film technology of the related art, as shown in FIG. 12A, since some of oblique light L emitted for performing the pretilt process is reflected by a rear surface of the glass substrate 30, a direction of the pretilt of some liquid crystal molecules 41 (41P) may be disordered. In this case, since the direction of the pretilt of some liquid crystal molecules 41 is deviated from the direction of the pretilt of the other liquid crystal molecules 41, an order parameter which is an index for showing the aligned state (to what extent the aligned state is uniform) of the liquid crystal molecules 41 becomes small. Accordingly, in the initial stage when driving the liquid crystal display element, some liquid crystal molecules 41P having the deviated direction of the pretilt show the different movement from that of the other liquid crystal molecules 41 and are aligned in a direction different from that of the other liquid crystal molecules 41, and accordingly the transmittance becomes high. However, after that, since the liquid crystal molecules 41P have a property to be aligned to be arranged as uniformly as the alignment of the other liquid crystal molecules 41, the director direction of the liquid crystal molecules 41P which are temporarily tilted is set to be perpendicular to the substrate surface, and then is arranged uniformly as the director direction of the other liquid crystal molecules 41. Accordingly, the transmittance of the liquid crystal display element may be not continuously increased, but may be locally decreased.

Meanwhile, in Embodiment 1 in which the pretilt process is performed by the crosslink reaction of the compounds before the alignment process after sealing the liquid crystal layer 40, the pretilt is applied based on the alignment direction of the liquid crystal molecules 41 at the time of driving which is regulated by the alignment regulation unit such as the slit portion 21 for regulating the alignment of the liquid crystal molecules 41. Accordingly, as shown in FIG.

12B, the direction of the pretilt of the liquid crystal molecules 41 is easily arranged uniformly, and accordingly the order parameter becomes large (closer to 1). Thus, at the time of driving the liquid crystal display element, since the liquid crystal molecules 41 show the uniform movement, the transmittance is continuously increased.

In addition, in the other manufacturing method of the liquid crystal display element of the related art, after forming the liquid crystal layer using a liquid crystal material containing monomers having photopolymerizability, light emission is performed while performing the predetermined alignment of the liquid crystal molecules in the liquid crystal layer in a state of containing the monomers, to polymerize the monomers. By doing so, the formed polymer applies the pretilt with respect to the liquid crystal molecules. However, in the manufactured liquid crystal display element, unreacted photopolymerizable monomers remain in the liquid crystal layer, and the reliability may be decreased. In addition, the light emitting time is necessary to be long for removing the unreacted monomers, and the time (tact) necessary for manufacturing may become longer.

In contrast, in Embodiment 1, although the liquid crystal layer is not formed using the liquid crystal composition (liquid crystal material) obtained by adding the monomers as described above, since the alignment films 22 and 32 apply the pretilts $\theta_1$ and $\theta_2$ with respect to the liquid crystal molecules 41A and 41B in the liquid crystal layer 40, it is possible to improve the reliability. In addition, it is possible to suppress the long tact. Further, it is possible to excellently apply the pretilt $\theta$ with respect to the liquid crystal molecules 41A and 41B without using the technology of applying the pretilt with respect to the liquid crystal molecules of the related art, for example a rubbing process. Accordingly, there are no occurrences of a decrease in contrast due to rubbing scratch on the alignment film, disconnection of wires due to static electricity at the time of rubbing, and a decrease in reliability due to foreign material, which are the problems of the rubbing process.

In Embodiment 1, the case of using the alignment films 22 and 32 containing the compounds before the alignment process including the main chain mainly having the polyimide structure has been described, but the main chain included by the compound before the alignment process is not limited to the main chain having the polyimide structure. For example, the main chain may have a polysiloxane structure, a polyacrylate structure, a polymethacrylate structure, a maleinimide polymer structure, a styrene polymer structure, a styrene/maleinimide polymer structure, a polysaccharide structure, or a polyvinyl alcohol structure, and among them, the compound before the alignment process including the main chain having the polysiloxane structure is preferable. A glass transition temperature $T_g$ of the compound configuring the main chain is desirably equal to or higher than 200° C. This is because the same effects as those of the polymer compound containing the polyimide structure are obtained. As the compound before the alignment process including the main chain having the polysiloxane structure, the polymer compound having the polysiloxane structure represented by a formula (2) is used, for example. R10 and R11 of the formula (2) are arbitrarily set as long as they are monovalent groups configured by containing carbon, but it is preferable that any one of R10 and R11 contains the crosslinkable functional group as the second side chain. This is because it is easy to obtain sufficient alignment regulation ability in the compound after the alignment process.

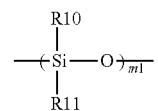

(2)

Herein, R10 and R11 are monovalent organic groups and m1 is an integer equal to or greater than 1.

In Embodiment 1, by providing the lit portions 21 (or concavo-convex portions) on the pixel electrodes 20B, alignment division is performed to improve the viewing angle property, but it is not limited thereto. For example, protrusions as the alignment regulation unit may be provided between the pixel electrodes 20B and the alignment film 22, instead of the slit portions 21. By providing the protrusions as described above, it is also possible to obtain the same effects as in the case of the providing the slit portions 21. In addition, the protrusions as the alignment regulation unit may be provided between the counter electrode 30B and the alignment film 32 of the CF substrate 30. In this case, the protrusions on the TFT substrate 20 and the protrusions on the CF substrate 30 are disposed so as not to face each other between the substrates. In this case, it is also possible to obtain the same effects as described above.

Next, the other embodiments will be described, but the same reference numerals will be denoted for the constituent elements in common with those of Embodiment 1 and description thereof will be omitted. The same operations and effects as those in Embodiment 1 will also be appropriately omitted. Various technical matters described in Embodiment 1 are also appropriately applied to the other embodiments.

Embodiment 2

Embodiment 2 is modification of Embodiment 1. In Embodiment 1, the liquid crystal display (liquid crystal display element) in which the alignment films 22 and 32 are formed so that the pretilts $\theta_1$ and $\theta_2$ of the liquid crystal molecules 41A and 41B positioned in the vicinity thereof are substantially the same as each other, has been described, but in Embodiment 2, they are differentiated as the pretilt $\theta_1$ and the pretilt $\theta_2$.

In detail, in Embodiment 2, first, the TFT substrate 20 including the alignment film 22 and the CF substrate 30 including the alignment film 32 are manufactured in the same manner as Step S101 described above. Next, an ultraviolet absorbing agent, for example, is contained and sealed in the liquid crystal layer 40. Then, the predetermined voltage is applied between the pixel electrode 20B and the counter electrode 30B and the ultraviolet ray is emitted from the TFT substrate 20 side to crosslink the compounds before the alignment process in the alignment film 22 with each other. At that time, since the ultraviolet absorbing agent is contained in the liquid crystal layer 40, the ultraviolet ray incident from the TFT substrate 20 side is absorbed by the ultraviolet absorbing agent in the crystal layer 40 and hardly approaches the CF substrate 30 side. Accordingly, the compounds after the alignment process are generated in the alignment film 22. Next, the voltage which is different from the predetermined voltage described above is applied between the pixel electrode 20B and the counter electrode 30B and the ultraviolet ray is emitted from the CF substrate 30 side to cause the compounds before the alignment process in the alignment film 32 to react with each other and form the compounds after the alignment process. Accordingly, the pretilts $\theta_1$ and $\theta_2$ of the liquid crystal molecules 41A and 41B positioned in the vicinity of the alignment films 22 and 32 can be set based on the voltage applied when the ultraviolet ray is emitted from the TFT substrate 20 side and the voltage applied when the ultraviolet ray is emitted from the CF substrate 30 side. Thus, it is possible to differentiate the pretilt $\theta_1$ and the pretilt $\theta_2$. However, a TFT switching element or various bus lines are provided on the TFT substrate 20 and various transverse electric fields are generated during the driving. Thus, it is desirable to form the alignment film 22 on the side of the TFT substrate 20 so that the pretilt $\theta_2$ of the liquid crystal molecules 41A positioned in the vicinity thereof is greater than the pretilt $\theta_2$ of the liquid crystal molecules 41B positioned in the vicinity of the alignment film 32. Therefore, it is possible to efficiently decrease the alignment disorder of the liquid crystal molecules 41A due to the transverse electric fields.

Embodiment 3

Figure 7:
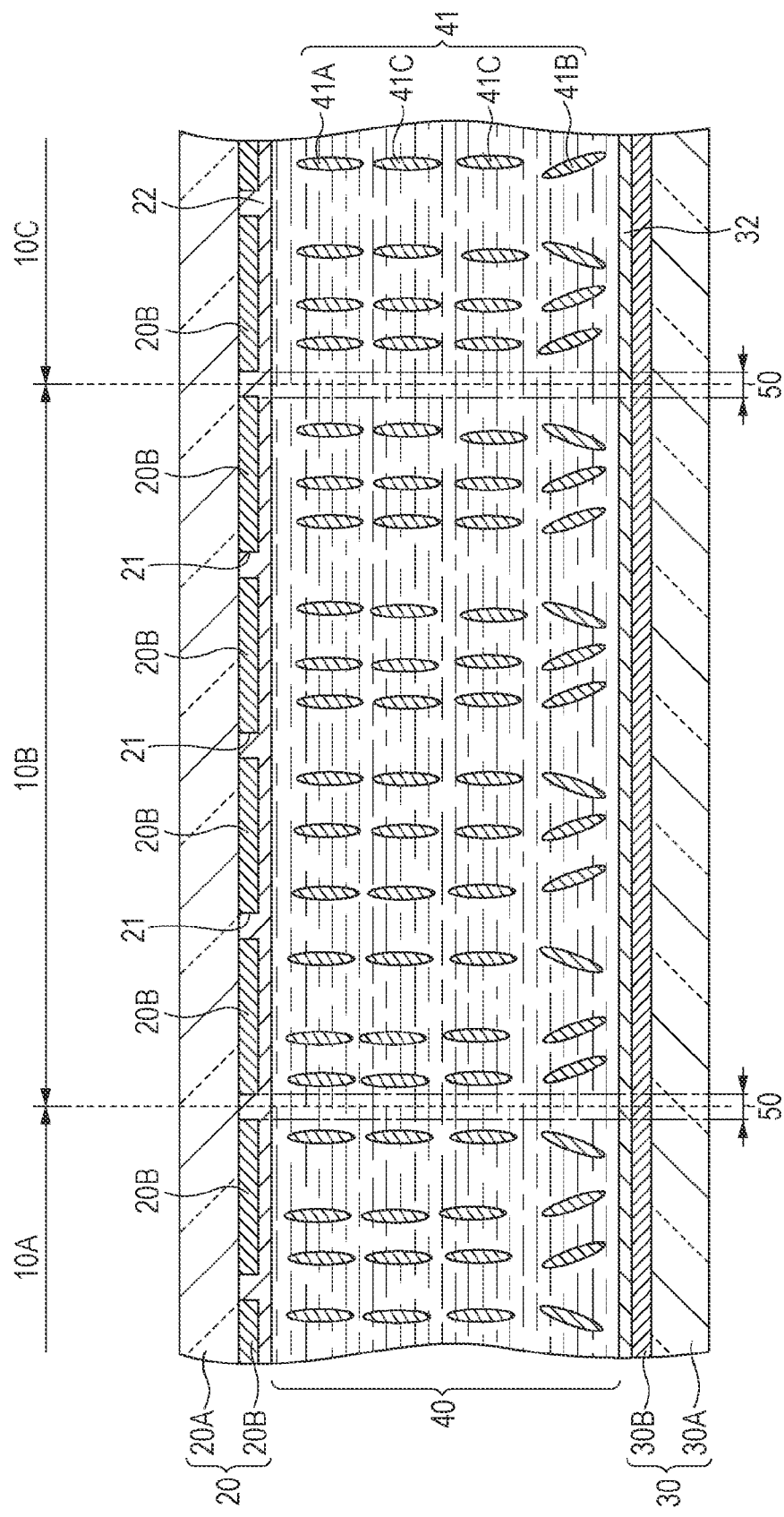
FIG. 7 is a schematic partial cross-sectional view of a liquid crystal display of Embodiment 3.

Embodiment 3 is modification of Embodiments 1 and 2. FIG. 7 shows a schematic partial cross-sectional view of a liquid crystal display (liquid crystal display element) according to Embodiment 3. In Embodiment 3, the alignment film 22 is configured by not containing the compounds after the alignment process, unlike Embodiment 1. That is, Embodiment 3 is configured so that the pretilt $\theta_2$ of the liquid crystal molecules 41B positioned in the vicinity of the alignment film 32 has a value greater than 0° and the pretilt $\theta_2$ of the liquid crystal molecules 41A positioned in the vicinity of the alignment film 22 is 0°.

Herein, the alignment film 22 is, for example, configured with the other vertical alignment agent described above.

When forming the alignment film 22 on the TFT substrate 20 (Step 101 of FIG. 3), the liquid crystal display (liquid crystal display element) of Embodiment 3 can be manufactured by using the other vertical alignment agent described above, instead of the compound before the alignment process or the polymer compound precursor as the compound before the alignment process.

In the liquid crystal display (liquid crystal display element) of Embodiment 3, in the liquid crystal layer 40, the pretilt $\theta_1$ of the liquid crystal molecules 41A is 0° C. and the pretilt $\theta_2$ of the liquid crystal molecules 41B is greater than 0° C. Accordingly, it is possible to significantly improve the response speed with respect to the driving voltage compared to the liquid crystal display element in which the pretilt process is not performed. In addition, since the liquid crystal molecules 41A are aligned in the state close to the normal direction of the glass substrates 20A and 30A, it is possible to decrease the transmission amount of the light when performing the black display, and it is possible to improve the contrast compared to the liquid crystal display (liquid crystal display element) of Embodiments 1 and 2. That is, in the liquid crystal display (liquid crystal display element), for example, it is possible to improve the contrast by setting the pretilt $\theta_1$ of the liquid crystal molecules 41A positioned on the TFT substrate 20 side to 0°, and to improve the response speed by setting the pretilt $\theta_2$ of the liquid crystal molecules 41B positioned on the CF substrate 30 side to be greater than 0°. Accordingly, it is possible to improve the balance of the response speed with respect to the driving voltage and the contrast.

According to the liquid crystal display (liquid crystal display element) and the manufacturing method thereof of Embodiment 3, the alignment film 22 not containing the compound before the alignment process is formed on the TFT substrate 20, and the alignment film 32 containing the compound before the alignment process is formed on the CF substrate 30. Next, after sealing the liquid crystal layer 40 between the TFT substrate 20 and the CF substrate 30, the compounds before the alignment process in the alignment film 32 are reacted with each other to generate the compounds after the alignment process. Accordingly, since the alignment film 32 which applies the pretilt θ with respect to the liquid crystal molecules 41B can be formed without using the large-scale light emitting apparatus, it is possible to easily improve the response property. For example, it is possible to secure the high reliability compared to the case of sealing the liquid crystal layer using the liquid crystal composition (liquid crystal material) containing the photopolymerizable monomers to polymerize the photopolymerizable monomers.

The other effects of Embodiment 3 are the same as those of Embodiment 1.

Figure 8:
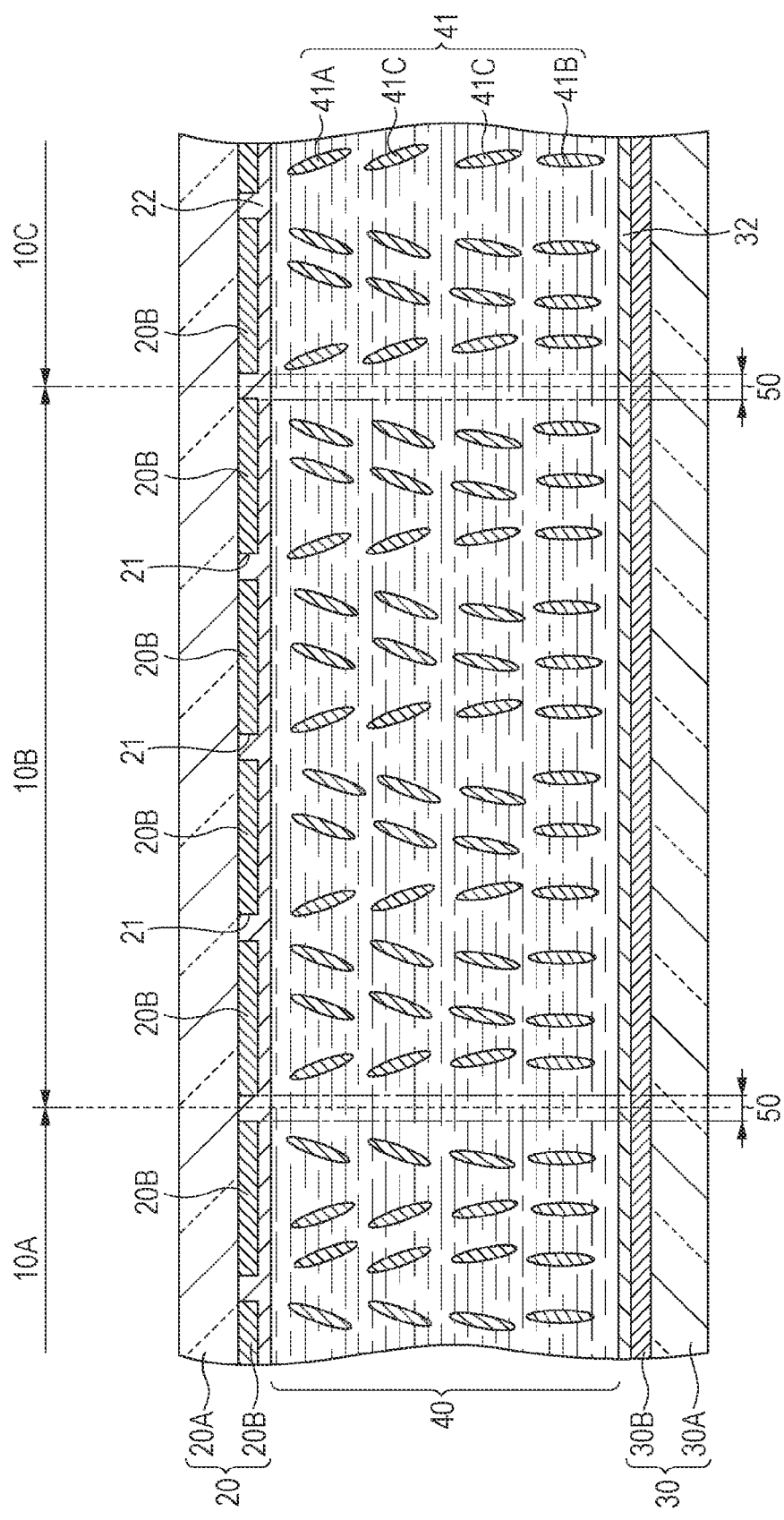
FIG. 8 is a schematic partial cross-sectional view of a modification example of a liquid crystal display of Embodiment 3.

As shown in FIG. 7, Embodiment 3 is configured so that the alignment film 32 which covers the CF substrate 30 contains the compounds after the alignment process and the pretilt $\theta_2$ is applied to the liquid crystal molecules 41B positioned on the side of the CF substrate 30 of the liquid crystal layer 40, but it is not limited thereto. That is, as shown in FIG. 8, Embodiment 3 may be configured so that the alignment film 32 does not contain the compounds after the alignment process, but the alignment film 22 which covers the TFT substrate 20 contains the compounds after the alignment process and the pretilt $\theta_1$ is applied to the liquid crystal molecules 41A positioned on the side of the TFT substrate 20 of the liquid crystal layer 40. In this case, the operation is performed in the same manner as in Embodiment 3 and the same effects can be obtained. However, since the various transverse electric fields are generated when performing the driving, in the TFT substrate 20 as described above, it is desirable to form the alignment film 22 on the side of the TFT substrate 20 so as to apply the pretilt $\theta_1$ with respect to the liquid crystal molecules 41A positioned in the vicinity thereof. Accordingly, it is possible to efficiently decrease the alignment disorder of the liquid crystal molecules 41 due to the transverse electric fields.

Embodiment 4

Figure 9:
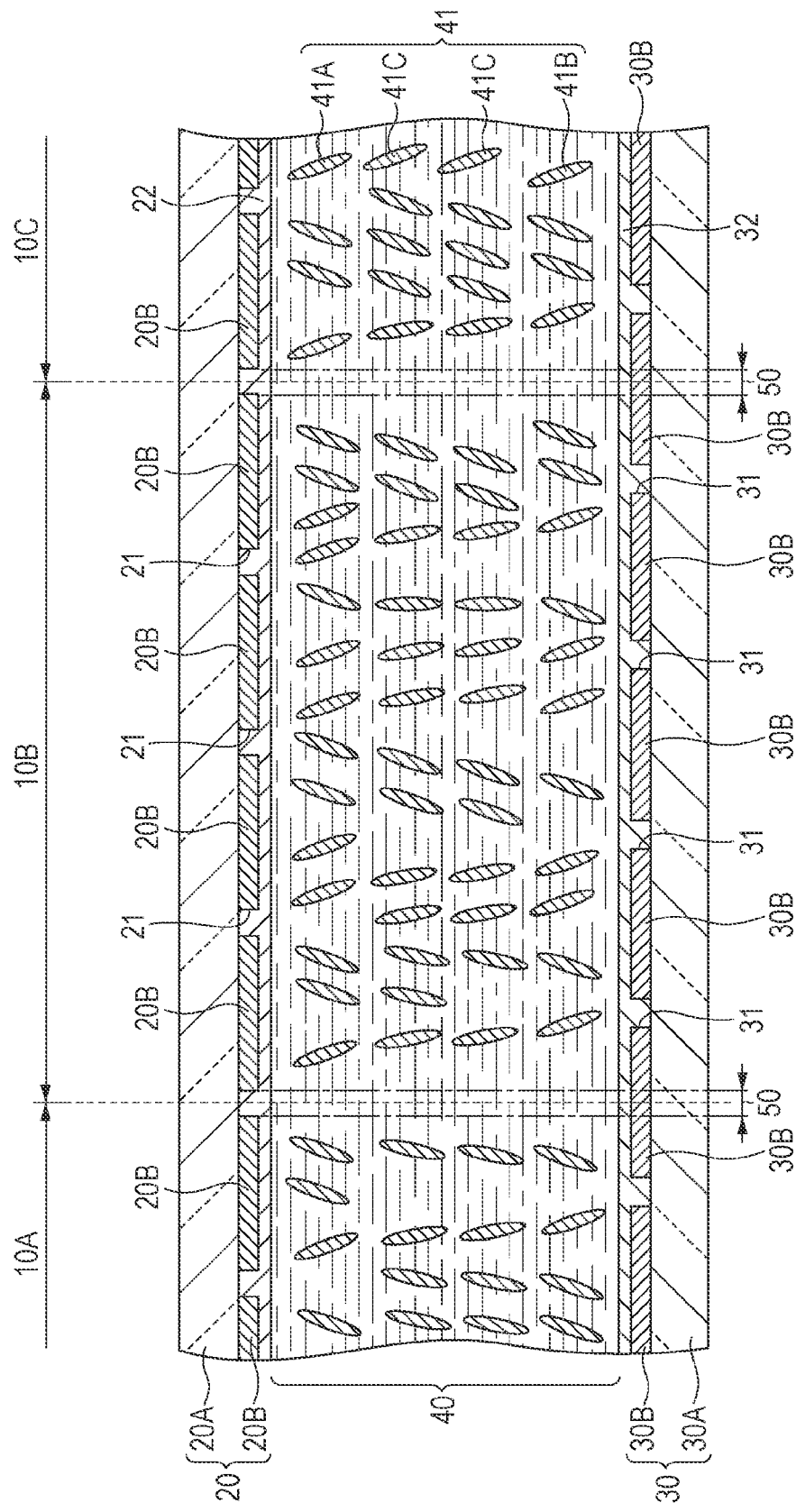
FIG. 9 is a schematic partial cross-sectional view of a liquid crystal display of Embodiment 4.

Embodiment 4 is also modification of Embodiments 1 and 2. FIG. 9 shows a schematic partial cross-sectional view of a liquid crystal display (liquid crystal display element) according to Embodiment 4. Embodiment 4 has the same configuration as that of the liquid crystal display (liquid crystal display element) of Embodiments 1 and 2, except the different configuration of the counter electrode 30B included in the CF substrate 30.

In detail, in the counter electrodes 30B, slit portions 31 are provided in each pixel in the same pattern as the pixel electrodes 20B. The slit portions 31 are disposed so as not face the slit portions 21 between the substrates. Accordingly, if the driving voltage is applied, since the electrical field oblique with respect to the director of the liquid crystal molecules 41 is applied thereto, the response speed with respect to the voltage is improved, and regions with different alignment directions are formed in the pixel (alignment division), and accordingly a viewing angle property is improved.

Figure 3:
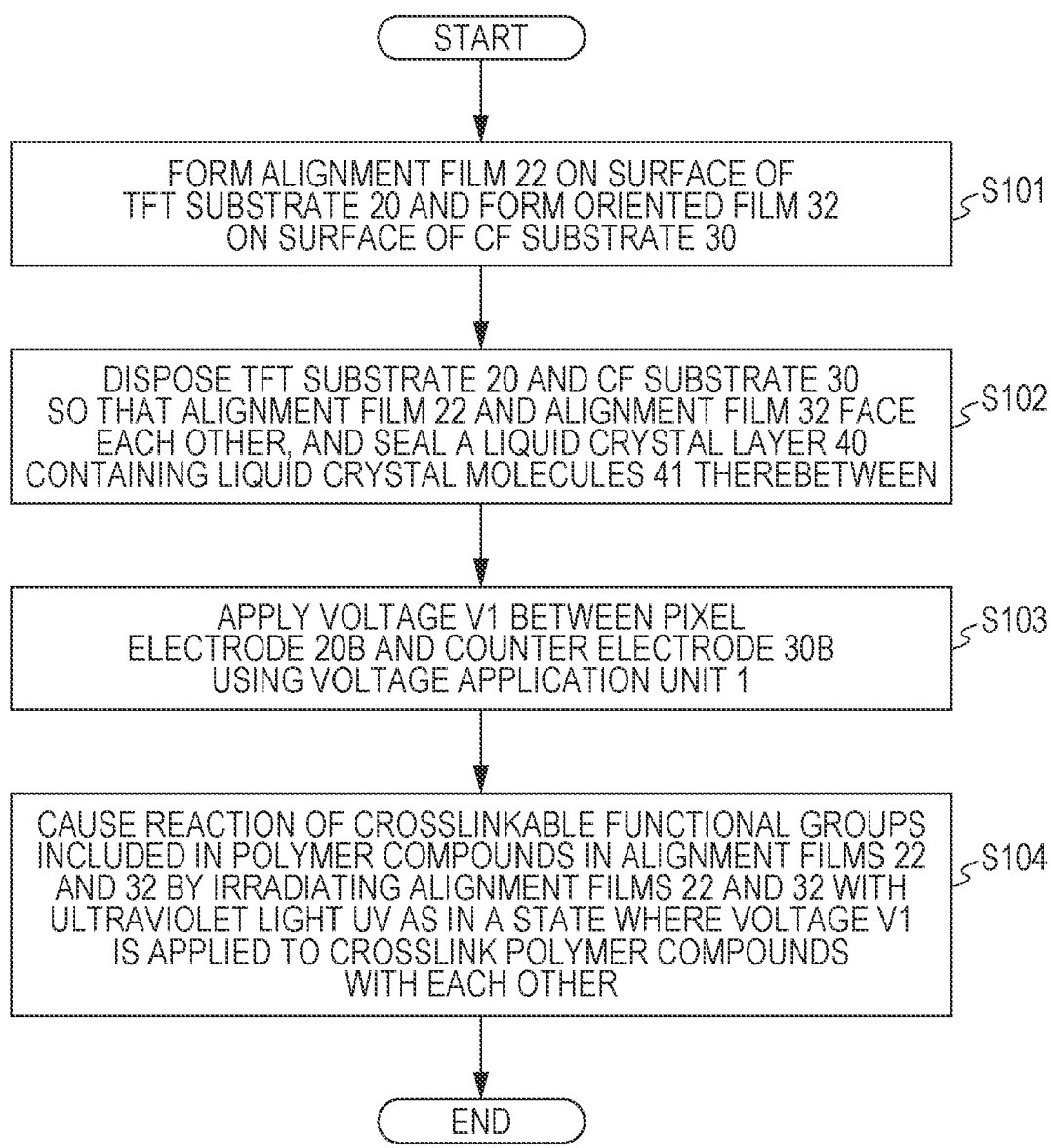
FIG. 3 is a flowchart for illustrating a manufacturing method of a liquid crystal display shown in FIG. 2.

The liquid crystal display (liquid crystal display element) of Embodiment 4 can be manufactured by using the substrate in which the counter electrodes 30B including the predetermined slit portions 31 are provided on the color filter of the glass substrate 30A, as the CF substrate 30, in Step S101 of FIG. 3.

According to the liquid crystal display (liquid crystal display element) and the manufacturing method thereof of Embodiment 4, after forming the alignment films 22 and 32 containing the polymer compounds before crosslink, the liquid crystal layer 40 is sealed between the alignment film 22 and the alignment film 32. Then, the polymer compounds before crosslink in the alignment films 22 and 32 are reacted with each other to generate the crosslinked polymer compounds. Accordingly, the predetermined pretilts $\theta_2$ and $\theta_2$ are applied with respect to the liquid crystal molecules 41A and 41B. Thus, it is possible to significantly improve the response speed with respect to the driving voltage compared to the liquid crystal display element in which the pretilt process is not performed. Therefore, the alignment films 22 and 32 which apply the pretilt $\theta$ with respect to the liquid crystal molecules 41 can be formed without using the large-scale light emitting apparatus. Accordingly, it is possible to easily improve the response property. For example, it is possible to secure the high reliability compared to the case of sealing the liquid crystal layer using the liquid crystal composition (liquid crystal material) containing the photopolymerizable monomers to polymerize the photopolymerizable monomers and performing the pretilt process.

The operations and the effects of the liquid crystal display (liquid crystal display element) and the manufacturing method thereof of Embodiment 4 are the same as the operations and the effects thereof in Embodiments 1 and 2 described above.

In Embodiment 4, the alignment films 22 and 32 are formed so as to apply the pretilts $\theta_2$ and $\theta_2$ with respect to the liquid crystal molecules 41A and 41B positioned in the vicinity thereof, but the pretilt $\theta$ may be applied to the liquid crystal molecules 41 positioned in the vicinity of any one of the alignment film 22 and 32, using the same method as the manufacturing method described in Embodiment 3. In this case, it is also possible to obtain the same effects as in Embodiment 3 described above.

Embodiment 5

In Embodiments 1 to 4, the compounds before the alignment process are reacted with each other in at least one of the alignment film 22 and 32 in the state where the liquid crystal layer 40 is provided, to generate the compounds after the alignment process, and accordingly the pretilt is applied with respect to the liquid crystal molecules 41. Meanwhile, in Embodiment 5, by decomposing the structure of the polymer compound in at least one of the alignment film 22 and 32 in the state where the liquid crystal layer 40 is provided, the pretilt is applied with respect to the liquid crystal molecules 41 in the vicinity thereof. That is, the liquid crystal display (liquid crystal display element) of Embodiment 5 has the same configuration as in Embodiments 1 to 4, except the different forming method of the alignment films 22 and 32.

In a case where the liquid crystal molecules 41A and 41B have the predetermined pretilts $\theta_1$ and $\theta_2$, the liquid crystal display (liquid crystal display element) of Embodiment 5 is manufactured as follows, for example. First, the alignment films 22 and 32 containing the polymer compound such as the other vertical alignment agent described above, are formed on the TFT substrate 20 and the CF substrate 30, for example. Next, the TFT substrate 20 and the CF substrate 30 are disposed so that the alignment film 22 and the alignment film 32 face each other, and the liquid crystal layer 40 is sealed between the alignment films 22 and 32. Then, the voltage is applied between the pixel electrode 20B and the counter electrode 30B, and as in the state where the voltage is applied thereto, the ultraviolet ray UV containing large amounts of optical elements having a short wavelength range with a wavelength of approximately 250 nm compared to the ultraviolet ray UV described above is emitted to the alignment films 22 and 32. At that time, the polymer compounds in the alignment films 22 and 32 are decomposed, for example, by the ultraviolet ray UV having a short wavelength range, to change the structure. Accordingly, the predetermined pretilts $\theta_1$ and $\theta_2$ can be applied to the liquid crystal molecules 41A positioned in the vicinity of the alignment film 22 and the liquid crystal molecules 41B positioned in the vicinity of the alignment film 32.

As the polymer compounds included in the alignment films 22 and 32 before sealing the liquid crystal layer 40, the polymer compound having the polyimide structure represented by a formula (31) is used, for example. With the polyimide structure represented by the formula (31), a cyclobutane structure of a formula (32) is cleaved by the irradiation of the ultraviolet ray UV to have the structure represented by the formula (32) as shown in a chemical reaction formula of the formula (I).

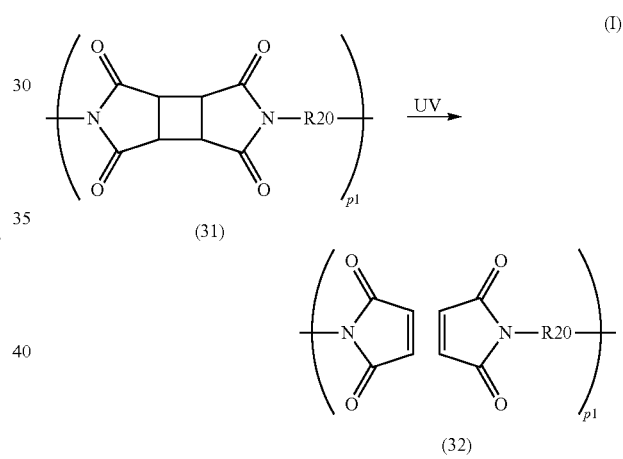

Herein, R20 is a divalent organic group and p1 is an integer equal to or greater than 1.

In Embodiment 5, since the liquid crystal molecules 41A positioned in the vicinity of the alignment film 22 and the liquid crystal molecules 41B positioned in the vicinity of the alignment film 32 have the predetermined pretilts $\theta_1$ and $\theta_2$, it is possible to significantly improve the response speed compared to the liquid crystal display element in which the pretilt process is not performed. It is possible to form at least one of the alignment films 22 and 32 which can apply the pretilt $\theta$ with respect to the liquid crystal molecules 41, without using the large-scale apparatus. Accordingly, it is possible to easily improve the response property. Since the decomposition of the liquid crystal molecules 41 may occur by the ultraviolet ray emitted with respect to the alignment films 22 and 32, higher reliability is readily secured in Embodiments 1 to 4.

Embodiment 6

Embodiment 6 relates to the liquid crystal display according to the first reference embodiment, and the manufacturing method of the liquid crystal display according to the first reference embodiment and the second reference embodiment.

In Embodiments 1 to 4, the compounds after the alignment process are obtained by crosslinking the crosslinkable functional groups of the compounds before the alignment process including the crosslinkable functional group as the second side chain, with each other. Meanwhile, in Embodiment 6, the compounds after the alignment process are obtained based on the compounds before the alignment process including photosensitive functional groups which accompanies the deformation due to emission of the energy ray, as the second side chain. That is, in the liquid crystal display of Embodiment 6, at least one of the pair of alignment films 22 and 32 contains a compound (compound after an alignment process) obtained by deforming a polymer compound including a first side chain which interacts with the liquid crystal molecules 41 and a photosensitive functional group as a second side chain, the liquid crystal composition configuring the liquid crystal layer 40 contains at least one kind of an alkenyl compound represented by the general formula (AN-1), and pretilt is applied to the liquid crystal molecules 41 by the deformed compound (compound after the alignment process).

Herein, in Embodiment 6, the alignment films 22 and 32 are configured by containing one kind or two or more kinds of the polymer compounds (compounds after the alignment process) including the crosslinked structure in the second side chain. The pretilt is applied to the liquid crystal molecules 41 by the deformed compound. Herein, the compound after the alignment process is generated by forming the alignment films 22 and 32 in a state of containing one kind or two or more kinds of the polymer compounds (compounds before the alignment process) including the main chain, the first side chain, and the second side chain, providing the liquid crystal layer 40 therein, and then deforming the polymer compounds, or emitting the energy ray to the polymer compounds, more specifically deforming the crosslinkable functional group contained in the second side chain while applying the electrical field or a magnetic field thereto. The compound after the alignment process has a structure of arranging the liquid crystal molecules 41 in the predetermined direction (specifically, the oblique direction) with respect to the pair of substrates (specifically, the TFT substrate 20 and the CF substrate 30). As described above, the compound after the alignment process is contained in the alignment films 22 and 32 by deforming the polymer compounds or emitting the energy ray to the polymer compounds, and accordingly the pretilt may be applied with respect to the liquid crystal molecules 41 in the vicinity of the alignment films 22 and 32, and therefore the response speed becomes high and the display property is improved.

As the photosensitive functional group, an azobenzene compound having an azo group, a compound having imine and aldimine in a skeleton (for convenience, referred to as "aldimine benzene"), and a compound having a styrene skeleton (for convenience, referred to as "stilbene") can be used. The compounds respond to the energy ray (for example, ultraviolet ray) to be deformed, that is, transition from a trans state to a cis state, so as to apply the pretilt to the liquid crystal molecules 41.

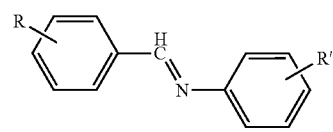

ALDIMINE BENZENE

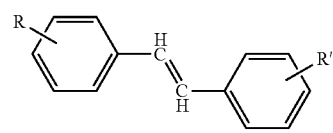

STILBENE

In detail, as "X" of the azobenzene compound represented by a formula (AZ-0), the following formula (AZ-1) to formula (AZ-9) can be used, for example.

(AZ-0)

(AZ-1)

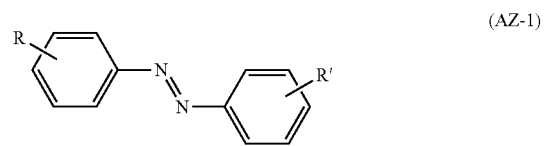

(AZ-2)

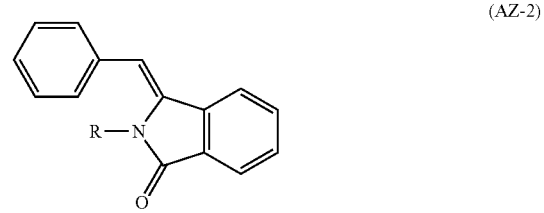

(AZ-3)

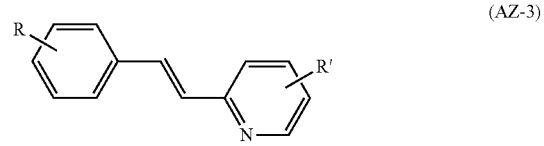

(AZ-4)

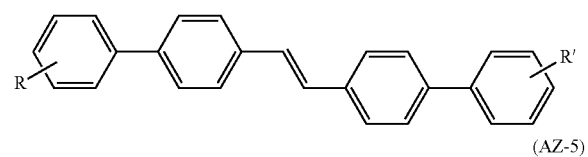

(AZ-5)

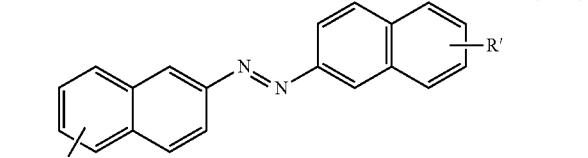

(AZ-6)

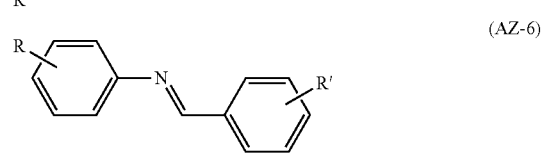

-continued

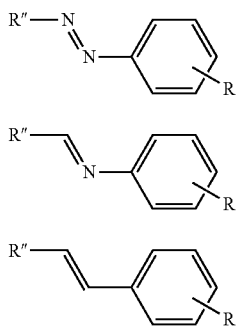

Herein, any one of R and R" is bonded to a benzene ring containing diamine, the other one is a terminal group, each of R, R', and R" is a monovalent group having a hydrogen atom, a halogen atom, an alkyl group, an alkoxy group, and a carbonate group, or a derivative thereof, and R" is directly bonded to the benzene ring having diamine.

The liquid crystal display and the manufacturing method thereof of Embodiment 6 are basically and substantially the same as the liquid crystal display and the manufacturing method thereof in Embodiment 1 to Embodiment 4, except for using the compounds before the alignment process including photosensitive functional groups which accompanies the deformation due to emission of the energy ray (specifically, ultraviolet ray), and therefore the description thereof will be omitted.

Example 1

Example 1-A

Example 1-A relates to the liquid crystal display (liquid crystal display element) according to the first embodiment, and the manufacturing method of the liquid crystal display according to the first embodiment and the second reference embodiment. In Example 1-A, the liquid crystal display (liquid crystal display element) shown in FIG. 2 was manufactured in the following procedure.

First, the TFT substrate 20 and the CF substrate 30 were prepared. As the TFT substrate 20, a substrate obtained by forming the pixel electrode 20B formed of ITO having a slit pattern (line width of 60 μm and line space of 10 μm: slit portions 21) on one surface side of the glass substrate 20A having a thickness of 0.7 mm, was used. As the CF substrate 30, a substrate obtained by forming the counter electrode (so-called solid electrode) 30B formed of ITO on the color filter of the glass substrate 30A having a thickness of 0.7 mm on which the color filter is formed, was used. The oblique electrical filed is applied between the TFT substrate 20 and the CF substrate 30 by the slit pattern formed on the pixel electrode 20B. Then, the spacer projection having a thickness of 3.2 μm was formed on the TFT substrate 20.

Meanwhile, the alignment film material was prepared. In this case, first, 1 mole of the compound having the cross-linkable functional group shown in the formula (A-7) which is the diamine compound, 1 mole of the compound having vertical alignment inducing structure portion shown in the formula (B-6), and 2 moles of tetracarboxylic dianhydride shown in the formula (E-2) were dissolved in N-methyl-2-pyrrolidone (NMP). Next, after causing this solution to react at 60° C. for 6 hours, large excess of pure water was poured with respect to the reacted solution to precipitate a reactive product. Then, after separating the precipitated solid matter, the resultant material was washed with the pure water, dried at 40° C. for 15 hours under the reduced pressure, and accordingly polyamic acid which was the polymer compound precursor as the compound before the alignment process was synthesized. Lastly, by dissolving 3.0 grams of the obtained polyamic acid to NMP, the solution having solid content concentration of 3% by mass was obtained and then was filtered with a 0.2 μm filter. A structural formula of the obtained compound before the alignment process is shown below.

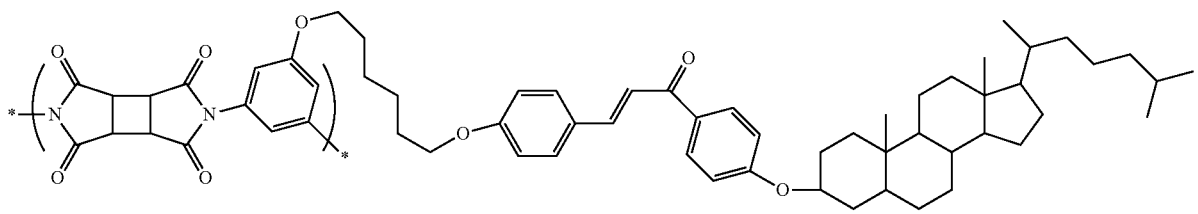

Next, after applying the prepared alignment film material to each of the TFT substrate 20 and the CF substrate 30 based on a spin coating method, the coated film was dried for 80 seconds on a hot plate at 80° C. Then, the TFT substrate 20 and the CF substrate 30 were heated in an oven at 200° C. for 1 hour under a nitrogen gas atmosphere. Accordingly, the alignment films 22 and 32 having a thickness of 90 nm on the pixel electrode 20B and the counter electrode 30B were formed.

Then, an ultraviolet curing resin containing silica particles having a particle diameter of 3.2 μm was applied to a periphery of a pixel portion on the CF substrate 30 to form a sealing portion, and the liquid crystal compositions (liquid crystal materials) shown in the following Table 1A were dropwisely added to the portion surrounded by the sealing portion. In all examples, MLC-6608 (manufactured by Merck Ltd.) was used as the liquid crystal molecules 41 having negative dielectric anisotropy. After that, the TFT substrate 20 and the CF substrate 30 were bonded to each other to cure the sealing portion. Then, the substrates were heated in an oven at 120° C. for 1 hour to completely cure the sealing portion. Accordingly, the liquid crystal layer 40 was sealed and a liquid crystal cell could be completed.

TABLE 1A

Liquid Crystal Compositions of Example 1-A
(a) MLC-6608: 58% by mass
(b) Alkenyl compound represented by general formula (AN-2): 38% by mass
Herein, $R_{AN21}$: alkenyl group having 2 carbon atoms
$R_{AN22}$: alkyl group having 3 carbon atoms
(c) Alkenyl compound represented by general formula (AN-2): 4% by mass TABLE 1A-continued Herein, $R_{4N21}$: alkenyl group having 3 carbon atoms
$R_{4N22}$: alkyl group having 3 carbon atoms Next, in a state of applying a square wave AC electrical filed (60 Hz) with a voltage effective value of 20 volts with respect to the liquid crystal cell manufactured as described above, 500 mJ (measured at a wavelength of 365 nm) of the uniform ultraviolet ray was emitted thereto to cause the compounds before an alignment process in the alignment films 22 and 32 to react with each other. Accordingly, the alignment films 22 and 32 containing the compounds after the alignment process were formed on both the TFT substrate 20 and the CF substrate 30. By doing so, the liquid crystal display (liquid crystal display element) shown in FIG. 2 in which the liquid crystal molecules 41A and 41B on the TFT substrate 20 and the CF substrate 30 sides have the pretilt could be completed. Finally, a pair of polarizing plates were bonded to the outside of the liquid crystal display so that absorption axes are orthogonal to each other.

The voltage retention rates after 3000 hours of the liquid crystal displays of the obtained example 1-A, or Example 1-B to Example 1-K which will be described later are shown in Table 2. Backlight of the liquid crystal display was constantly in a turned on state. Also, a value of $\tau_f$ is shown in Table 2. Herein, "$\tau_f$" means time taken to reach illuminance of 10% from illuminance of 90% when the state was changed from a state in which the driving voltage (7.5 volts) is applied between the pixel electrode 20B and the counter electrode 30B to a state where the driving voltage is not applied thereto (0 volt). LCD5200 (manufactured by Otsuka Electrons Co., Ltd.) was used as the measurement device.

Example 1-B

In Example 1-B, the liquid crystal display was manufactured in the same manner as Example 1-A except for using the liquid crystal compositions shown in the following Table 1B.

TABLE 1B

Liquid Crystal Compositions of Example 1-B
(a) MLC-6608: 61% by mass
(b) Alkenyl compound represented by general formula (AN-2): 15% by mass
Herein, $R_{4N21}$: alkenyl group having 2 carbon atoms
$R_{4N22}$: alkyl group having 4 carbon atoms
(c) Alkenyl compound represented by general formula (AN-3): 13% by mass
Herein, $R_{4N31}$: alkenyl group having 2 carbon atoms
$R_{4N32}$: alkyl group having 1 carbon atoms
(d) Alkenyl compound represented by general formula (AN-3): 11% by mass
Herein, $R_{4N31}$: alkenyl group having 2 carbon atoms
$R_{4N32}$: alkyl group having 2 carbon atoms Example 1-C In Example 1-C, the liquid crystal display was manufactured in the same manner as Example 1-A except for using the liquid crystal compositions shown in the following Table 1C.

TABLE 1C

Liquid Crystal Compositions of Example 1-C
(a) MLC-6608: 55% by mass
(b) Alkenyl compound represented by general formula (AN-2): 31% by mass
Herein, $R_{4N21}$: alkenyl group having 2 carbon atoms
$R_{4N22}$: alkyl group having 3 carbon atoms
(c) Alkenyl compound represented by general formula (AN-3): 12% by mass
Herein, $R_{4N31}$: alkenyl group having 2 carbon atoms
$R_{4N32}$: alkyl group having 1 carbon atoms
(d) Alkenyl compound represented by general formula (AN-4): 2% by mass
Herein, $R_{4N41}$: alkenyl group having 2 carbon atoms
$R_{4N42}$: alkyl group having 4 carbon atoms Example 1-D In Example 1-D, the liquid crystal display was manufactured in the same manner as Example 1-A except for using the liquid crystal compositions shown in the following Table 1D.

TABLE 1D

Liquid Crystal Compositions of Example 1-D
(a) MLC-6608: 81% by mass
(b) Alkenyl compound represented by general formula (AN-5-1): 11% by mass
Herein, $R_{4N51}$: alkenyl group having 2 carbon atoms
$R_{4N52}$: alkyl group having 2 carbon atoms
(c) Alkenyl compound represented by general formula (AN-5-1): 8% by mass
Herein, $R_{4N51}$: alkenyl group having 2 carbon atoms
$R_{4N52}$: alkyl group having 4 carbon atoms Example 1-E In Example 1-E, the liquid crystal display was manufactured in the same manner as Example 1-A except for using the liquid crystal compositions shown in the following Table 1E.

TABLE 1E

Liquid Crystal Compositions of Example 1-E
(a) MLC-6608: 73% by mass
(b) Alkenyl compound represented by general formula (AN-2): 19% by mass
Herein, $R_{4N21}$: alkenyl group having 2 carbon atoms
$R_{4N22}$: alkyl group having 5 carbon atoms
(c) Alkenyl compound represented by general formula (AN-2): 8% by mass
Herein, $R_{4N21}$: alkenyl group having 3 carbon atoms
$R_{4N22}$: alkyl group having 3 carbon atoms Example 1-F In Example 1-F, the liquid crystal display was manufactured in the same manner as Example 1-A except for using the liquid crystal compositions (herein, $L_1$ is a chlorine atom and $L_2$ is a fluorine atom) shown in the following Table 1F and represented by the following formula (AN-5-2).

TABLE 1F

Liquid Crystal Compositions of Example 1-F
(a) MLC-6608: 89% by mass
(b) Alkenyl compound represented by general formula

TABLE 1F-continued (AN-5-2): 4% by mass
Herein, $R_{AN61}$: alkenyl group having 3 carbon atoms
$R_{AN62}$: alkyl group having 2 carbon atoms
(c) Alkenyl compound represented by general formula (AN-5-2): 3% by mass
Herein, $R_{AN61}$: alkenyl group having 4 carbon atoms
$R_{AN62}$: alkyl group having 2 carbon atoms
(d) Alkenyl compound represented by general formula (AN-5-2): 4% by mass

TABLE 1F-continued

Herein, $R_{AN61}$: alkenyl group having 5 carbon atoms
$R_{AN62}$: alkyl group having 2 carbon atoms

Example 1-G

In Example 1-G, the liquid crystal display was manufactured in the same manner as Example 1-C except for using the compound before the alignment process showing the following structural formula.

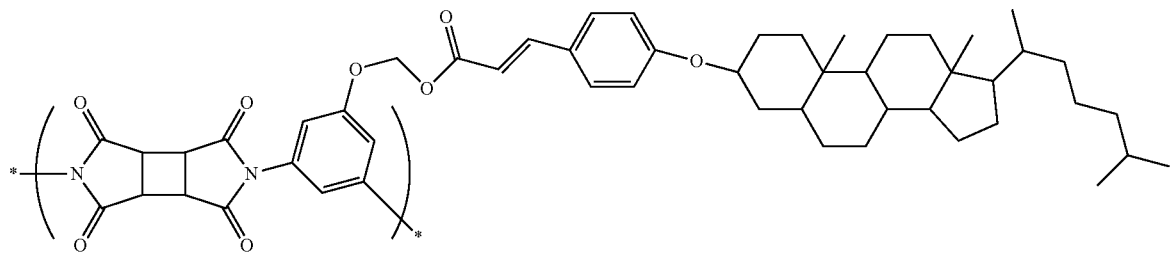

Example 1-H

In Example 1-H, the liquid crystal display was manufactured in the same manner as Example 1-C except for using the compound before the alignment process showing the following structural formula.

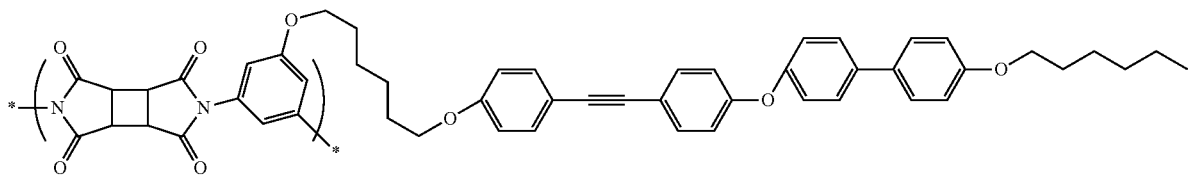

Example 1-I

In Example 1-I, the liquid crystal display was manufactured in the same manner as Example 1-C except for using the compound before the alignment process showing the following structural formula. The mixing rate of the elements (material) shown on the upper portion shown below and the elements (material) shown on the lower portion shown below were set to 4/1 with molar basis.

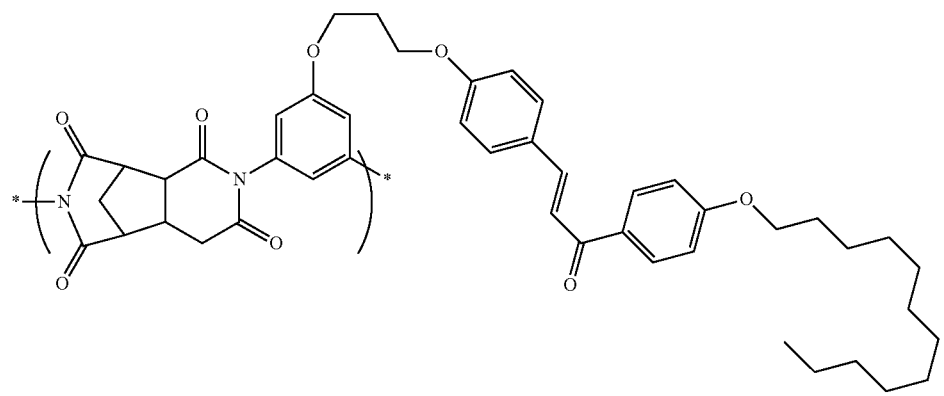

-continued

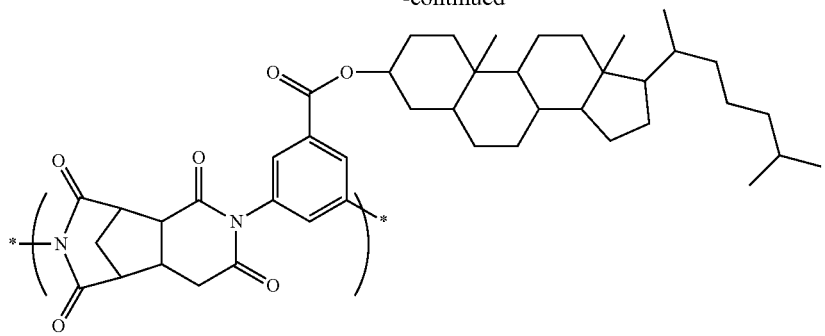

Example 1-J

In Example 1-J, the liquid crystal display was manufactured in the same manner as Example 1-C except for using the compound before the alignment process showing the following structural formula. The mixing rate of the elements (material) shown on the upper portion shown below and the elements (material) shown on the lower portion shown below were set to 4/1 with molar basis.

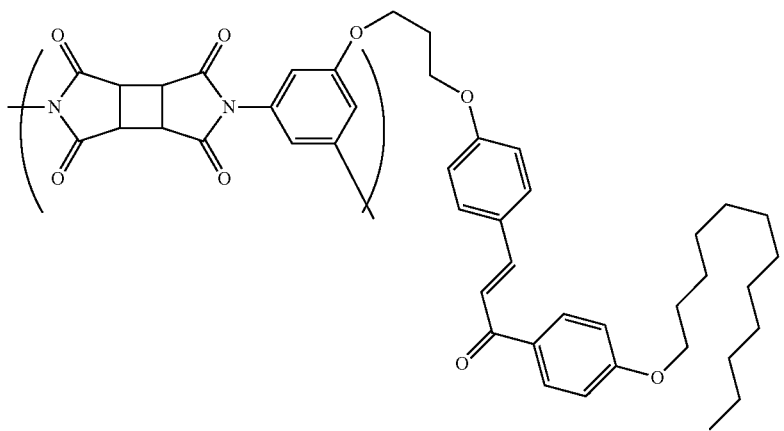

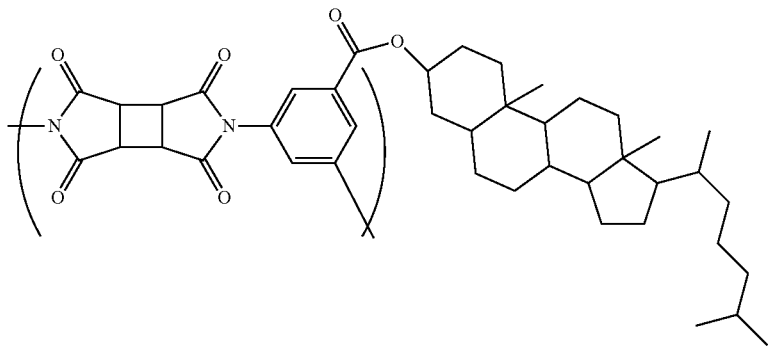

Example 1-K

In Example 1-K, the liquid crystal display was manufactured in the same manner as Example 1-C except for using the compound before the alignment process showing the following structural formula.

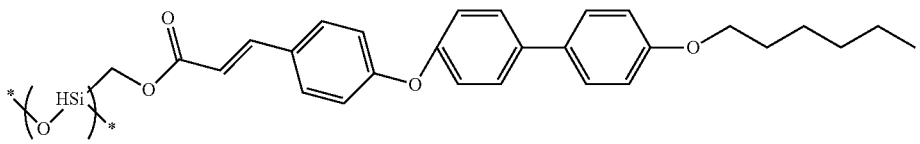

Comparative Example 1-A

In Comparative Example 1-A, only MLC-6608 (manufactured by Merck Ltd.) which is the liquid crystal molecule having the negative dielectric anisotropy was used as the liquid crystal composition. The other processes were performed in the same manner as in Example 1-A.

Comparative Example 1-B

In Comparative Example 1-B, the same liquid crystal compositions as in Example 1-A were used as the liquid crystal compositions. A typical vertical alignment film AL60601 (manufactured by JRS Corporation) was used as the alignment films. The other processes were performed in the same manner as in Example 1-A.

TABLE 2

|  | Voltage retention rate (%) | $\tau_f$ (milliseconds) |
| --- | --- | --- |
| Example 1-A | 97 | 3.9 |
| Example 1-B | 95 | 4.0 |
| Example 1-C | 90 | 3.8 |
| Example 1-D | 87 | 4.3 |
| Example 1-E | 93 | 4.0 |
| Example 1-F | 92 | 4.3 |
| Example 1-G | 89 | 3.7 |
| Example 1-H | 88 | 3.8 |
| Example 1-I | 94 | 4.0 |
| Example 1-J | 90 | 3.9 |
| Example 1-K | 96 | 4.4 |
| Comparative Example 1-A | 88 | 5.5 |
| Comparative Example 1-B | 76 | 3.8 |

In Comparative Example 1-A, the value of the voltage retention rate was at the level of that in Example 1 but the value of $\tau_f$ was higher than that. On the other hand, in Comparative Example 1-B, the value of $\tau_f$ was at the level of that in Example 1 but the value of the voltage retention rate was lower than that. In Example 1-A to Example 1-K, both the value of high voltage retention rate and the value of short $\tau_f$ could be achieved.

Hereinabove, the present disclosure has been described with the preferred embodiments and examples, but the present disclosure is not limited thereto and various modifications can be performed. For example, in the embodiments and examples, the liquid crystal display (liquid crystal display element) in the VA mode has been described, but the present disclosure is not limited thereto and can be applied to other display modes such as a TN mode an in plane switching (IPS) mode, a fringe field switching (FFS) mode, or an optically compensated bend (OCB) mode. The same effects are also obtained in this case. However, in the present disclosure, it is possible to particularly exhibit improvement effects of higher response property in the VA mode than in the IPS mode or the FFS mode, compared to the case in which the pretilt process is not performed.

In addition, in the embodiments and examples, the transmission type liquid crystal display (liquid crystal display element) has been described, but it is not limited to the transmission type in the present disclosure and a reflection type may be used, for example. In a case of using the reflection type, the pixel electrode is configured with an electrode material having light reflectivity such as aluminum.

The present disclosure has the following configurations.

[1] Liquid Crystal Display

A liquid crystal display including: a liquid crystal display element which includes a pair of alignment films which are provided on facing surface sides of a pair of substrates, and a liquid crystal layer which is provided between the pair of alignment films and is configured to have a liquid crystal composition containing liquid crystal molecules having negative dielectric anisotropy, in which at least one of the pair of alignment films contains a compound obtained by crosslinking polymer compounds each including a first side chain which interacts with the liquid crystal molecules and a crosslinkable functional group as a second side chain, with each other, the liquid crystal composition configuring the liquid crystal layer contains at least one kind of an alkenyl compound represented by the following general formula (AN-1), and pretilt is applied to the liquid crystal molecules by the crosslinked compound.

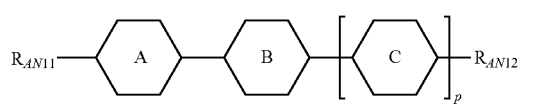

(AN-1)

Herein, $R_{AN11}$ and $R_{AN12}$ each independently are an alkyl group, an alkenyl group, or an alcoxy group having 1 to 10 carbon atoms, and at least one of $R_{AN11}$ and $R_{AN12}$ is an alkenyl group,

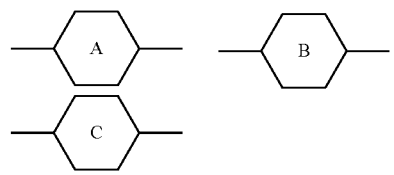

each independently are

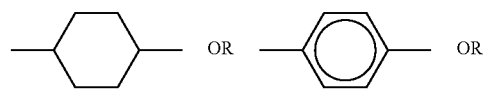

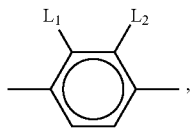

$L_1$ and $L_2$ each independently are a hydrogen atom, fluorine atom, or a chlorine atom, and p is 0 or 1.

[2] The liquid crystal display according to [1], in which the liquid crystal composition configuring the liquid crystal layer contains at least one kind of an alkenyl compound represented by the following general formula (AN-2).

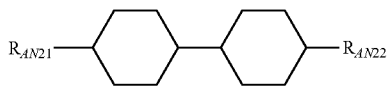
(AN-2)

Herein, $R_{AN21}$ is an alkenyl group having 1 to 10 carbon atoms and $R_{AN22}$ is an alkyl group having 1 to 10 carbon atoms.

[3] The liquid crystal display according to [1], in which the liquid crystal composition configuring the liquid crystal layer contains at least one kind of an alkenyl compound represented by the following general formula (AN-3).

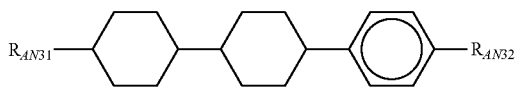
(AN-3)

Herein, $R_{AN31}$ is an alkenyl group having 1 to 10 carbon atoms and $R_{AN32}$ is an alkyl group having 1 to 10 carbon atoms.

[4] The liquid crystal display according to [1], in which the liquid crystal composition configuring the liquid crystal layer contains at least one kind of an alkenyl compound represented by the following general formula (AN-4).

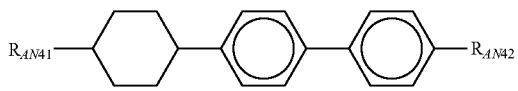
(AN-4)

Herein, $R_{AN41}$ is an alkenyl group having 1 to 10 carbon atoms and $R_{AN42}$ is an alkyl group having 1 to 10 carbon atoms.

[5] The liquid crystal display according to [1], in which the liquid crystal composition configuring the liquid crystal layer contains at least one kind of an alkenyl compound represented by the following general formula (AN-5-1) or general formula (AN-5-2).

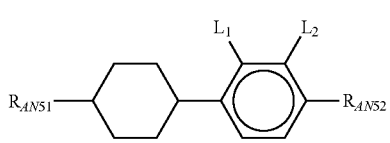
(AN-5-1)

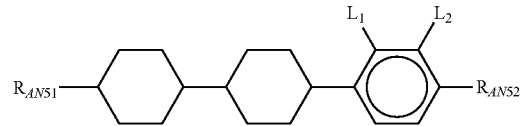
(AN-5-2)

Herein, $R_{AN51}$ is an alkenyl group having 1 to 10 carbon atoms, $R_{AN52}$ is an alcoxy group having 1 to 10 carbon atoms, and $L_1$ and $L_2$ each independently are a fluorine atom or a chlorine atom.

[6] The liquid crystal display according to [1], in which the liquid crystal composition configuring the liquid crystal layer at least contains a mixture of an electrically negative alkenyl compound and an electrically neutral alkenyl compound.

[7] The liquid crystal display according to any one of [1] to [6], in which the compound obtained by crosslinking the polymer compounds with each other is configured to have the first side chain, the second side chain, and a main chain supporting the first side chain and the second side chain with respect to the substrates, each of the first side chain and the second side chain is bonded to the main chain, and pretilt is applied to the liquid crystal molecules along the first side chain or by being interposed between the first side chains.

[8] The liquid crystal display according to any one of [1] to [6], in which the compound obtained by crosslinking the polymer compounds with each other is configured to have the first side chain, the second side chain, and a main chain supporting the first side chain and the second side chain with respect to the substrates, the first side chain and the second side chain are bonded to each other, the first side chain or the second side chain is bonded to the main chain, and pretilt is applied to the liquid crystal molecules along the first side chain or by being interposed between the first side chains.

[9] The liquid crystal display according to [7] or [8], in which the first side chain is formed of $(A_{11})_{n11}$-$R_{SD11}$-$(A_{12})_{n12}$-$R_{SD12}$—$R_{SD13}$, $A_{11}$ and $A_{12}$ each are —$CH_2$—, —O—, —COO—, or —OCO—, n11 and n12 each are 0 or 1, $R_{SD11}$ is an alkyl group having 0 to 40 carbon atoms or a fluoroalkyl group having 1 to 40 carbon atoms, $R_{SD12}$ is a divalent organic group having at least one ring structure, and $R_{SD13}$ is a monovalent group including a hydrogen atom, a halogen atom, an alkyl group, an alcoxy group, or a carbonate group, or a derivative thereof.

[10] The liquid crystal display according to any one of [7] to [9], in which the second side chain is formed of $(A_{21})_{n21}$-$R_{SD21}$-$(A_{22})_{n22}$-$R_{SD22}$—$R_{SD23}$, $A_{21}$ and $A_{22}$ each are —$CH_2$—, —O—, —COO—, or —OCO—, n21 and n22 each are 0 or 1, $R_{SD21}$ is an alkyl group having 0 to 40 carbon atoms or a fluoroalkyl group having 1 to 40 carbon atoms, $R_{SD22}$ is a divalent group having at least one kind of structures selected from a group including vinyl, acryloyl, methacryloyl, chalcone, cinnamate, cinnamoyl, coumarin, maleimide, benzophenone, norbornene, oryzanol and chitosan, or an ethynylene group, and $R_{SD23}$ is a monovalent group including a hydrogen atom, a halogen atom, an alkyl group, an alcoxy group, or a carbonate group, or a derivative thereof.

[11] The liquid crystal display according to any one of [7] to [10], in which the main chain has a polyimide structure, has a polysiloxane structure, or includes polyamic acid.

[12] The liquid crystal display according to any one of [1] to [11], in which an alignment regulation unit formed of slit portions formed on an electrode, concavo-convex portions formed on the electrode, or protrusions provided on the substrate is provided.

[13] The liquid crystal display according to any one of [1] to [12], in which surface roughness Ra of at least one film of the pair of alignment films is equal to or less than 1 nm.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display, comprising:
   a liquid crystal display element comprising a pair of alignment films which are provided on facing surfaces of a pair of substrates, and
   a liquid crystal layer provided between the pair of alignment films, wherein the liquid crystal layer comprises a liquid crystal composition comprising liquid crystal molecules having negative dielectric anisotropy,
   wherein at least one of the pair of alignment films comprises a compound obtained by crosslinking polymer compounds, each comprising a first side chain and a second side chain, with each other, wherein the first side chain interacts with the liquid crystal molecules, and wherein the second side chain comprises a crosslinkable functional group,
   wherein pretilt is applied to the liquid crystal molecules by the crosslinked compound of the at least one alignment film, and
   wherein the liquid crystal composition of the liquid crystal layer comprises at least one alkenyl compound represented by formula (AN-1):

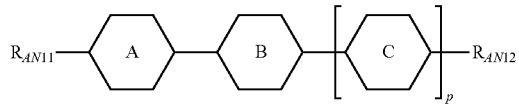

(AN-1)

wherein:
$R_{AN11}$ and $R_{AN12}$ each independently are an alkyl group or an alkoxy group having 1 to 10 carbon atoms, or an alkenyl group having 2 to 10 carbon atoms, and at least one of $R_{AN11}$ and $R_{AN12}$ is an alkenyl group,

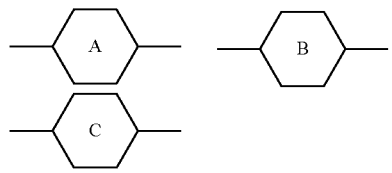

each independently are:

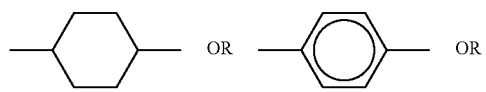

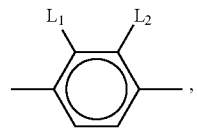

$L_1$ and $L_2$ each independently are a hydrogen atom, fluorine atom, or a chlorine atom, and
p is 0 or 1.

2. The liquid crystal display according to claim 1, wherein the liquid crystal composition of the liquid crystal layer comprises at least one alkenyl compound represented by formula (AN-2):

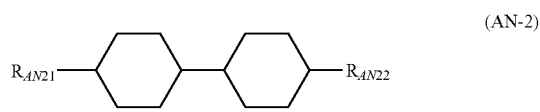

(AN-2)

wherein $R_{AN21}$ is an alkenyl group having 2 to 10 carbon atoms and $R_{AN22}$ is an alkyl group having 1 to 10 carbon atoms.

3. The liquid crystal display according to claim 1, wherein the liquid crystal composition of the liquid crystal layer comprises at least one alkenyl compound represented by formula (AN-3):

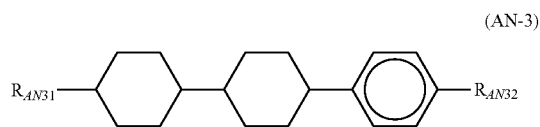

(AN-3)

wherein $R_{AN31}$ is an alkenyl group having 2 to 10 carbon atoms and $R_{AN32}$ is an alkyl group having 1 to 10 carbon atoms.

4. The liquid crystal display according to claim 1, wherein the liquid crystal composition of the liquid crystal layer comprises at least one alkenyl compound represented by formula (AN-4):

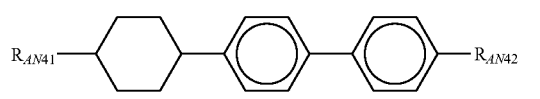

(AN-4)

wherein $R_{AN41}$ is an alkenyl group having 2 to 10 carbon atoms and $R_{AN42}$ is an alkyl group having 1 to 10 carbon atoms.

5. The liquid crystal display according to claim 1, wherein the liquid crystal composition of the liquid crystal layer comprises at least one alkenyl compound represented by formula (AN-5-1) or formula (AN-5-2):

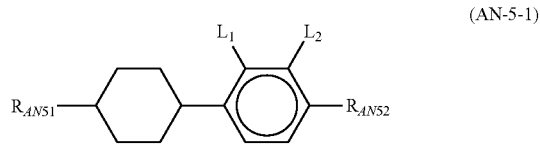

(AN-5-1)

(AN-5-2)

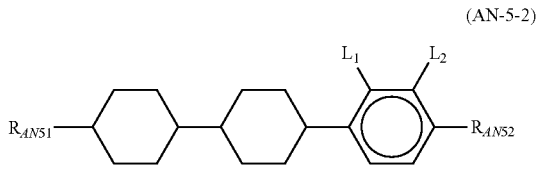

wherein $R_{AN51}$ is an alkenyl group having 2 to 10 carbon atoms, $R_{AN52}$ is an alkoxy group having 1 to 10 carbon atoms, and $L_1$ and $L_2$ each independently are a fluorine atom or a chlorine atom.

6. The liquid crystal display according to claim 1,
wherein the compound obtained by crosslinking the polymer compounds with each other is configured to have the first side chain, the second side chain, and a main chain supporting the first side chain and the second side chain with respect to the substrates,
wherein each of the first side chain and the second side chain is bonded to the main chain, and
wherein pretilt is applied to the liquid crystal molecules along the first side chain or by being interposed between the first side chains.

7. The liquid crystal display according to claim 1,
wherein the compound obtained by crosslinking the polymer compounds with each other is configured to have the first side chain, the second side chain, and a main chain supporting the first side chain and the second side chain with respect to the substrates,
wherein the first side chain and the second side chain are bonded to each other,
wherein the first side chain or the second side chain is bonded to the main chain, and
wherein pretilt is applied to the liquid crystal molecules along the first side chain or by being interposed between the first side chains.

8. The liquid crystal display according to claim 6,
wherein the first side chain is formed of:

$(A_{11})_{n11}\text{-}R_{SD11}\text{-}(A_{12})_{n12}\text{-}R_{SD12}\text{-}R_{SD13}$, wherein:
$A_{11}$ and $A_{12}$ each are —$CH_2$—, —O—, —COO—, or —OCO—,
n11 and n12 each are 0 or 1,
$R_{SD11}$ is an alkyl group having 1 to 40 carbon atoms or a fluoroalkyl group having 1 to 40 carbon atoms,
$R_{SD12}$ is a divalent organic group having at least one ring structure, and
$R_{SD13}$ is a monovalent group comprising a hydrogen atom, a halogen atom, an alkyl group, an alkoxy group, or a carbonate group, or a derivative thereof.

9. The liquid crystal display according to claim 6,
wherein the second side chain is formed of:

$(A_{21})_{n21}\text{-}R_{SD21}\text{-}(A_{22})_{n22}\text{-}R_{SD22}\text{-}R_{SD23}$, wherein:
$A_{21}$ and $A_{22}$ each are —$CH_2$—, —O—, —COO—, or —OCO—,
n21 and n22 each are 0 or 1,
$R_{SD21}$ is an alkyl group having 1 to 40 carbon atoms or a fluoroalkyl group having 1 to 40 carbon atoms,
$R_{SD22}$ is a divalent group having at least one structure selected from the group consisting of vinyl, acryloyl, methacryloyl, chalcone, cinnamate, cinnamoyl, coumarin, maleimide, benzophenone, norbornene, oryzanol and chitosan, or an ethynylene group, and
$R_{SD23}$ is a monovalent group comprising a hydrogen atom, a halogen atom, an alkyl group, an alkoxy group, or a carbonate group, or a derivative thereof.

10. The liquid crystal display according to claim 6,
wherein the main chain has a polyimide structure, has a polysiloxane structure, or consists of polyamic acid.

11. The liquid crystal display according to claim 1,
further comprising an alignment regulation unit formed of slit portions formed on an electrode, concavo-convex portions formed on the electrode, or protrusions provided on at least one of the pair of substrates.

* * * * *